United States Patent
Chen

(10) Patent No.: US 12,269,785 B2
(45) Date of Patent: Apr. 8, 2025

(54) MICROWAVE MEDIATED BIOCHAR AND BIOCHAR HYDROGEL COMPOSITE SYNTHESIS

(71) Applicant: The Florida State University Research Foundation, Inc., Tallahassee, FL (US)

(72) Inventor: Gang Chen, Tallahassee, FL (US)

(73) Assignee: The Florida State University Research Foundation, Inc., Tallahassee, FL (US)

(*) Notice: Subject to any disclaimer, the term of this patent is extended or adjusted under 35 U.S.C. 154(b) by 224 days.

(21) Appl. No.: 17/539,699

(22) Filed: Dec. 1, 2021

(65) Prior Publication Data

US 2023/0167035 A1    Jun. 1, 2023

(51) Int. Cl.
| | | |
|---|---|---|
| C05C 9/00 | (2006.01) | |
| C05F 5/00 | (2006.01) | |
| C05G 1/00 | (2006.01) | |
| C05G 5/18 | (2020.01) | |
| C05G 5/40 | (2020.01) | |

(52) U.S. Cl.
CPC ............... *C05F 5/002* (2013.01); *C05C 9/00* (2013.01); *C05G 1/00* (2013.01); *C05G 5/18* (2020.02); *C05G 5/40* (2020.02)

(58) Field of Classification Search
CPC . C05F 5/002; C05F 11/02; C05C 9/00; C05G 1/00; C05G 5/18; C05G 5/40
See application file for complete search history.

(56) References Cited

U.S. PATENT DOCUMENTS 6,471,741 B1 * 10/2002 Reinbergen ............. C05G 5/23
71/33

FOREIGN PATENT DOCUMENTS

CN          112111040 A  * 12/2020  ............. A01G 22/45

OTHER PUBLICATIONS

Sennakesavan, Gangadevi, et al. "Acrylic acid/acrylamide based hydrogels and its properties—A review." Polymer Degradation and Stability 180 (2020): 109308. (Year: 2020).*
Rehrah, Djaafar, et al. "Production and characterization of biochars from agricultural by-products for use in soil quality enhancement." Journal of analytical and applied pyrolysis 108 (2014): 301-309. (Year: 2014).*
Brick, Stephen, and Sasha Lyutse. "Biochar: Assessing the promise and risks to guide US policy." Natural Resources Defense Council. USA. http://www.nrdc.org/energy/files/biochar_paper.pdf (2010). (Year: 2010).*
Kim, Woong-Ki, et al. "Characterization of cadmium removal from aqueous solution by biochar produced from a giant Miscanthus at different pyrolytic temperatures." Bioresource technology 138 (2013): 266-270. (Year: 2013).*
Afzal, Muhammad Zaheer, et al. "Enhancement of ciprofloxacin sorption on chitosan/biochar hydrogel beads." Science of the Total Environment 639 (2018): 560-569.

(Continued)

*Primary Examiner* — Jennifer A Smith
(74) *Attorney, Agent, or Firm* — Meunier Carlin & Curfman LLC

(57) ABSTRACT

Provided herein are microwave pyrolysis-derived biochar materials, biochar-hydrogel composites and methods of making and using. The biochar-hydrogel composites comprising: a hydrogel matrix and a biochar material.

9 Claims, 28 Drawing Sheets

(56) References Cited

OTHER PUBLICATIONS

Agegnehu, Getachew, et al. "Biochar and biochar-compost as soil amendments: effects on peanut yield, soil properties and greenhouse gas emissions in tropical North Queensland, Australia." Agriculture, ecosystems & environment 213 (2015): 72-85.

Ahmad, Mahtab, et al. "Biochar as a sorbent for contaminant management in soil and water: a review." Chemosphere 99 (2014): 19-33.

Ahmed, Enas M. "Hydrogel: Preparation, characterization, and applications: A review." Journal of advanced research 6.2 (2015): 105-121.

Alburquerque, J. A., et al. "High concentrations of polycyclic aromatic hydrocarbons (naphthalene, phenanthrene and pyrene) failed to explain biochar's capacity to reduce soil nitrous oxide emissions." Environmental Pollution 196 (2015): 72-77.

Alhinai, Mujahid, et al. "Characterisation and thermochemical conversion of rice husk for biochar production." Int. J. Renew. Energy Res 8.3 (2018): 1648-1656.

Antunes, Elsa, et al. "Biochar produced from biosolids using a single-mode microwave: Characterisation and its potential for phosphorus removal." Journal of Environmental Management 196 (2017): 119-126.

Asmadi, Mohd, Haruo Kawamoto, and Shiro Saka. "Thermal reactivities of catechols/pyrogallols and cresols/xylenols as lignin pyrolysis intermediates." Journal of Analytical and Applied Pyrolysis 92.1 (2011): 76-87.

Azzi, Elias S., Erik Karltun, and Cecilia Sundberg. "Prospective life cycle assessment of large-scale biochar production and use for negative emissions in Stockholm." Environmental science & technology 53.14 (2019): 8466-8476.

Bao, Yan, Jianzhong Ma, and Na Li. "Synthesis and swelling behaviors of sodium carboxymethyl cellulose-g-poly (AA-co-AM-co-AMPS)/MMT superabsorbent hydrogel." Carbohydrate Polymers 84.1 (2011): 76-82.

Bogdal, 4.39 Polymer Science: A Comprehensive Reference, 2012, pp. 981-1027.

Bonanomi, Giuliano, et al. "Biochar chemistry defined by 13C-CPMAS NMR explains opposite effects on soilborne microbes and crop plants." Applied Soil Ecology 124 (2018): 351-361.

Cao, Jun, et al. "Study on carbonization of lignin by TG-FTIR and high-temperature carbonization reactor." Fuel processing technology 106 (2013): 41-47.

Chen, Songling, et al. "Preparation and characterization of slow-release fertilizer encapsulated by biochar-based waterborne copolymers." Science of the Total Environment 615 (2018): 431-437.

Chintala, Rajesh, et al. "Nitrate sorption and desorption in biochars from fast pyrolysis." Microporous and Mesoporous Materials 179 (2013): 250-257.

Clare, Abbie, et al. "From rhetoric to reality: farmer perspectives on the economic potential of biochar in China." International Journal of Agricultural Sustainability 12.4 (2014): 440-458.

Clarke, Coby J., et al. "Green and sustainable solvents in chemical processes." Chemical Reviews 118.2 (2018): 747-800.

Puoci, Francesco, et al. "Polymer in agriculture: a review." American Journal of Agricultural and Biological Sciences 3.1 (2008): 299-314.

Du, Taisheng, et al. "Deficit irrigation and sustainable water-resource strategies in agriculture for China's food security." Journal of experimental botany 66.8 (2015): 2253-2269.

Enders, Akio, et al. "Characterization of biochars to evaluate recalcitrance and agronomic performance." Bioresource technology 114 (2012): 644-653.

Foong, S.Y., et al., Valorization of biomass waste to engineered activated biochar by microwave pyrolysis: Progress, challenges, and future directionsChem Eng J 2020, 389, 124401.

Gao, Xiang, et al. "Controlled release urea improved the nitrogen use efficiency, yield and quality of potato (Solanum tuberosum L.) on silt loamy soil." Field crops research 181 (2015): 60-68.

Ge, S.B., et al., Vacuum pyrolysis incorporating microwave heating and base mixture modification: An integrated approach to transform biowaste into eco-friendly bioenergy products, Renew Sust Energ Rev 2020, 127, 109871.

Ghazali, et al., Pineapple Leaf Fibers Coated with Polyacrylamide Hydrogel, Appl. Mech. Mater. 695 (2015) 139-142.

Giachi, et al., Synthesis and Processing of Biodegradable and Bio-Based Polymers by Microwave IrradiationMicrowave Heating, 2011, pp. 181-206.

Godiya, Chirag B., et al. "Carboxymethyl cellulose/polyacrylamide composite hydrogel for cascaded treatment/reuse of heavy metal ions in wastewater." Journal of hazardous materials 364 (2019): 28-38.

Gonzaga, Maria Isidoria Silva, et al. "Pyrolysis methods impact biosolids-derived biochar composition, maize growth and nutrition." Soil and Tillage Research 165 (2017): 59-65.

Song, W, Guo, M. et al., Journal of Analytical and Applied Pyrolysis 94 (2012) 138-145.

Hangs, R. D., H. P. Ahmed, and J. J. Schoenau. "Influence of willow biochar amendment on soil nitrogen availability and greenhouse gas production in two fertilized temperate prairie soils." Bioenergy Research 9.1 (2016): 157-171.

Harvey, Omar R., et al. "An index-based approach to assessing recalcitrance and soil carbon sequestration potential of engineered black carbons (biochars)." Environmental science & technology 46.3 (2012): 1415-1421.

Heitkötter, Julian, and Bernd Marschner. "Interactive effects of biochar ageing in soils related to feedstock, pyrolysis temperature, and historic charcoal production." Geoderma 245 (2015): 56-64.

Hoogenboom, Richard, et al. "Scale-up of Microwave-Assisted Polymerizations in Batch Mode: The Cationic Ring-Opening Polymerization of 2-Ethyl-2-oxazoline." Macromolecular rapid communications 27.18 (2006): 1556-1560.

Houser, Jeffrey N., and William B. Richardson. "Nitrogen and phosphorus in the Upper Mississippi River: transport, processing, and effects on the river ecosystem." Hydrobiologia 640.1 (2010): 71-88.

Hsieh, Yuch-Ping. "A novel multielemental scanning thermal analysis (MESTA) method for the identification and characterization of solid substances." Journal of AOAC International 90.1 (2007): 54-59.

Huber, T., Feast, S., Dimartino, S., Cen, W., & Fee, C. (2019). Analysis of the Effect of Processing Conditions on Physical Properties of Thermally Set Cellulose Hydrogels. Materials, 12(7), 1066. doi: 10.3390/ma12071066.

Jeffery, Simon, et al. "Biochar boosts tropical but not temperate crop yields." Environmental Research Letters 12.5 (2017): 053001.

Jindo, Keiji, et al. "Physical and chemical characterization of biochars derived from different agricultural residues." Biogeosciences 11.23 (2014): 6613-6621.

Joseph, S. D#,, et al. "An investigation into the reactions of biochar in soil." Soil Research 48.7 (2010): 501-515.

Kameyama, Koji, et al. "Influences of feedstock and pyrolysis temperature on the nitrate adsorption of biochar." Soil Science and Plant Nutrition 62.2 (2016): 180-184.

Kim, Daegi, Kwanyong Lee, and Ki Young Park. "Upgrading the characteristics of biochar from cellulose, lignin, and xylan for solid biofuel production from biomass by hydrothermal carbonization." Journal of industrial and Engineering Chemistry 42 (2016): 95-100.

Kim, Sangjoon, et al. "Polyacrylamide hydrogel properties for horticultural applications." International Journal of Polymer Analysis and Characterization 15.5 (2010): 307-318.

Kyrikou, Ioanna, and Demetres Briassoulis. "Biodegradation of agricultural plastic films: a critical review." Journal of Polymers and the Environment 15.2 (2007): 125-150.

Laird, David, et al. "Biochar impact on nutrient leaching from a Midwestern agricultural soil." Geoderma 158.3-4 (2010): 436-442.

Lam, et al., Cleaner conversion of bamboo into carbon fibre with favourable physicochemical and capacitive properties via microwave pyrolysis combining with solvent extraction and chemical impregnationJ. Clean. Prod 236 (2019), 117692.

(56) References Cited

OTHER PUBLICATIONS

Li, et al., Contemporary strategies for enhancing nitrogen retention and mitigating nitrous oxide emission in agricultural soils: present and future, Environ. Dev. Sustain. 22(4) (2020) 2703-2741.
Li, R., et al., Sulfur-aided composting facilitates ammonia release mitigation, endocrine disrupting chemicals degradation and biosolids stabilization Bioresource Technol 2020, 312, 123653.
Li, S.M., et al., Nitrogen retention of biochar derived from different feedstocks at variable pyrolysis temperatures. J Anal Appl Pyrol 2018, 133, 136-146.
Li, S.M., et al., Predicting biochar properties and functions based on feedstock and pyrolysis temperature: A review and data syntheses. J Clean Prod 2019, 215, 890-902.
Li, S.M., et al., Thermogravimetric, thermochemical, and infrared spectral characterization of feedstocks and biochar derived at different pyrolysis temperatures. Waste Manage 2018, 78, 198-207.
Liang, X., Biochar alters the resistance and resilience to drought in a tropical soil. Environ. Res. Lett. 9(6) (2014) 064013.
Liew, Rock Keey, et al. "Oil palm waste: An abundant and promising feedstock for microwave pyrolysis conversion into good quality biochar with potential multi-applications." Process Safety and Environmental Protection 115 (2018): 57-69.
Liu, Guodong, et al. "Controlled-release and slow-release fertilizers as nutrient management tools." USA: US Department of Agriculture, UF/IFAS Extension Service, University of Florida, IFAS (2014).
Liu, et al., A Biochar-Based Route for Environmentally Friendly Controlled Release of Nitrogen: Urea-Loaded Biochar and Bentonite Composite. Sci. Rep. 9(1) (2019) 9548.
Marousek, J., et al., Glory and misery of biochar. Clean Technol Envir 2017, 19, 311-317.
Mohamed, B.A., et al., Microwave-assisted catalytic pyrolysis of switchgrass for improving bio-oil and biochar properties. Bioresource Technol 2016, 201, 121-132.
Mohammadi-Khoo, et al., Synthesis of a cellulose-based hydrogel network: Characterization and study of urea fertilizer slow release. J. Appl. Polym. Sci 133(5) (2016), 9 pages.
Moseley, et al., A Comparison of Commercial Microwave Reactors for Scale-Up within Process Chemistry. Org Process Res Dev 12(1) (2008) 30-40.
Mossa, A.W., et al., The response of soil microbial diversity and abundance to long-term application of biosolids. Environ Pollut 2017, 224, 16-25.
Mukherjee, A., et al., Surface chemistry variations among a series of laboratory-produced biochars. Geoderma 2011, 163, 247-255.
Nagahata, Encouragements for the Use of Microwaves in Industrial Chemistry. Chem. Rec. 19(1) (2019) 51-64.
Pandey, et al., Bacterial Cellulose/Acrylamide pH-Sensitive Smart Hydrogel: Development, Characterization, and Toxicity Studies in ICR Mice Model. Mol. Pharm. 11(10) (2014) 3596-3608.
Pang, et al., Review of conventional and novel polymerization processes for polyesters. Prog. Polym. Sci. 31(11) (2006) 1009-1037.
Polanyi, M. "Adsorption and capillarity from the stand point of the II. main clause." Z Phys Chem-Stoch Ve 88.5 (1914): 622-631.
Rigby, H., et al., A critical review of nitrogen mineralization in biosolids-amended soil, the associated fertilizer value for crop production and potential for emissions to the environment. Sci Total Environ 2016, 541, 1310-1338.
Saini, R., et al., Lignocellulosic Biomass-Based Biorefinery: an Insight into Commercialization and Economic Standout. Current Sustainable/Renewable Energy Reports 2020, 7, 122-136.
Sara, M., et al., Production of Drop-In and Novel Bio-Based Platform Chemicals. Chapter 14, Platform Chemical Biorefinery, 2016.
Sara, M., et al., Comparative study between microwave and ultrasonication aided in situ transesterification of microbial lipids RSC Advances 2016, 6, 56009-56017.
Scheer, et al., Effect of enhanced efficiency fertilisers on nitrous oxide emissions in a sub-tropical cereal cropping system Soil Res. 54(5) (2016) 544-551.
Sethi, et al., Fabrication and characterization of microwave assisted carboxymethyl cellulose-gelatin silver nanoparticles imbibed hydrogel: Its evaluation as dye degradation. Funct. Polym 142 (2019) 134-146.
Siepmann, et al., Modeling of drug release from delivery systems based on hydroxypropyl methylcellulose (HPMC) Adv. Drug Deliv. Rev. 64 (2012) 163-174.
Singh, P., et al., Exploring temple floral refuse for biochar production as a closed loop perspective for environmental management. Waste Manage 2018, 77, 78-86.
Spokas, K.A. Review of the stability of biochar in soils: predictability of O:C molar ratios. Carbon Manag 2010, 1, 289-303.
Timilsena, et al., Enhanced Efficiency Fertilizers: A review of formulation and nutrient release patterns. J. Sci. Food Agric. 95(6) (2015) 1131-1142.
Ullah, S., et al., Terahertz Time Domain, Raman and Fourier Transform Infrared Spectroscopy of Acrylamide, and the Application of Density Functional Theory. J Spectrosc (Hindawi) 2013, 7 pages.
Valente, et al., Effect of different electrolytes on the swelling properties of calyx[4]pyrrole-containing polyacrylamide membranes. Eur. Polym. J. 42(9) (2006) 2059-2068.
Van Zwieten, L., et al. A glasshouse study on the interaction of low mineral ash biochar with nitrogen in a sandy soil. Aust J Soil Res 2010, 48, 569-576.
Van Zwieten, L., Kimber, S., Morris, S., Chan, K. Y., Downie, A., Rust, J., . . . Cowie, A. (2009). Effects of biochar from slow pyrolysis of papermill waste on agronomic performance and soil fertility. Plant and Soil, 327(1-2), 235-246. doi:10.1007/s11104-009-0050-x.
Varaprasad, et al., Removal of dye by carboxymethyl cellulose, acrylamide and graphene oxide via a free radical polymerization process. Carbohydr. Polym. 164 (2017) 186-194.
Verma, L., et al., Synthesis of novel biochar from waste plant litter biomass for the removal of Arsenic (III and V) from aqueous solution: A mechanism characterization, kinetics and thermodynamics. J Environ Manage 2019, 248.
Wen, Z.S., et al., Microwave-Assisted Synthesis of a Novel Biochar-Based Slow-Release Nitrogen Fertilizer with Enhanced Water-Retention Capacity. ACS Sustain. Chem. Eng 5(8) (2017) 7374-7382.
Yang, H.P., et al., Characteristics of hemicellulose, cellulose and lignin pyrolysis. Fuel 2007, 86, 1781-1788.
Zhang, et al., Novel pectin based composite hydrogel derived from grapefruit peel for enhanced Cu(II) removal. J. Hazard. Mater. 384 (2020) 121445.
Zheng, H., et al., Impacts of adding biochar on nitrogen retention and bioavailability in agricultural soil Geoderma 2013, 206, 32-39.
Zhou, et al., A novel polyacrylamide nanocomposite hydrogel reinforced with natural chitosan nanofibers. Colloids Surf. B 84(1) (2011) 155-162.
Zhu, L., et al., Biochar of corn stover: Microwave-assisted pyrolysis conditioninduced changes in surface functional groups and characteristics. J Anal Appl Pyrol 2015, 115, 149-156.
Zimmerman, A.R., Abiotic and Microbial Oxidation of Laboratory-Produced Black Carbon (Biochar). Environ Sci Technol 2010, 44, 1295-1301.

\* cited by examiner

MICROWAVE MEDIATED BIOCHAR AND BIOCHAR HYDROGEL COMPOSITE SYNTHESIS

BACKGROUND

Biochar is the thermochemical product converted from biomass in the absence of oxygen at high temperature (Bonanomi, G., et al., *Appl Soil Ecol* 2018, 124, 351-36). The process has been deemed "charring" or "pyrolysis". When biochar was first investigated, it was widely used as a method to sequester carbon in soil (Zhu, L., et al., *J Anal Appl Pyrol* 2015, 115, 149-156; Harvey, O. R., et al., *Environ Sci Technol* 2012, 46, 1415-1421). Consequently, instead of suffering from rapid decomposition, the residues of plants and compost were recycled for biochar production and retained as the format of aromatic carbon (Singh, P., et al., *Waste Manage* 2018, 77, 78-86). Biochar is not a narrowly defined material. Because the utilization of the various feedstocks and the different pyrolysis conditions, biochar can exhibit different beneficial characteristics. As the interest in biochar research consistently grows, the extensive benefits of biochar contribute to a wide range of strategies: agronomic improvement, mitigation of climate change, waste management and energy production [Singh, P., et al., *Waste Manage* 2018, 77, 78-86; Verma, L., et al., *J Environ Manage* 2019, 248]. Large progress in each strategic scenario has been recorded in the previous studies. For example, Hangs, R. D., et al., *Bioenerg Res* 2016, 9, 157-171 demonstrated that the biochar produced from shrub willow feedstock enhanced the urease activity and nitrification rate of urea fertilizer which consequently increased the crop yield. Greenhouse gas (GHG) emissions, such as $N_2O$, $CO_2$, and $NH_3$, have been largely reduced because the addition of biochar (Agegnehu, G., et al., *Agr Ecosyst Environ* 2015, 213, 72-85). The nutrient-rich temple floral refuse was processed to a biochar in the Singh et al. study, and the potential application in the dye removal was evidenced by a series of adsorption experiments (Singh, P., et al., *Waste Manage* 2018, 77, 78-86). Lastly, with regard to energy production, slow pyrolysis not only produces biochar, but it also presents comparable energy production. Besides the high efficiency for energy production, 30% lower energy input and 2-5 times of $CO_2$ emission elimination can be achieved (Azzi, E. S., et al., *Environ Sci Technol* 2019, 53, 8466-8476).

The yield of biochar, its physical and chemical characteristics vary depending on the pyrolysis conditions (e.g., temperatures, retention times, and heat fluxes) and the raw materials. Processed via relatively higher temperatures, biochar is more recalcitrant and resistant to microbial and chemical decomposition. Elements like hydrogen (H) and oxygen (O) are largely depleted during pyrolysis. At the same time, the increased carbon (C) concentration indicates that C-related compounds have been condensed and mostly existed as the form of stable aromatic C in the biochar (Li, S. M., et al., *Waste Manage* 2018, 78, 198-207). In addition, high temperatures provide benefits not limited to: larger porosity and surface area, which are vitally important in the application related to biochar adsorption capacity (Marousek, J., et al., *Clean Technol Envir* 2017, 19, 311-317). However, high residue ashes and metal volatilization from high temperature charring get caught in the micropores (Enders, A., et al., *Bioresource Technol* 2012, 114, 644-653). In contrast, an atmosphere with a low temperature reserves most of the elements. Benefits including increased biochar yield and water adsorption make the low-temperature pyrolysis unignorable. Biochar under low-temperature pyrolysis (<500° C.) is recognized to be more favorable for plant growth and more easily decomposed (Guo, M. X., et al., *Abstr Pap Am Chem S* 2011, 242).

The biochar derived from relatively high-temperature pyrolysis is more depleted of H and O but possesses a larger proportion of aromatic C in comparison with that from a lower temperature (Heitkotter, J., et al., *Geoderma* 2015, 245, 56-64) and consequently, has great chemical recalcitrance and resistance to microbial and chemical decomposition in soil. The organic matter presents in feedstocks, composed of mostly hydrocarbons, amino-acids or lipids and with a small presence of lignin or cellulose (Kim, D., et al., *J Ind Eng Chem* 2016, 42, 95-100), can lead to an amelioration of soil physical properties, including an improvement in soil structure or attenuating the potential for surface runoff and erosion. The mineralization of the organic matter releases macro and micronutrients essential for crop development, reducing mineral fertilizer use (Rigby, H., et al., *Sci Total Environ* 2016, 541, 1310-1338). Organic matter contributes as an energy source for micro-organisms inhabiting in soil. Therefore, feedstocks with these qualities may increase soil microbial population and activity (Mossa, A. W., et al., *Environ Pollut* 2017, 224, 16-25). Furthermore, different soil constraints require different biochar properties by also recognizing the different crop needs; for example: legume or cereal crops (van Zwieten, L., et al., *Plant Soil* 2010, 327, 235-246). As a result, not all biochar have demonstrated improved crop yield in all instances (Li, S. M., et al., *J Clean Prod* 2019, 215, 890-902, van Zwieten, L., et al. *Aust J Soil Res* 2010, 48, 569-576), and there are significant differences in stability between biochar (Zimmerman, A. R. *Environ Sci Technol* 2010, 44, 1295-1301). In addition, biochar properties change over time in soil and these changes may also be affected by the initial properties of the biochar (Joseph, S. D., et al. *Aust J Soil Res* 2010, 48, 501-515). Therefore, the differences between biochar properties have to be well understood as a function of production conditions and feedstock type, in order to match soil needs with the appropriate biochar type.

Slow pyrolysis has been a well explored and trusted method of biochar production, providing a proficient baseline for comparisons. The pyrolysis-derived suffered from the long heating duration, damage to the reactor wall and even an undesired secondary reaction. Slow pyrolysis requires time for the furnace to reach the desired temperature, as well as the desired time of pyrolysis at the desired temperature. To address these problems, the microwave irradiation has been explored as an innovative alternative heating source for these two main reasons. Compared to a furnace, the amount of time required to meet a comparable pyrolysis temperature is achieved in a fraction of the time (Ge, S. B., et al., *Renew Sust Energ Rev* 2020, 127). Secondly, the merit of microwave mediation is that the rotation of molecules through high frequency and the penetration depth of the microwaves into the materials consequently provide sufficient heat to the materials (Mohamed, B. A., et al., *Bioresource Technol* 2016, 201, 121-132). During such process, the interactions between polar functional groups and free surface charges on the biochar surface and water molecular will concretely transfer the microwave energy to heat energy, facilitated with the mechanism such as interfacial polarization, ionic conduction and dipole polarization (Sara, M., et al., *RSC Advances* 2016, 6, 56009-56017; Foong, S. Y., et al., *Chem Eng J* 2020, 389). Previous studies on various biomass example feedstocks also explored feasibility of microwave radiation in the biochar synthesis with continuous $N_2$ gas and a vacuum (Foong, S. Y., et al., *Chem Eng J* 2020, 389).

Biochar's ability to amend and remediate agricultural soil has been a growing interest, though the energy expenses from high-temperature pyrolysis deter the product's use. Superabsorbent hydrogels have been used to enhance water and nutrient retention in agricultural soils. However, wide applications of these polymeric soil amendments on large farms are plagued by their high costs and environmental footprints.

There is a need for superabsorbent hydrogels with enhanced water and nutrient retention as well as biochar produced efficiently while maintaining the quality. The compositions and methods disclosed herein address these and other needs.

SUMMARY

Provided herein are microwave pyrolysis-derived biochar material, biochar-hydrogel composites and methods of making and using these materials. Described are biochar-hydrogel composites comprising: a hydrogel matrix and a biochar material. In some embodiments, the hydrogel matrix can include a porous structure and a surface. In some embodiments, the biochar material can be uniformly dispersed in the hydrogel matrix porous structure and on the hydrogel matrix surface. In some embodiments, the biochar-hydrogel composite comprises a porous structure with a coarse surface. In some embodiments, the biochar-hydrogel composite has a water absorption capacity of at least 20% after 48 hours.

In some embodiments, the biochar-hydrogel composite can further include a nitrogen source. In some embodiments, the nitrogen source comprises urea, and/or other ammonium- and nitrate-based nitrogen fertilizers. In some embodiments, the nitrogen source comprises urea, nitrate, ammonia, ammonium, urea, ammonium nitrate, calcium nitrate, ammonium sulfate, diammonium phosphate, or any combination thereof. In some embodiments, the nitrogen source can be present in the biochar-hydrogel composite in a concentration of from 0.1% by weight to 10% by weight. In some embodiments, the composite can release at least 20% of a nitrogen content after 30 days. In some embodiments, the biochar material can be present in the biochar-hydrogel composite in a concentration of from 2% by weight to 10% by weight.

In some embodiments, the hydrogel matrix can include a first polymeric material, a second polymeric material, or a combination thereof. In some embodiments, the hydrogel matrix comprises a first polymeric material and a second polymeric material. In some embodiments, the first polymeric material can be present in the biochar-hydrogel composite in a concentration of from 70% by weight to 90% by weight. In some embodiments, the second polymeric material is present in the biochar-hydrogel composite in a concentration of from 8% by weight to 20% by weight. In some embodiments, the biochar material is a slow pyrolysis-derived biochar or a microwave pyrolysis-derived biochar.

Described herein are also methods of making a biochar-hydrogel composite. The method can include irradiating the biochar-hydrogel precursor mixture including a biochar material, a first polymeric material precursor, a second polymeric material precursor, a crosslinker, and an initiator under an inert atmosphere with microwaves to yield the biochar-hydrogel composite. In some embodiments, the biochar-hydrogel precursor mixture can further include a nitrogen source. In some embodiments, the cross-linker can include di(ethyleneglycol) divinyl ether, di(ethylglycol) diacrylate, N,N'-methylene bis(acrylamide), or epichlorohydrin. In some embodiments, the irradiating step lasts from 10 seconds to 15 minutes.

Described herein are also methods of making a microwave pyrolysis-derived biochar material. The method can include pretreating a feedstock material; and irradiating the pretreated feedstock material under an inert atmosphere with microwaves to yield the microwave pyrolysis-derived biochar material with a specific surface area of from 0.5 $m^2/g$ to 8 $m^2/g$. In some embodiments, suitable feedstock material can include but is not limited to biosolid, switchgrass, or water oak leaves.

The details of one or more embodiments of the disclosure are set forth in the accompanying drawings and the description below. Other features, objects, and advantages of the disclosure will be apparent from the description and drawings, and from the claims.

BRIEF DESCRIPTION OF FIGURES

(FIG. 2A) Comparison of all biochar; (FIG. 2B) Slow pyrolysis-derived biochar comparison; (FIG. 2C) Microwave-pyrolysis biochar comparison.

FIGS. 3B and 3D show DTG curves of biosolid and resulting pyrolysis-derived biochar via (FIG. 3B) slow pyrolysis and (FIG. 3D) microwave pyrolysis.

(FIG. 6A) FTIR spectra of biosolid and resulting biochar, (FIG. 6B) FTIR spectra of water oak leaves and resulting biochar, and (FIG. 6C) FTIR spectra of switchgrass and resulting biochar.

FIG. 9A, FIG. 9C, and FIG. 9E; microwave-mediated biochar: FIG.

Figure 9A:
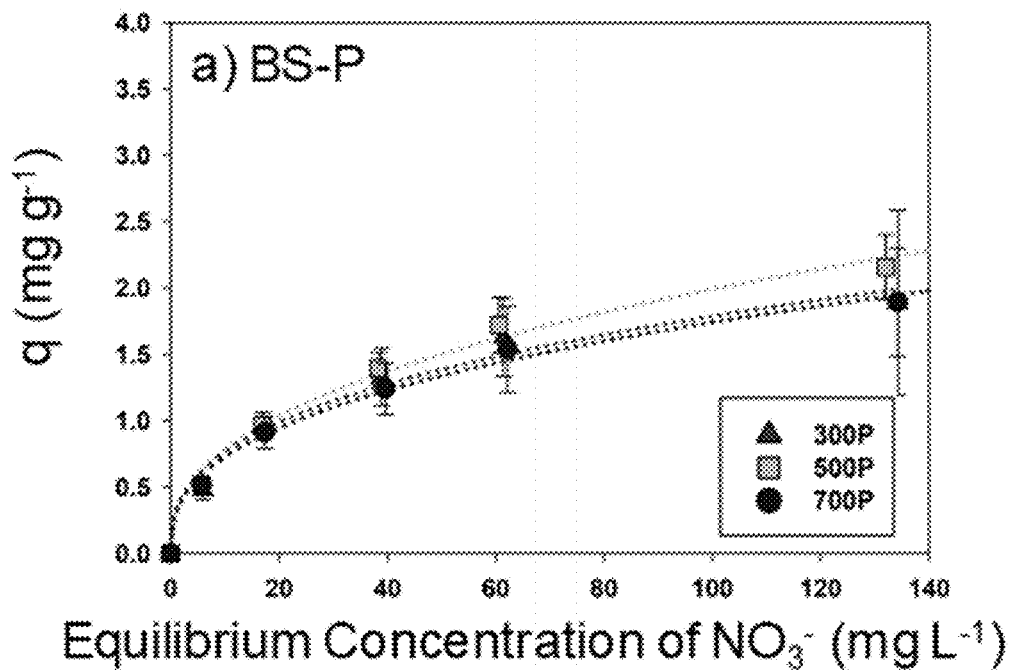
FIGS. 9A-9F show sorption isotherms of $NO_3^-$ for biochar specimens. Pyrolysis-derived biochar.
Figure 9B:
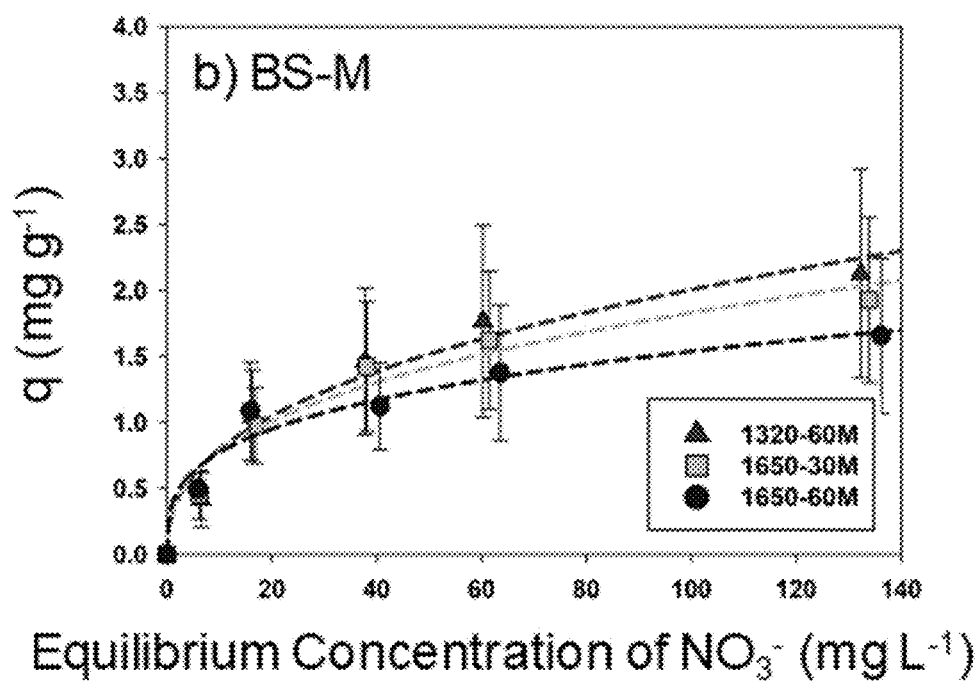
Figure 9C:
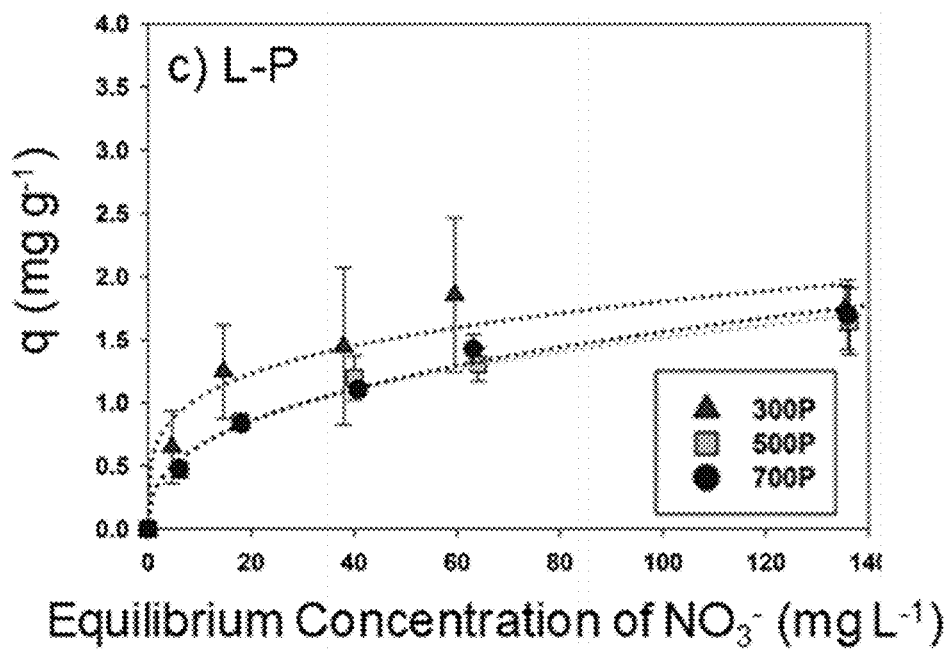
Figure 9D:
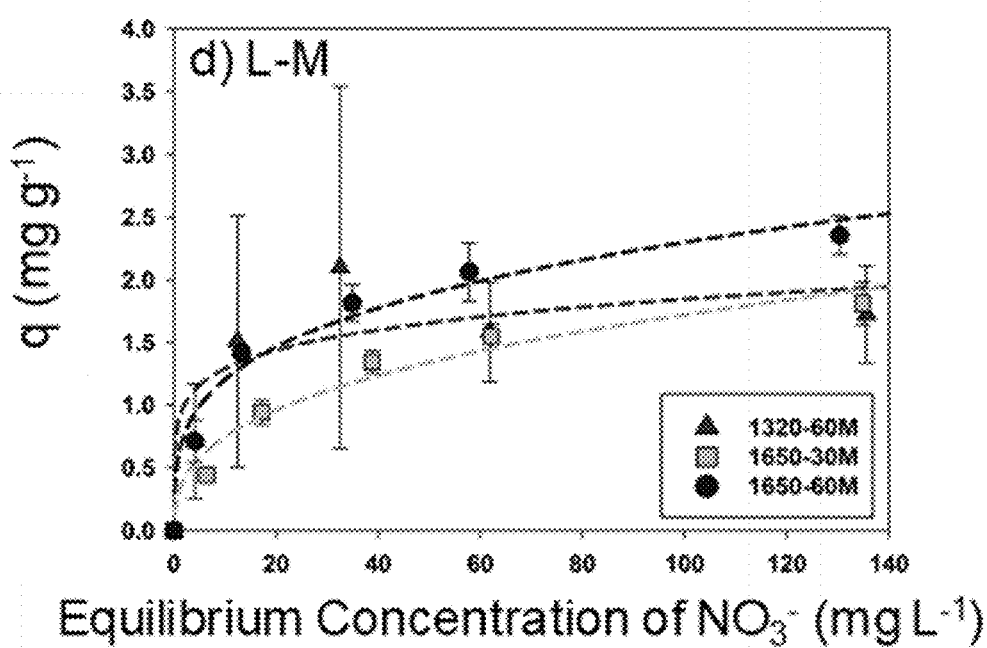
Figure 9E:
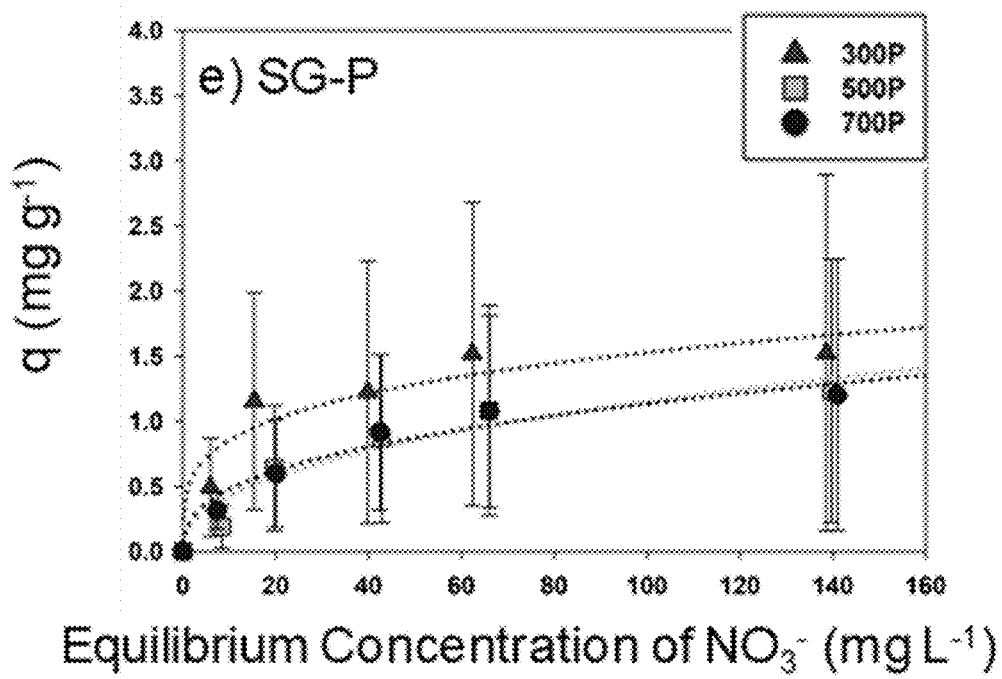
Figure 9F:
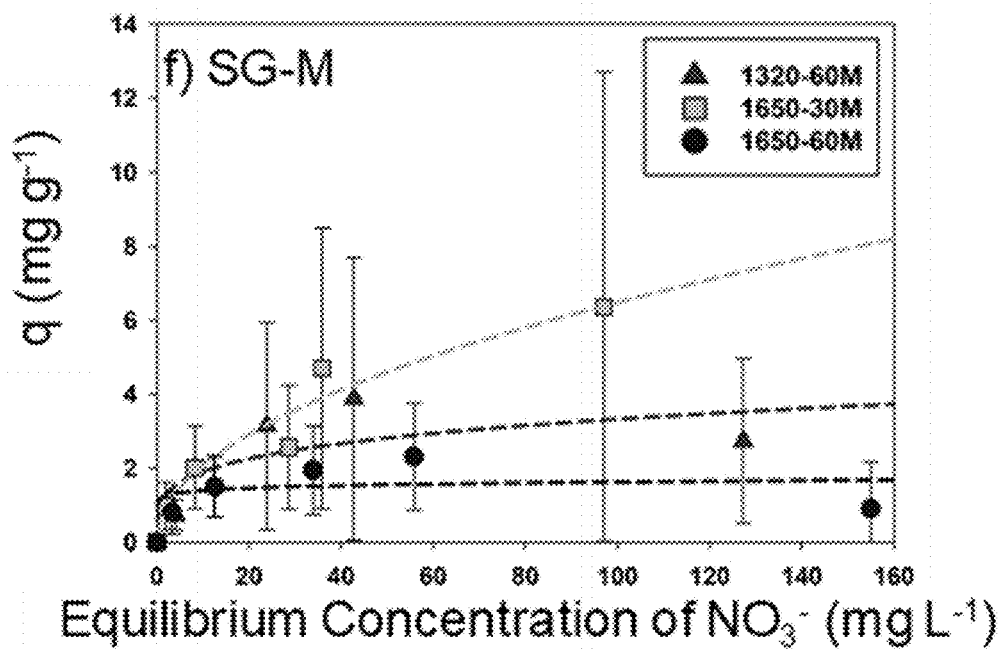
Figures 10A, 10C, 10D:
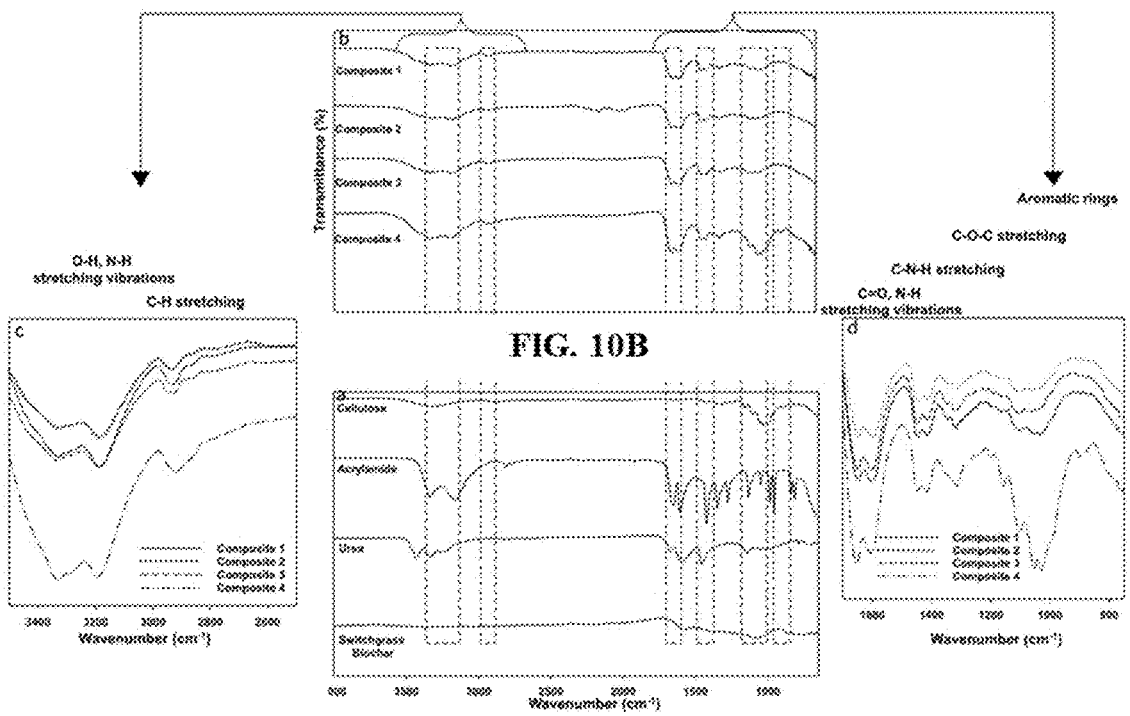

9B, FIG. 9D, and FIG. 9F. (Dashed lines indicate fitted Fruendlich sorption model for respective colored data).

FIG. 10A-10D show FTIR spectra of (10A) raw materials; (10B) hydrogel-biochar composites 1 to 4; (10C) enlarged spectra of hydrogel-biochar composites with wavenumber in the range of 3500 to 2500 $cm^{-1}$ and (10D) enlarged spectra of hydrogel-biochar composites with wavenumber in the range of 1700 to 680 $cm^{-1}$.

FIGS. 11A-11F (11A) show DTG curves of raw materials; (11B) DTG curves of hydrogel-biochar composites 1 to 4; (11C) TG curve of hydrogel-biochar composites 1 to 4; (11D) to (2F) are enlarged TG curves of hydrogel-biochar composites 1 to 4 with temperature in range of 50 to 100, 200 to 300 and 350 to 400, respectively.

FIGS. 12A-12E show SEM images of (FIG. 12A) composite 1; (FIG. 12B) composite 2; (FIG. 12C) composite 3; (FIG. 12D) composite 4 and (FIG. 12E) SG biochar.

Figures 13A, 13B:
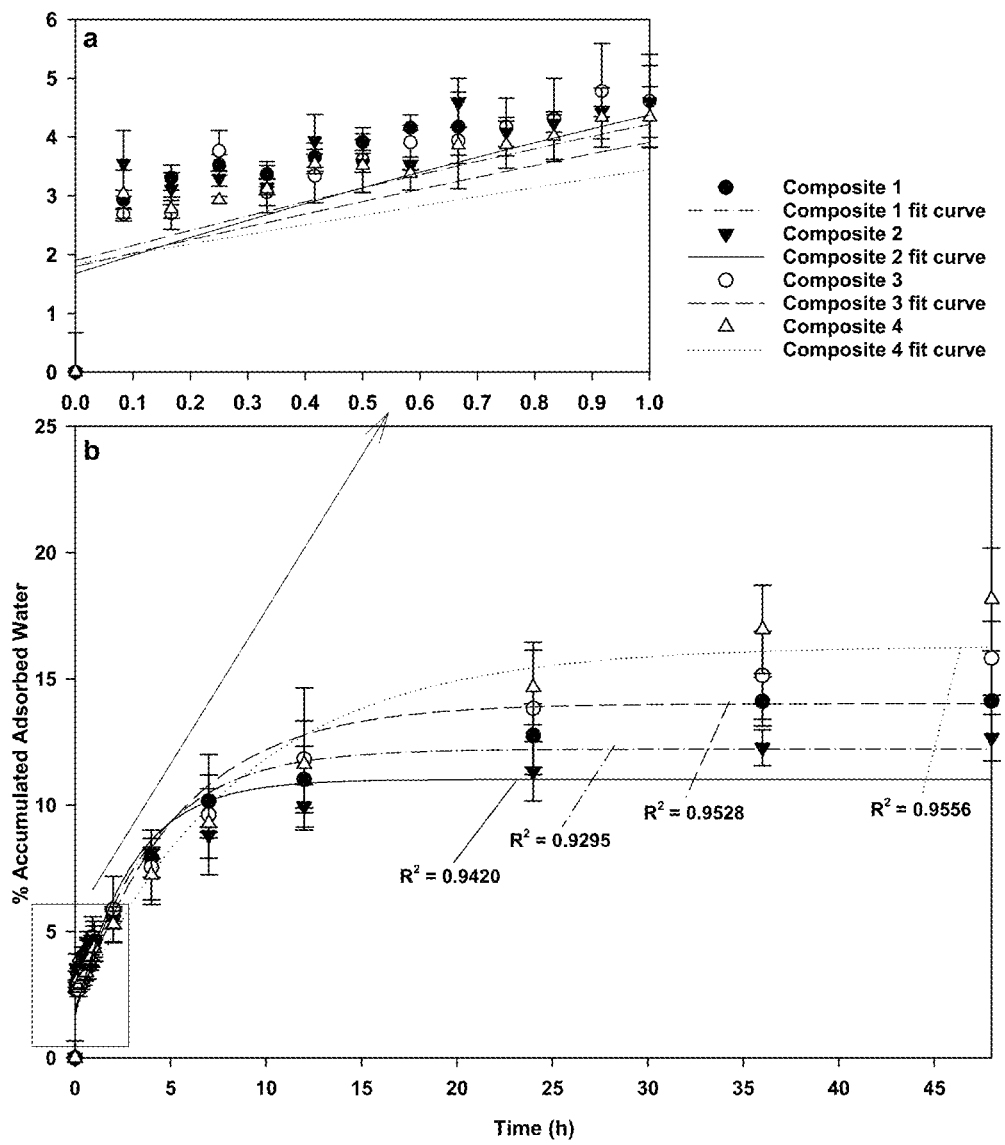

FIG. 13A-13B shows water absorbency capacity (%) of hydrogel-biochar composite (p<0.01) (13A) in first 1 hour and (13B) in 45 hours.

Figures 14A, 14B:
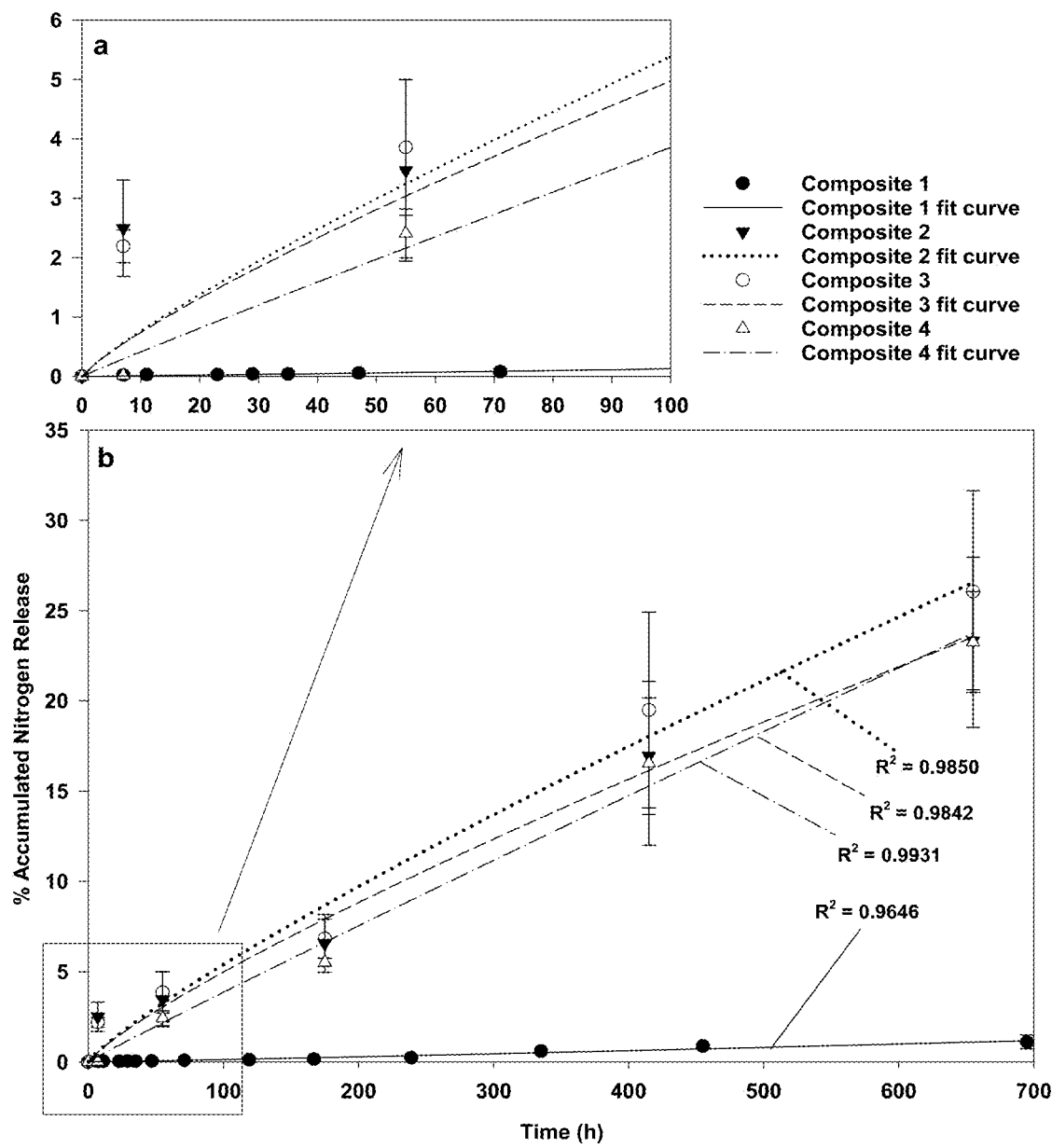

FIG. 14A-14B shows accumulated nitrogen release (%) of hydrogel-biochar composite (p<0.01) (14A) in first 100 hours and (14B) in 700 hours.

Figure 15:
Figure 16A:
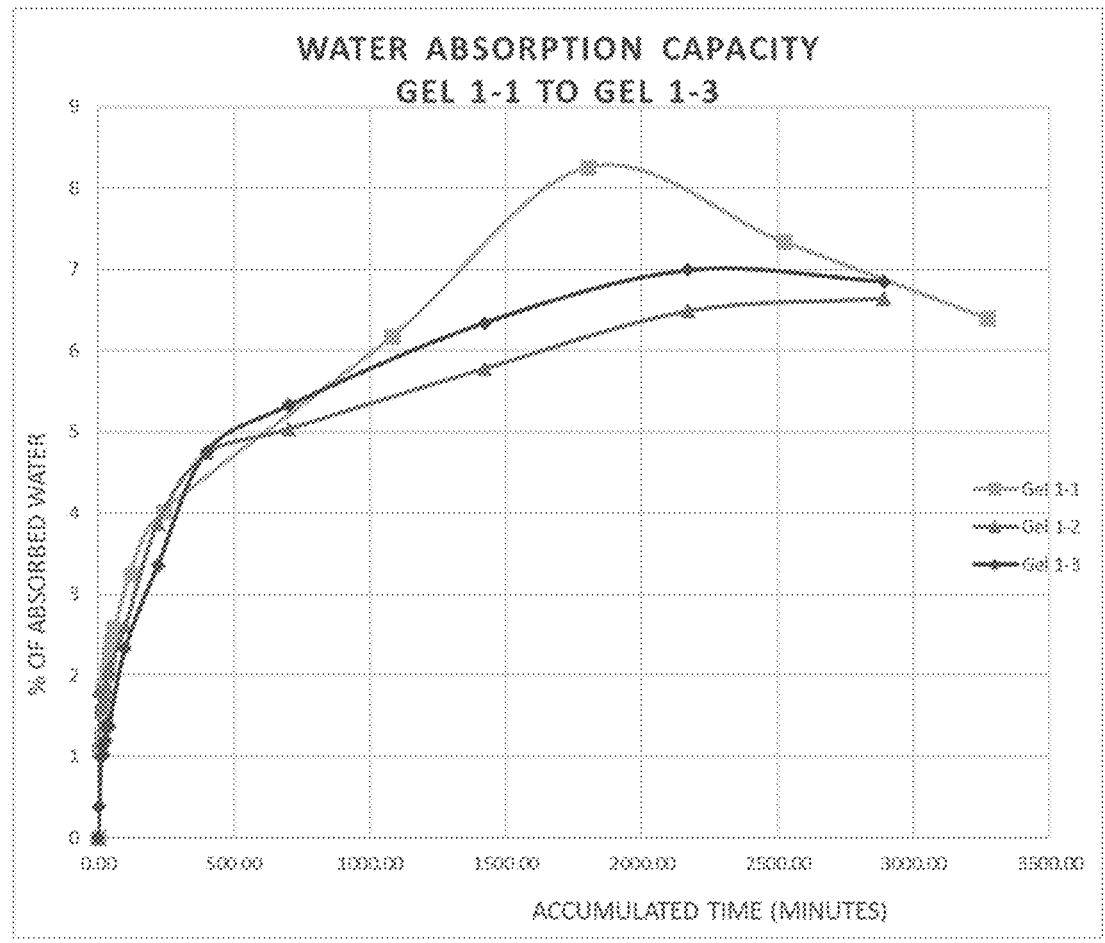
Figure 16B:
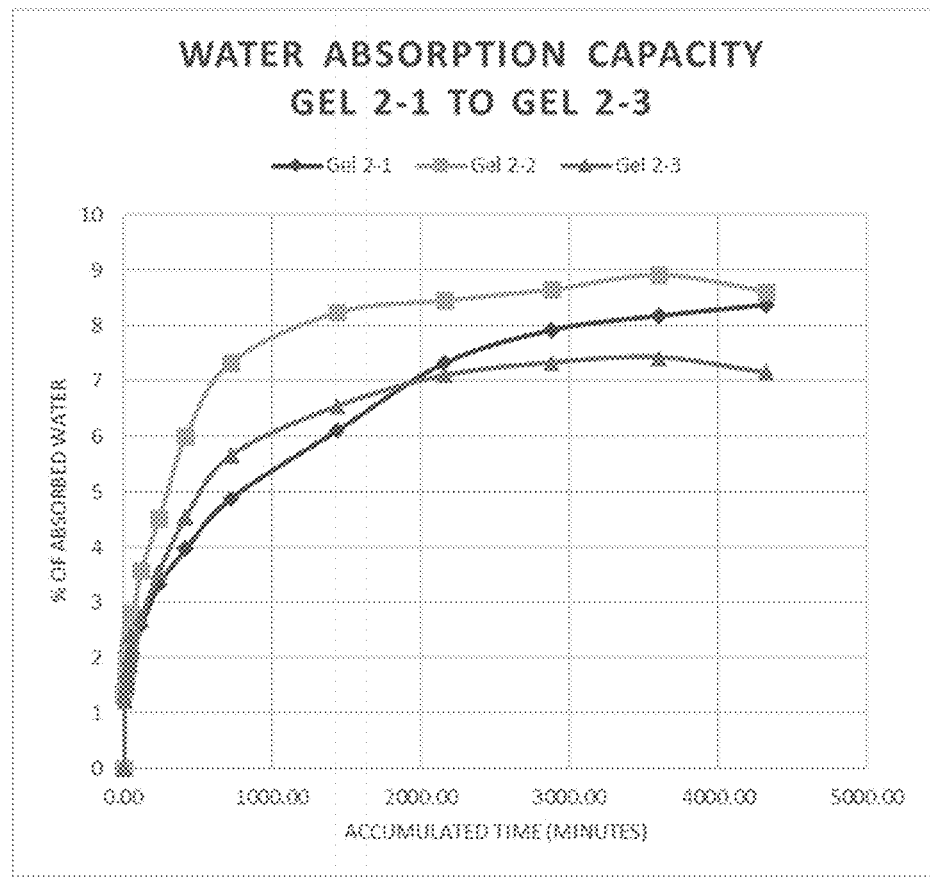
Figure 16C:
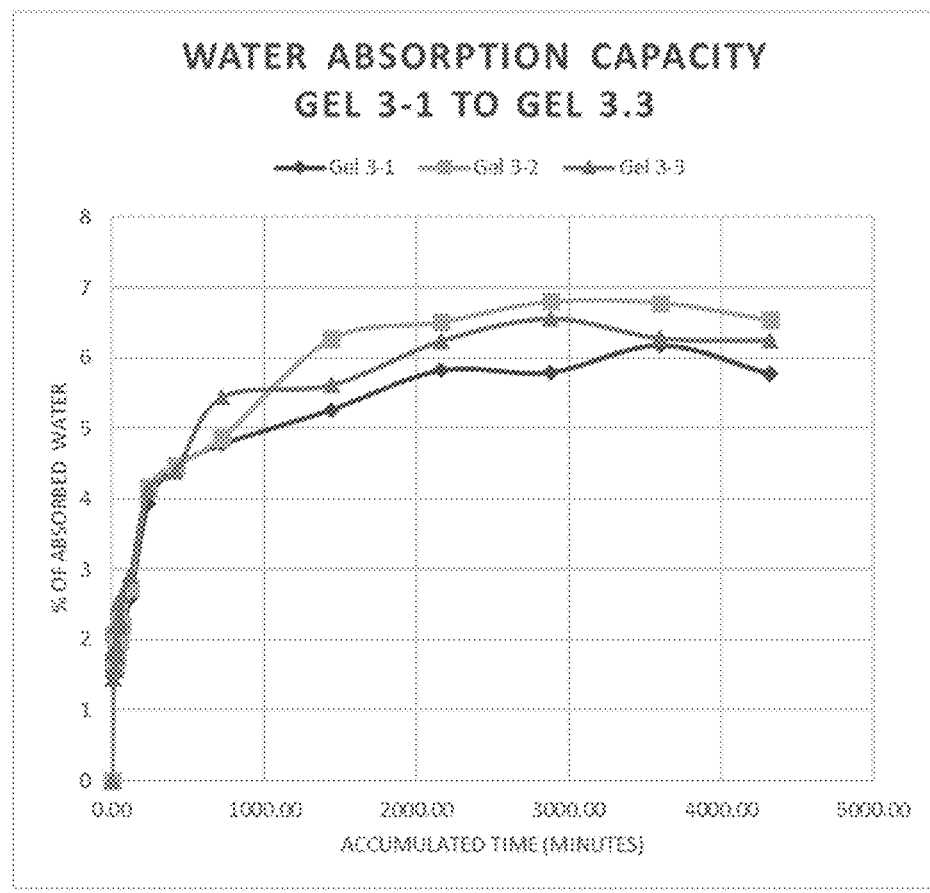
Figure 16D:
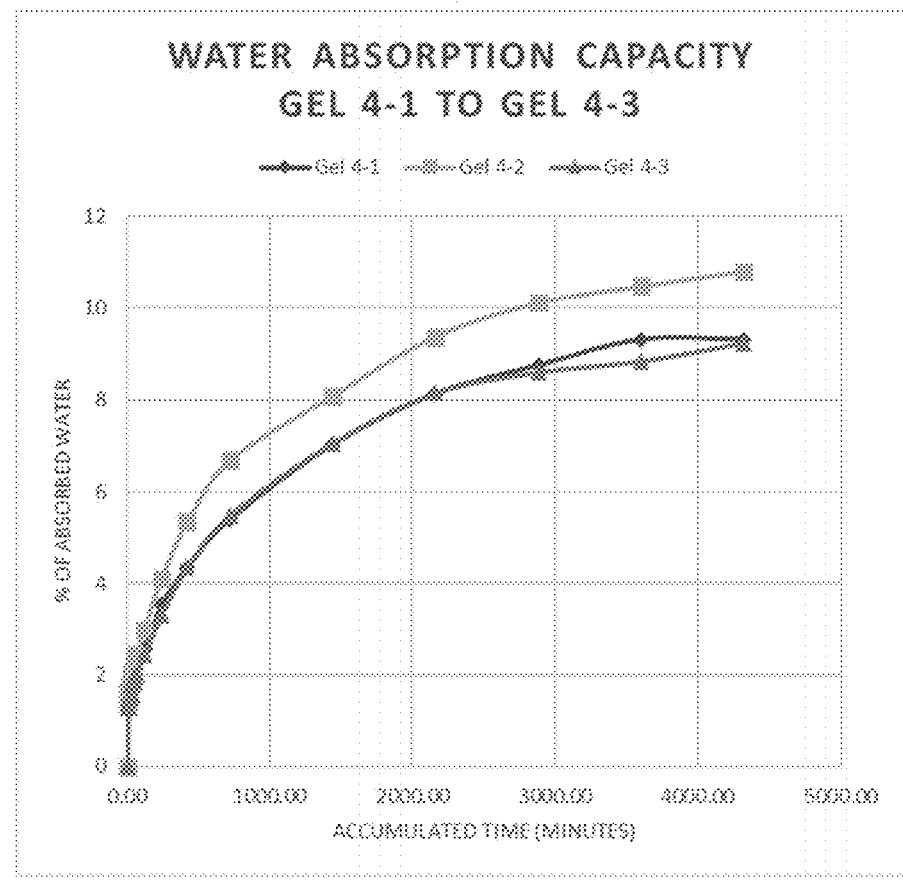
Figure 17A:
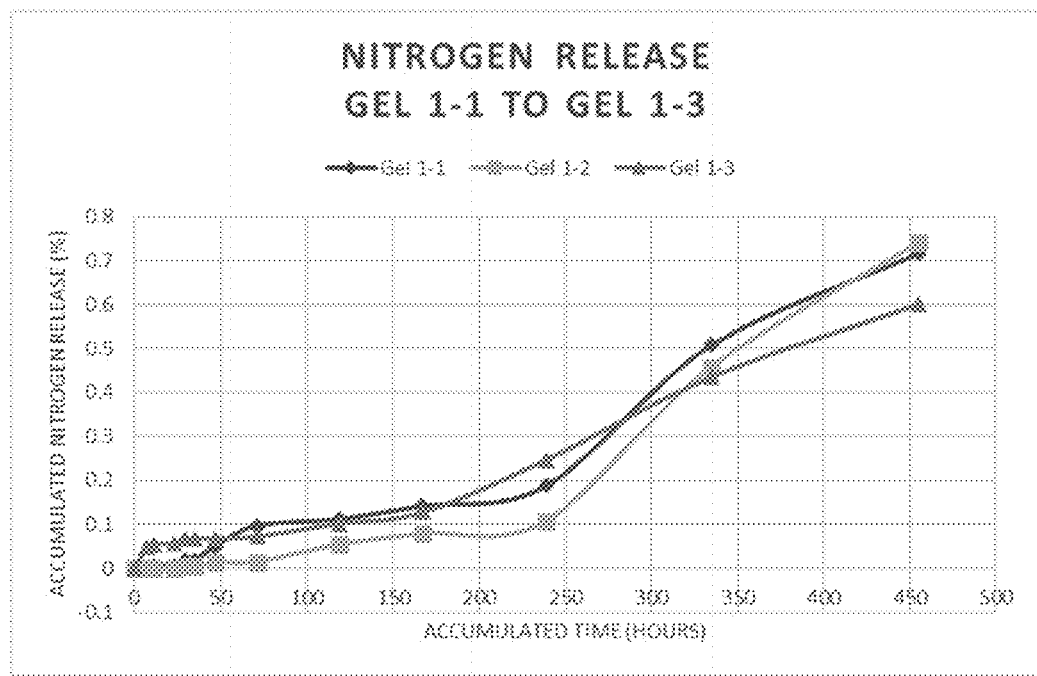
Figure 17B:
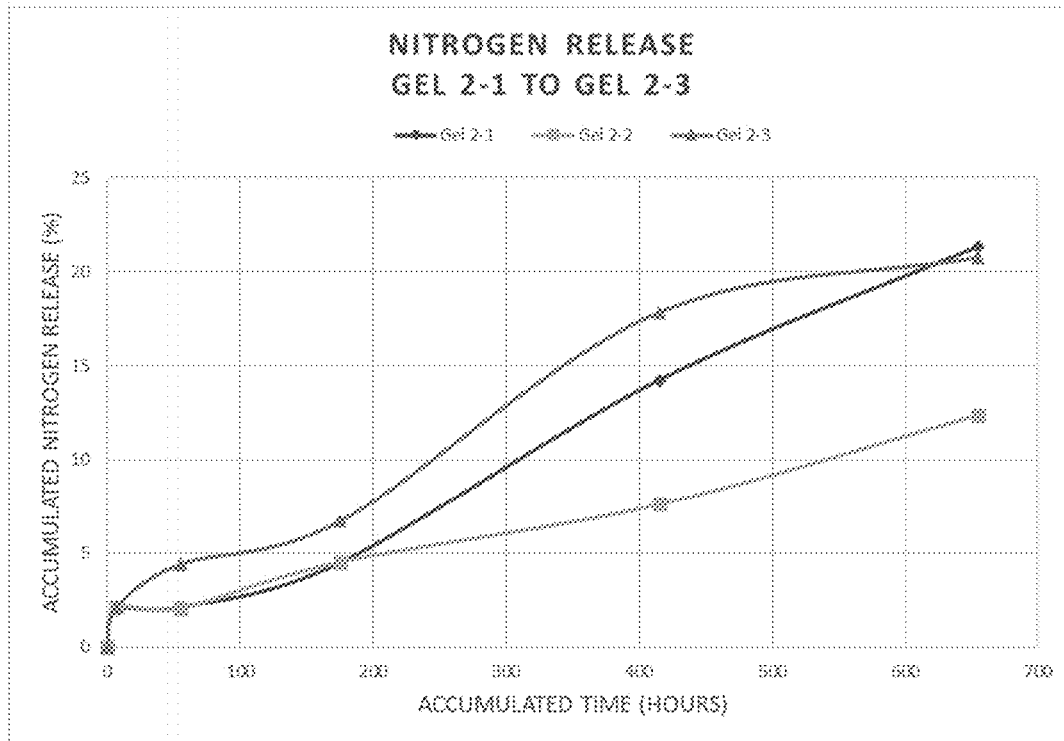
Figure 17C:
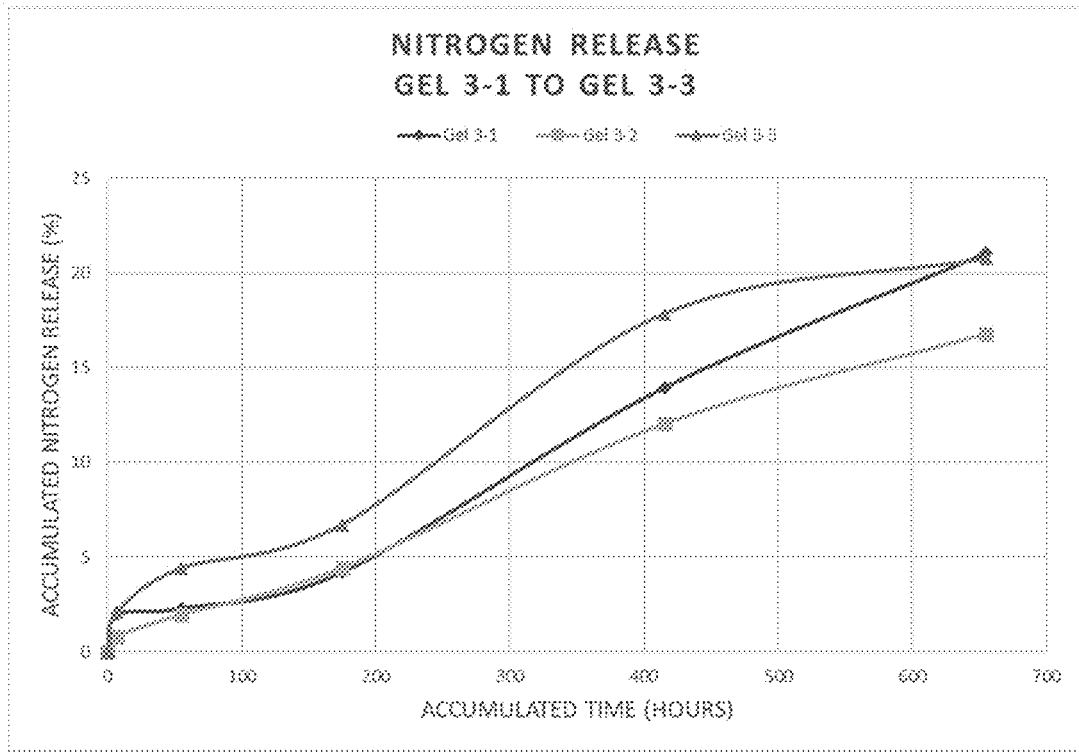
Figure 17D:
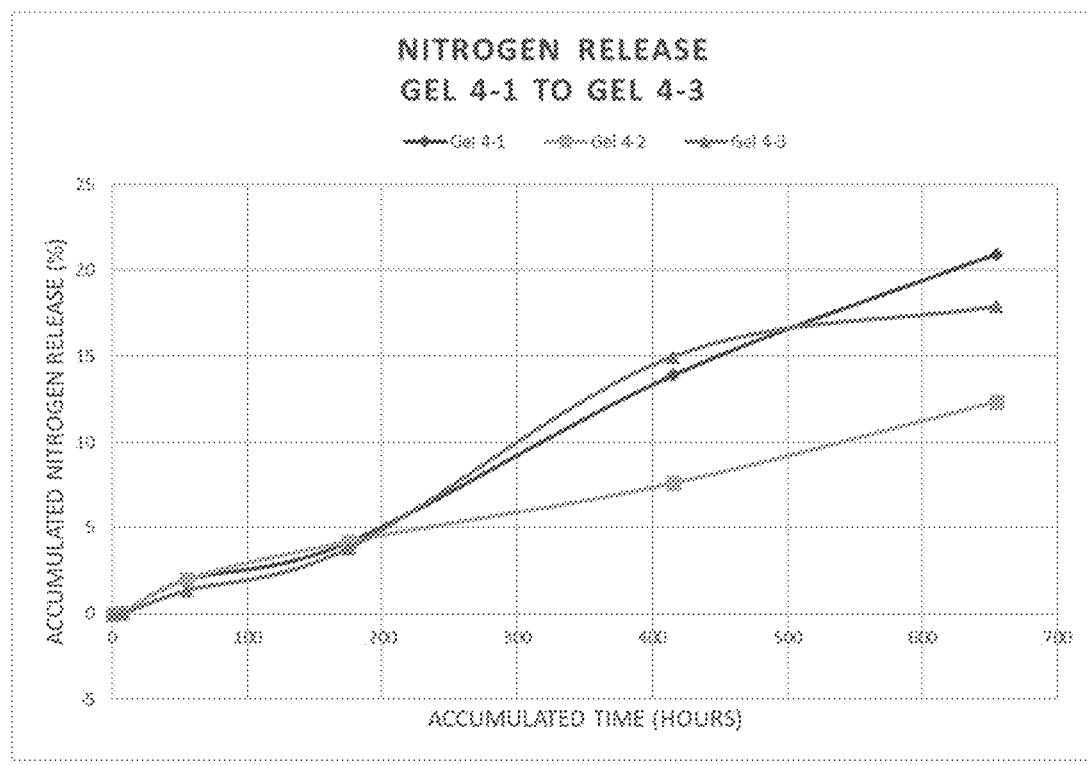

FIG. 15 shows an image of microwave-mediated hydrogel synthesis.

FIGS. 16A-16D show graphs for water absorption capacity for gels 1-1 to 1-3 (16A), gels 2-1 to 2-3 (16B), gels 3-1 to 3-3 (16C), and gels 4-1 to 4-3 (16D). The x-axis is the time in minutes and y-axis is water absorption capacity (% of adsorbed water).

FIGS. 17A-17D show graphs for nitrogen release for gels 1-1 to 1-3 (17A), gels 2-1 to 2-3 (17B), gels 3-1 to 3-3 (17C), and gels 4-1 to 4-3 (17D). The x-axis is the time in hours and y-axis is accumulated nitrogen release (%).

Like reference symbols in the various drawings indicate like elements.

DETAILED DESCRIPTION

Microwave-mediated biochar and biochar-hydrogel composite production will provide an energy-efficient, timesaving, and environmental-friendly way for the synthesis of biochar and biochar-hydrogel composite. Especially, microwave-mediated pyrolysis and polymerization are clear from the organic solvents and byproducts, creating a promising way of green production as an alternative to the current methods of biochar and biochar-hydrogel composite synthesis. Described is a microwave-mediated pyrolysis, polymerization and polymer modification. The rapid dipole rotation by microwave irradiation introduces energy to reactions more efficiently, which significantly speeds up and above processes. Compared to conventional thermal heating, microwave irradiation can be performed at deliberately chosen temperature to shift the reaction equilibrium and kinetics since the absorption of radiation is temperature independent. This process can also achieve stable thermodynamic properties of polymers with no further influence on other reactions, avoiding the deformation of the polymers.

Microwave-mediated biochar and biochar-hydrogel composite synthesis is simple to operate with limited additives. It is also space-saving and can largely reduce the processing costs. The produced biochar and biochar-hydrogel composite are popularly used in agricultural to conserve water and nutrients in response to climate change. By this method, various agricultural; waste can be used as feedstocks for the biochar and biochar-hydrogel composite synthesis.

A number of embodiments of the disclosure have been described. Nevertheless, it will be understood that various modifications may be made without departing from the spirit and scope of the invention. Accordingly, other embodiments are within the scope of the following claims.

Definitions

To facilitate understanding of the disclosure set forth herein, a number of terms are defined below. Unless defined otherwise, all technical and scientific terms used herein generally have the same meaning as commonly understood by one of ordinary skill in the art to which this disclosure belongs. Publications cited herein and the materials for which they are cited are specifically incorporated by reference.

General Definitions

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing quantities of ingredients, reaction conditions, geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a", "an", and "the" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) can includes 10% and also includes 20%, and includes percentages in between 10% and 20%, unless explicitly stated otherwise herein.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein.

As used herein, the terms "may," "optionally," and "may optionally" are used interchangeably and are meant to include cases in which the condition occurs as well as cases in which the condition does not occur. Thus, for example, the statement that a formulation "may include an excipient" is meant to include cases in which the formulation includes an excipient as well as cases in which the formulation does not include an excipient.

Biochar-Hydrogel Composites

The biochar-hydrogel composite can include a hydrogel matrix and a biochar material. The hydrogel matrix can include a porous structure and a surface. The biochar material can be uniformly dispersed on the hydrogel matrix porous structure and on the hydrogel matrix surface. In some embodiments, the biochar-hydrogel composite can include a porous structure with a coarse surface.

In some embodiments, the biochar-hydrogel composite can further include a nitrogen source. Suitable nitrogen sources include but are not limited to urea, or any ammonium- and nitrate-based nitrogen fertilizers can be used. In some embodiments, the nitrogen source comprises urea, nitrate, ammonia, ammonium, urea, ammonium nitrate, calcium nitrate, ammonium sulfate, diammonium phosphate, or any combination thereof.

In some embodiments, the nitrogen source can be present in the biochar-hydrogel composite in a concentration of at least 0.1% by weight, (e.g., at least 0.5%, at least 1% by weight, at least 2% by weight, at least 3% by weight, at least 4% by weight, at least 5% by weight, at least 6% by weight, at least 7% by weight, at least 7.5% by weight, at least 8% by weight, at least 8.5% by weight, at least 9% by weight, or at least 9.5% by weight).

In some embodiments, the nitrogen source can be present in the biochar-hydrogel composite in a concentration of 10% by weight or less, (e.g., 9.5% by weight or less, 9% by weight or less, 8.5% by weight or less, 8% by weight or less, 7.5% by weight or less, 7% by weight or less, 6% by weight or less, 5% by weight or less, 4% by weight or less, 3% by weight or less, 2% by weight or less, 1% by weight or less, or 0.5% by weight or less).

In some embodiments, the nitrogen source can be present in the biochar-hydrogel composite in a concentration ranging from any of the minimum values described above to any of the maximum values described above. For example, in some embodiments, the nitrogen source can be present in the biochar-hydrogel composite in a concentration of from 0.1% by weight to 10% by weight, (e.g., from 0.5% by weight to 10% by weight, from 1% by weight to 10% by weight, from 2% by weight to 10% by weight, from 3% by weight to 10% by weight, from 4% by weight to 10% by weight, from 5% by weight to 10% by weight, from 6% by weight to 10% by weight, from 5% by weight to 8% by weight, from 7% by weight to 10% by weight, from 7% by weight to 9% by weight, 7% by weight to 8% by weight, 7.5% by weight to 8% by weight, 7% by weight to 7.5% by weight, 7.5 by weight to 9% by weight, 8% by weight to 10% by weight, 9% by weight to 10% by weight, or 7.5% by weight to 8% by weight).

In some embodiments, the biochar-hydrogel composite can release at least 20% of a nitrogen content, (e.g., at least 30%, at least 40%, at least 50%, at least 60%, at least 70%, or at least 80%). In some embodiments, the biochar-hydrogel composite can release 95% or less of a nitrogen content, (e.g., 80% or less, 70% or less, 60% or less, 50% or less, 40% or less, 30% or less).

The biochar-hydrogel composite can release a nitrogen content ranging from any of the minimum values described above to any of the maximum values described above. For example, in some embodiments, the biochar-hydrogel composite releases from 20% to 95% of a nitrogen content (e.g., from 20% to 80%, from 20% to 70%, from 20% to 60%, from 20% to 50%, from 20% to 40%, from 20% to 30%, from 30% to 40%, from 30% to 50%, from 30% to 60%, from 30% to 70%, from 30% to 80%, from 40% to 50%, from 40% to 60%, from 40% to 70%, from 40% to 80%, from 50% to 60%, from 50% to 70%, from 50% to 80%, from 60% to 70%, from 60% to 80%, or from 70% to 80%).

In some embodiment, the biochar-hydrogel can release from 20% to 95% of a nitrogen content after a period of at least 3 days, (e.g., at least 5 days, at least 10 days, at least 15 days, at least 20 days, at least 25 days, at least 30 days, at least 45 days, at least 60 days). In some embodiment, the biochar-hydrogel can release from 20% to 95% of a nitrogen content after a period of 90 days or less, (e.g., 60 days or less, 45 days or less, 30 days or less, 25 days or less, 20 days or less, 15 days or less, 10 days or less, 5 days or less).

The biochar-hydrogel composite can release 20% to 95% of a nitrogen content after a period ranging from any of the minimum values described above to any of the maximum values described above. For example, in some embodiments, the biochar-hydrogel can release from 20% to 95% of a nitrogen content after a period of from 3 days to 90 days, (e.g., from 5 days to 90 days, from 5 days to 60 days, from 10 days to 60 days, from 15 days to 60 days, from 20 days to 60 days, from 25 days to 60 days, from 30 days to 60 days, from 45 days to 60 days, from 5 days to 45 days, from 10 days to 45 days, from 15 days to 45 days, from 20 days to 45 days, from 25 days to 45 days, from 30 days to 45 days, from 5 days to 30 days, from 10 days to 30 days, from 15 days to 30 days, from 20 days to 30 days, from 25 days to 30 days, from 5 days to 15 days, from 10 days to 15 days, from 5 days to 10 days, from 3 days to 10 days, from 3 days to 15 days, from 3 days to 45 days, from 3 days to 60 days, from 3 days to 90 days, from 10 days to 90 days, from 15 days to 90 days, from 20 days to 90 days, from 25 days to 90 days, or from 30 days to 90 days, or from 60 days to 90 days).

In some embodiments, the biochar-hydrogel can release at least 20% of a nitrogen content after 15 days. In some embodiments, the biochar-hydrogel composite can release at least 20% of a nitrogen content after 30 days. In some embodiments, the biochar-hydrogel can release 70% or less of a nitrogen content after 15 days. In some embodiments, the biochar-hydrogel composite can release 70% or less of a nitrogen content after 30 days.

In some embodiments, the biochar-hydrogel composite can have a water absorption capacity of at least 5%, (e.g., at least 6%, at least 7%, at least 8%, at least 9%, at least 10%, at least 11%, at least 12%, at least 13%, at least 14%, or at least 15%). In some embodiments, the biochar-hydrogel composite can have a water absorption capacity of 25% or less, (e.g., 20% or less, 19% or less, 18% or less, 16% or less, 15% or less, 14% or less, 13% or less, 12% or less, 11% or less, 10% or less, 9% or less, 8% or less, 7% or less, 6% or less). In some embodiments, the biochar-hydrogel composite can have a water absorption capacity of at least 5% after a period of at least 48 hours. In some embodiments, the biochar-hydrogel composite can have a water absorption capacity of at least 10% after a period of at least 48 hours. In some embodiments, the biochar-hydrogel composite can have a water absorption capacity of 25% or less after a period of at least 48 hours. In some embodiments, the biochar-hydrogel composite can have a water absorption capacity of 20% or less after a period of at least 48 hours.

The biochar-hydrogel composite can have a water absorption capacity ranging from any of the minimum values described above to any of the maximum values described above. For example, in some embodiments, the biochar-hydrogel composite can have a water absorption capacity of from 5% to 25% (e.g., from 5% to 20%, from 10% to 20%, from 15% to 20%, from 10% to 25%, from 15% to 25%, from 20% to 25%, from 5% to 15%, from 10% to 15%, from 5% to 10%). In some embodiments, the biochar-hydrogel composite can have a water absorption capacity of from 5% to 25% after a period of at least 48 hours.

In some embodiments, the biochar material can be a slow pyrolysis-derived biochar material. In some embodiments, the biochar material can be a microwave pyrolysis-derived biochar material.

In some embodiments, the biochar material is present in the biochar-hydrogel composite in a concentration of at least 2% by weight, (e.g., at least 3% by weight, at least 4% by weight, at least 5% by weight, at least 6% by weight, at least 7% by weight, at least 8% by weight, or at least 9% by weight). In some embodiments, the biochar material is present in the biochar-hydrogel composite in a concentration of 10% by weight or less, (e.g., 9.5% by weight or less, 9% by weight or less, 8.5% by weight or less, 8% by weight or less, 7.5% by weight or less, 7% by weight or less, 6.5% by weight or less, 6% by weight or less, 5.5% by weight or less, 5% by weight or less, 4.5% by weight or less, 4% by weight or less, 3.5% by weight or less, or 3% by weight or less).

The biochar material is present in the biochar-hydrogel composite in a concentration ranging from any of the minimum values described above to any of the maximum values described above. For example, in some embodiments, the biochar material is present in the biochar-hydrogel composite in a concentration of from 2% by weight to 10% by weight, (e.g., from 2% by weight to 3% by weight, from 2% by weight to 5% by weight, from 2% by weight to 7.5% by weight, from 2.5% by weight to 7.5% by weight, from 2.5% by weight to 5% by weight, from 2.5% by weight to 10% by weight, from 5% by weight to 7.5% by weight, from 5% by weight to 10% by weight, or from 7.5% by weight to 10% by weight).

In some embodiments, the biochar can have an average pore size of from 2 μm to 10 μm, (from 2 μm to 9 μm, from 2 μm to 8 μm, from 2 μm to 7 μm, from 2 μm to 6 μm, from 2 μm to 5 μm, from 2 μm to 4 μm, from 2 μm to 3 μm, from 3 μm to 10 μm, from 3 μm to 9 μm, from 3 μm to 8 μm, from 3 μm to 7 μm, from 3 μm to 6 μm, from 3 μm to 5 μm, from 3 μm to 4 μm, from 4 μm to 10 μm, from 4 μm to 9 μm, from 4 μm to 8 μm, from 4 μm to 7 μm, from 4 μm to 6 μm, from 4 μm to 5 μm, from 5 μm to 10 μm, from 5 μm to 9 μm, from 5 μm to 8 μm, from 5 μm to 7 μm, from 5 μm to 6 μm, from 6 μm to 10 μm, from 6 μm to 9 μm, from 6 μm to 8 μm, from 6 μm to 7 μm, from 7 μm to 10 μm, from 7 μm to 9 μm, from 7 μm to 8 μm, from 8 μm to 10 μm, from 8 μm to 9 μm, or from 9 μm to 10 μm.

Biochar Material

The biochar-hydrogel composite can include a biochar material. The biochar material can be uniformly dispersed on the hydrogel matrix porous structure and on the hydrogel matrix surface. In some embodiments, the biochar material can be a slow pyrolysis-derived biochar material. In some embodiments, the biochar material can be a microwave pyrolysis-derived biochar material.

In some embodiments, the biochar material can have a specific surface area of from 0.2 $m^2/g$ to 50 $m^2/g$ (e.g., from 0.5 $m^2/g$ to 45 $m^2/g$, from 0.5 $m^2/g$ to 40 $m^2/g$, from 0.5 $m^2/g$ to 35 $m^2/g$, from 0.5 $m^2/g$ to 30 $m^2/g$, from 0.5 $m^2/g$ to 25 $m^2/g$, from 0.5 $m^2/g$ to 20 $m^2/g$, from 0.5 $m^2/g$ to 15 $m^2/g$, from 0.5 $m^2/g$ to 10 $m^2/g$, from 0.5 $m^2/g$ to 5 $m^2/g$, from 0.5 $m^2/g$ to 2.5 $m^2/g$, from 0.5 $m^2/g$ to 2 $m^2/g$, from 0.5 $m^2/g$ to 1.5 $m^2/g$, from 0.5 $m^2/g$ to 1 $m^2/g$, from 2 $m^2/g$ to 50 $m^2/g$, from 2 $m^2/g$ to 40 $m^2/g$, from 2 $m^2/g$ to 30 $m^2/g$, from 2 $m^2/g$ to 20 $m^2/g$, from 2 $m^2/g$ to 15 $m^2/g$, from 2 $m^2/g$ to 10 $m^2/g$, from 2 $m^2/g$ to 5 $m^2/g$, from 5 $m^2/g$ to 10 $m^2/g$, from 5 $m^2/g$ to 20 $m^2/g$, from 5 $m^2/g$ to 40 $m^2/g$, from 5 $m^2/g$ to 50 $m^2/g$, from 10 $m^2/g$ to 50 $m^2/g$, from 10 $m^2/g$ to 40 $m^2/g$, from 10 $m^2/g$ to 30 $m^2/g$, from 10 $m^2/g$ to 25 $m^2/g$, from 10 $m^2/g$ to 20 $m^2/g$, from 10 $m^2/g$ to 15 $m^2/g$, from 20 $m^2/g$ to 50 $m^2/g$, from 20 $m^2/g$ to 45 $m^2/g$, from 20 $m^2/g$ to 40 $m^2/g$, from 20 $m^2/g$ to 35 $m^2/g$, from 20 $m^2/g$ to 30 $m^2/g$, from 30 $m^2/g$ to 40 $m^2/g$, or from 30 $m^2/g$ to 50 $m^2/g$).

In some embodiments, the biochar material can be a microwave pyrolysis-derived biochar material with a specific surface area of from 0.5 $m^2/g$ to 8 $m^2/g$, (e.g., from 0.5 $m^2/g$ to 7 $m^2/g$, from 0.5 $m^2/g$ to 6 $m^2/g$, from 0.5 $m^2/g$ to 5 $m^2/g$, from 0.5 $m^2/g$ to 4 $m^2/g$, from 0.5 $m^2/g$ to 3 $m^2/g$, from 0.5 $m^2/g$ to 2 $m^2/g$, from 0.5 $m^2/g$ to 1 $m^2/g$, from 1 $m^2/g$ to 8 $m^2/g$, from 1 $m^2/g$ to 7 $m^2/g$, from 1 $m^2/g$ to 6 $m^2/g$, from 1 $m^2/g$ to 5 $m^2/g$, from 1 $m^2/g$ to 4 $m^2/g$, from 1 $m^2/g$ to 3 $m^2/g$, from 1 $m^2/g$ to 2 $m^2/g$, from 2 $m^2/g$ to 8 $m^2/g$, from 2 $m^2/g$ to 7 $m^2/g$, from 2 $m^2/g$ to 6 $m^2/g$, from 2 $m^2/g$ to 5 $m^2/g$, from 2 $m^2/g$ to 4 $m^2/g$, from 2 $m^2/g$ to 3 $m^2/g$, from 3 $m^2/g$ to 8 $m^2/g$, from 3 $m^2/g$ to 7 $m^2/g$, from 3 $m^2/g$ to 6 $m^2/g$, from 3 $m^2/g$ to 5 $m^2/g$, from 3 $m^2/g$ to 4 $m^2/g$, from 4 $m^2/g$ to 8 $m^2/g$, from 4 $m^2/g$ to 7 $m^2/g$, from 4 $m^2/g$ to 6 $m^2/g$, from 4 $m^2/g$ to 5 $m^2/g$, from 5 $m^2/g$ to 8 $m^2/g$, from 5 $m^2/g$ to 7 $m^2/g$, from 5 $m^2/g$ to 6 $m^2/g$, from 6 $m^2/g$ to 8 $m^2/g$, from 6 $m^2/g$ to 7 $m^2/g$, or from 7 $m^2/g$ to 8 $m^2/g$).

In some embodiments, the microwave pyrolysis-derived biochar material can be a microwave pyrolysis-derived biochar material prepared by a method described herein.

In some embodiments, the microwave pyrolysis-derived biochar material can absorb at least 0.5 mg of nitrate per gram of microwave pyrolysis-derived biochar material (e.g., at least 0.5 mg/g, at least 1 mg/g, at least 2 mg/g, at least 3 mg/g, at least 4 mg/g, at least 5 mg/g, at least 6 mg/g, at least 7 mg/g, at least 8 mg/g, at least 9 mg/g, or at least 10 mg/g). In some embodiments, the microwave pyrolysis-derived biochar material can absorb at least 6 mg of nitrate per gram of microwave pyrolysis-derived biochar material.

In some embodiments, the microwave pyrolysis-derived biochar material can absorb nitrate at least 4 times more than a slow-pyrolysis derived biochar material (e.g., at least 5 times, at least 6 times, at least 7 times, at least 8 times, at least 9 times, at least 10 times).

Hydrogel Matrix

The biochar-hydrogel composite can include a hydrogel matrix. The hydrogel matrix can include a porous structure and a surface.

In some embodiments, the hydrogel matrix can include a first polymeric material, a second polymeric material, or any combination thereof. In some embodiments, the hydrogel matrix comprises a first polymeric material and a second polymeric material. In some embodiments, the hydrogel matrix can include a second polymeric material. In some embodiments, the hydrogel matrix can further include a crosslinker.

In some embodiments, suitable first polymeric material can include but are not limited to poly(caprolactone) (PCL), ethylene vinyl acetate polymer (EVA), poly(lactic acid) (LA), poly(L-lactic acid) (PLLA), poly(glycolic acid) (PGA), poly(lactic acid-co-glycolic acid) (PLGA), poly(L-lactic acid-co-glycolic acid) (PLLGA), poly(D,L-lactide) (PDLA), poly(L-lactide) (PLLA), poly(D,L-lactide-co-caprolactone), poly(D,L-lactide-co-caprolactone-co-glycolide), poly(D,L-lactide-co-PEO-co-D,L-lactide), poly(D,L-lactide-co-PPO-co-D,L-lactide), polyurethane, poly-L-lysine (PLL), hydroxypropyl methacrylate (HFMA), hydroxyethyl methacrylate, polyacrylamide, polyethyleneglycol, poly-L-glutamic acid, poly(hydroxy acids), polyanhydrides, polyorthoesters, poly(ester amides), polyamides, poly(ester ethers), polycarbonates, polyalkylenes such as polyethylene and polypropylene, polyalkylene glycols such as poly(ethylene glycol) (PEG), polyalkylene oxides (PEO), polyalkylene terephthalates such as poly(ethylene terephthalate), polyvinyl alcohols (PVA), polyvinyl ethers, polyvinyl esters such. as poly(vinyl acetate), polyvinyl halides such as poly(vinyl chloride) (PVC), polyvinylpyrrolidone, polysiloxanes, polystyrene (PS), polyurethanes, polyacrylic acids such as poly(methyl(meth)acrylate) (PMMA), poly(ethyl(meth)acrylate), poly(butyl(meth)acrylate), poly(isobutyl(meth)acrylate), poly(hexyl(meth)acrylate), poly(isodecyl(meth)acrylate), poly(lauryl(meth)acrylate), poly(phenyl(meth)acrylate), poly(methyl acrylate), poly(isopropyl acrylate), poly(isobutyl acrylate), poly(octadecyl acrylate), polydioxanone, polyhydroxyalkanoates, poly(propylene fumarate), polyoxymethylene, poloxamers, poly(ortho)esters, poly(butyric acid), poly(valeric acid), poly(lactide-co-caprolactone), trimethylene carbonate, copolymers or mixtures thereof.

In some embodiments, the first polymeric material can include polyvinyl alcohol, polyvinyl pyrrolidone, polyalkylene glycols such as poly(ethylene glycol), polyalkylene oxides, hydroxypropyl methacrylate, hydroxyethyl methacrylate, polyacrylamide, copolymers or mixtures thereof. In some embodiments, the first polymeric material can polyacrylamide copolymers or mixtures thereof. In some embodiments, the first polymeric material can include polyvinyl alcohol, polyacrylamide, copolymers or mixtures thereof.

In some embodiments, suitable second polymeric material can include but are not limited to gelatin, chitosan, alginate, gellan gum, cellulose, derivatized celluloses such as alkyl celluloses, hydroxyalkyl celluloses, cellulose ethers, cellulose esters, nitro celluloses, hydroxypropylcellulose, carboxymethylcellulose; copolymers or mixtures thereof.

In some embodiments, suitable cross-linkers can include but are not limited to di(ethyleneglycol) divinyl ether, di(ethylglycol) diacrylate, and N,N'-methylene bis(acrylamide) or epichlorohydrin. In some embodiments, the cross-linkers can include N,N'-methylene bis(acrylamide) or epichlorohydrin.

Methods of Making

Described herein are also methods of making a biochar-hydrogel composite, the method comprising irradiating a biochar-hydrogel precursor mixture including a biochar material, a first polymeric material precursor, a second polymeric material precursor, a crosslinker, and an initiator to form a biochar-hydrogel precursor mixture under an inert atmosphere with microwaves to yield the biochar-hydrogel composite. In some embodiments, the biochar-hydrogel precursor mixture can further include a nitrogen source.

In some embodiments, suitable first polymeric material precursor can include but are not limited to cyclodextrin, caprolactone, acrylic acids, lactic acid, glycolic acid, lactide, butyric acid, valeric acid, glutamic acid, amides, ester ethers, carbonates, lysine, alkylenes such as ethylene and propylene, alkylene terephthalates such as ethylene terephthalate, vinyl ethers, ethylene vinyl acetate, vinyl esters such as vinyl acetate, vinyl halides such as vinyl chloride, siloxanes, styrene, urethanes, dioxanone, hydroxyalkanoates, propylene fumarate, oxymethylene, poloxamers, ortho esters, trimethylene carbonate, vinyl alcohol, vinyl pyrrolidone, alkylene glycols such as ethylene glycol, alkylene oxides, hydroxypropyl methacrylate, hydroxyethyl methacrylate, acrylamide, or combinations thereof.

In some embodiments, the first polymeric material precursor can include vinyl alcohol, vinyl pyrrolidone, alkylene glycols such as ethylene glycol, alkylene oxides, hydroxypropyl methacrylate, hydroxyethyl methacrylate, acrylamide, or combinations thereof.

In some embodiments, suitable first polymeric material precursor can include but are not limited to acrylamide copolymers or mixtures thereof. In some embodiments, the first polymeric material precursor can include vinyl alcohol, acrylamide, or combinations thereof.

In some embodiments, suitable first polymeric material precursor can include but are not limited to gelatin, chitosan, alginate, gellan gum, cellulose, derivatized celluloses such as alkyl celluloses, hydroxyalkyl celluloses, cellulose ethers, cellulose esters, nitro celluloses, hydroxypropylcellulose, or carboxymethylcellulose; or any combination thereof.

In some embodiments precursors can react using initiators. An initiator group is a chemical group capable of initiating a free radical polymerization reaction. For instance, it may be present as a separate component, or as a pendent group on a precursor. Initiator groups can include thermal initiators, photoactivatable initiators, or oxidation-reduction (redox) systems. Examples of initiators include 4,4' azobis (4-cyanopentanoic acid) groups, analogs of benzoyl peroxide groups, and persulfates such as sodium, potassium, or ammonium persulfate. The initiators can be used to initiate free radical crosslinking reactions to form a hydrogel matrix with the aforementioned polymeric material precursors.

In some embodiments, the microwaves can have a frequency and energy sufficient to heat the biochar-hydrogel precursor mixture to a temperature sufficient to yield the biochar-hydrogel composite.

In some embodiments, the microwaves can have a frequency of from 0.3 GHz to 50 GHz, (e.g., 0.3 GHz to 25 GHz, 0.3 GHz to 10 GHz, 0.3 GHz to 5 GHz, 5 GHz to 50 GHz, 5 GHz to 25 GHz, 5 GHz to 10 GHz, 10 GHz to 50 GHz, 10 GHz to 25 GHz, 20 GHz to 50 GHz, or 20 GHz to 25 GHz). In some embodiments, the microwaves have a frequency of 2.45 GHz.

In some embodiments, the microwaves can be generated by magnetrons having an operating power of from 300 watts to 2000 watts (e.g., from 500 watts to 2000 watts, from 750 watts to 2000 watts, from 1000 watts to 2000 watts, from 1500 watts to 2000 watts, from 300 watts to 1500 watts, from 500 watts to 1500 watts, from 750 watts to 1500 watts, from 1000 watts to 1500 watts, from 300 watts to 1000 watts, from 500 watts to 1000 watts, from 750 watts to 1000 watts, from 300 watts to 750 watts, from 500 watts to 750 watts, or from 300 watts to 500 watts). In some embodiments, the microwaves are generated by magnetrons having an operating power of 825 watts. In some embodiments, the microwaves are generated by magnetrons having an operating power of 495 watts.

In some embodiments, the irradiating step can last from 10 seconds to 15 minutes, (e.g., from 30 seconds to 1 minute, from 30 seconds to 2 minutes, from 1 minute to 2 minutes, or from 30 seconds to 5 minutes). In some embodiments, the irradiating step can last from 1 minute to 5 minutes with microwaves having a frequency of 2.45 GHz generated by magnetrons having an operating power of 825 watts. In some embodiments, the irradiating step can last 1 minute with microwaves having a frequency of 2.45 GHz generated by magnetrons having an operating power of 825 watts. In some embodiments, the irradiating step can last from 1 minute to 5 minutes with microwaves having a frequency of 2.45 GHz generated by magnetrons having an operating power of 495 watts. In some embodiments, the irradiating step can last from 1 minute with microwaves having a frequency of 2.45 GHz generated by magnetrons having an operating power of 495 watts.

Described herein are also methods of making a microwave pyrolysis-derived biochar material. The method can include pretreating feedstock material; and irradiating the pretreated feedstock material under an inert atmosphere with microwaves to yield the microwave pyrolysis-derived biochar material with a specific surface area of from 0.5 $m^2/g$ to 8 $m^2/g$.

In some embodiments, suitable feedstock material can include but is not limited to biosolid, switchgrass, water oak leaves, or any combination thereof. In some embodiments, pretreating the feedstock material can include drying the feedstock material at a temperature of from 50° C. to 80° C. for at least 36 hours until no significant weight change was observed. In some embodiments, pretreating the feedstock material can include drying the feedstock material at 60° C. for at least 48 hours until no significant weight change was observed.

In some embodiments, the method can further include measuring the microwave pyrolysis-derived biochar material nitrate absorption capacity using ion chromatography.

In some embodiments, the microwaves have a frequency and energy sufficient to heat the pretreated feedstock material to a temperature sufficient to yield the biochar material.

In some embodiments, the microwaves can have a frequency of from 0.3 GHz to 50 GHz, (e.g., 0.3 GHz to 25 GHz, 0.3 GHz to 10 GHz, 0.3 GHz to 5 GHz, 5 GHz to 50 GHz, 5 GHz to 25 GHz, 5 GHz to 10 GHz, 10 GHz to 50 GHz, 10 GHz to 25 GHz, 20 GHz to 50 GHz, or 20 GHz to 25 GHz). In some embodiments, the microwaves have a frequency of 2.45 GHz.

In some embodiments, the microwaves can be generated by magnetrons having an operating power of from 300 watts to 2000 watts (e.g., from 500 watts to 2000 watts, from 750 watts to 2000 watts, from 1000 watts to 2000 watts, from 1500 watts to 2000 watts, from 300 watts to 1500 watts, from 500 watts to 1500 watts, from 750 watts to 1500 watts, from 1000 watts to 1500 watts, from 300 watts to 1000 watts, from 500 watts to 1000 watts, from 750 watts to 1000 watts, from 300 watts to 750 watts, from 500 watts to 750 watts, or from 300 watts to 500 watts). In some embodiments, the microwaves are generated by magnetrons having an operating power of 1320 watts. In some embodiments, the microwaves are generated by magnetrons having an operating power of 1650 watts.

In some embodiments, the irradiating step can last from 1 minute to 2 hours, (e.g., from 1 minute to 1 hour, from 5 minutes to 1 hour, from 10 minutes to 1 hour, from 15 minutes to 1 hour, from 25 minutes to 1 hour, from 30 minutes to 1 hours, from 45 minutes to 1 hour, from 1 minute to 45 minutes, from 5 minutes to 45 minutes, from 10 minutes to 45 minutes, from 15 minutes to 45 minutes, from 25 minutes to 45 minutes, from 30 minutes to 45 minutes, from 1 minute to 30 minutes, from 5 minutes to 30 minutes, from 10 minutes to 30 minutes, from 15 minutes to 30 minutes, from 25 minutes to 30 minutes, from 1 minute to 20 minutes, from 5 minutes to 20 minutes, from 10 minutes to 20 minutes, from 15 minutes to 20 minutes, from 1 minute to 15 minutes, from 5 minutes to 15 minutes, from 10 minutes to 15 minutes, from 1 minute to 10 minutes, from 5 minutes to 10 minutes, or from 5 minutes to 10 minutes). In some embodiments, the irradiating step can last from 30 minute to 2 hours. In some embodiments, the irradiating step can last from 1 hour to 2 hours with microwaves having a frequency of 2.45 GHz generated by magnetrons having an operating power of 1650 watts. In some embodiments, the irradiating step can last 1 hour with microwaves having a frequency of 2.45 GHz generated by magnetrons having an operating power of 1650 watts. In some embodiments, the irradiating step can last from 1 hour to 2 hours with microwaves having a frequency of 2.45 GHz generated by magnetrons having an operating power of 1320 watts. In some embodiments, the irradiating step can last 1 hour with microwaves having a frequency of 2.45 GHz generated by magnetrons having an operating power of 1320 watts.

Methods of Using

Described herein are also methods of using the biochar-hydrogel composite. In some embodiments, the biochar-hydrogel composite can be used in agricultural process to conserve water. In some embodiments, the biochar-hydrogel composite can be used in agricultural process to increase water retention. In some embodiments, the biochar-hydrogel composite can be used in agricultural process to increase nutrient retention. In some embodiments, the biochar-hydrogel composite can be used in agricultural process to prolong nutrient release. In some embodiments, the biochar-hydrogel composite can be used in agricultural process to release an effective amount of a nutrient (e.g., nitrate) according to plant's needs. In some embodiments, the method of using can include applying the biochar-hydrogel composite to soil in an effective amount to increase water retention by at least 15%, (e.g., at least 20%, at least 25%, at least 30%, at least 35%, at least 40%, or at least 50%). In some embodiments, the method of using can include applying the biochar-hydrogel composite to soil in an effective amount to increase nutrient retention by at least 20% (e.g., at least 25% at least 30%, at least 35%, at least 40%, at least 45%, or at least 50%). In some embodiments, the method of using can include applying the biochar-hydrogel composite to soil in an effective amount to prolong nutrient release to the soil.

Described herein are also methods of using the microwave pyrolysis derived biochar material. The microwave pyrolysis derived biochar material can be used in agricultural process to increase moisture in the soil. In some embodiments, the microwave pyrolysis derived biochar material can be used in agricultural process to increase water retention. In some embodiments, the microwave pyrolysis derived biochar material can be used in agricultural process to increase nutrient retention. In some embodiments, the microwave pyrolysis derived biochar material can be used in agricultural process to prolong nutrient release. In some embodiments, the microwave pyrolysis derived biochar material can be used as the biochar material to form a biochar-hydrogel composite as described herein. In some embodiments, the method of using can include applying the microwave pyrolysis derived biochar material to soil in an effective amount to increase water retention. In some embodiments, the method of using can include applying the microwave pyrolysis derived biochar material to soil in an effective amount to increase nutrient retention. In some embodiments, the method of using can include applying the microwave pyrolysis derived biochar material to soil in an effective amount to prolong nutrient release to the soil. In some embodiments, the microwave pyrolysis derived biochar material can be added in a biochar-hydrogel precursor mixture used to form a biochar-hydrogel composite as described herein.

Reference will now be made in detail to specific aspects of the disclosed materials, compounds, compositions, articles, and methods, examples of which are illustrated in the accompanying Examples and Figures.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically related may be substituted for the agents described herein while the same or similar results would be achieved. All such similar substitutes and modifications apparent to those skilled in the art are deemed to be within the spirit, scope and concept of the disclosure as defined by the appended claims.

By way of non-limiting illustration, examples of certain embodiments of the present disclosure are given below.

EXAMPLES

Example 1: Comparing Physicochemical Properties and Sorption Behaviors of Pyrolysis-Derived and Microwave-Mediated Biochar Biochar's ability to amend and remediate agricultural soil has been a growing interest, though the energy expenses from high-temperature pyrolysis deter the product's use. Therefore, it is urgent to improve the pyrolysis efficiency while ensure the quality of produced biochar. The present study utilized three types of feedstock (i.e., switchgrass, biosolid, and water oak leaves) to produce biochar via conventional slow pyrolysis and microwave pyrolysis at different temperature/energy input. The produced biochar was characterized and comprehensively compared in terms of their physiochemical properties (e.g., surface functionality, elemental composition, and thermal stability). It was discovered that microwave-mediated biochar was more resistant to thermal decomposition, indicated by a higher production yield, yet more diverse surface functional groups were preserved than slow pyrolysis-derived biochar. Nutrient (NO3-N) adsorption isotherm study displayed that microwave-mediated biochar exhibited greater adsorption (13.3 mg g$^{-1}$) than that of slow pyrolysis-derived biochar (3.1 mg g$^{-1}$), proving its potential for future applications. Results suggested that microwaves pyrolysis is a promising method for biochar production.

1. Introduction

A method in which the procedure of the irradiation was by covering the vessel containing the feedstock and purged with $N_2$ providing an alternative method to produce biochar via microwave was tested. A second distinction is testing $NO_3^-$ sorption capacity rather than ammonium nitrogen ($NH_4^+$). The method of producing microwave-mediated biochar through a faster means will yield a quality biochar at a reduced energy demand.

Described is 1) develop an alternative method of microwave biochar production, 2) produce microwave-mediated biochar from three feedstocks that exhibit similar characteristics to that of pyrolysis-derived biochar and 3) compare characteristics of slow pyrolysis-derived biochar and microwave pyrolysis-derived biochar via elemental composition, thermogravimetric structure, porous and surface structure, as well as sorption capacities of nitrate ($NO_3^-$). Feedstocks of biosolid, water oak leaves (*Quercus virginiana*), and switchgrass (*Panicum virgatum*) were utilized to produce biochar at several pyrolysis temperatures and energy levels. A biochar alternative method that can have increased use in future agricultural industry at a significantly lower energy requirement is described.

2. Materials and Methods 2.1. Biochar Feedstock and Production

To maximize the economic benefits of biochar in agronomic fields, three feedstocks that are easily accessible were used in this study: switchgrass (SG), biosolids (BS), and water oak leaves (L). All feedstocks were dried at 60° C. for 48 hours until no significant weight change was observed. It was then crushed to 0.5-1 cm in size.

2.1.1. Conventional Slow Pyrolysis

During slow pyrolysis, pure $N_2$ gas with purity >99.99% was used at temperatures 300, 500, and 700° C. in a bench scale pyrolysis apparatus described in previous study (Li, S. M., et al. *J Anal Appl Pyrol* 2018, 133, 136-146). In brief, between 10-14 g of preprocessed feedstock was centered in a quartz tube (inner diameter: 2 cm, length: 45 cm). The tube was fitted with airtight connectors and rubber O-rings with continuous $N_2$ gas purge at 80 mL/min, heated in a controllable S-line single-zone split tube furnace (Thermcraft Inc., Wiston-Salem, NC) at heat ramp of 10° C./min until the desired temperature and was kept at final temperature for 60 minutes. The quartz tube was purged with $N_2$ gas during heating and cooling to prevent rapid oxidation and/or auto-ignition.

2.1.2. Microwave Pyrolysis

A Domestic Electric microwave (General Electric, Boston, MA) with maximum power output of 1650 W and 2.45 GHz frequency was utilized for microwave mediation. Preprocessed feedstock (between 10-15 g) was evenly distributed in a leakproof glass container. Before being completely sealed, pure $N_2$ gas with purity >99.99% sparged the container for minutes to prevent oxidation during the following process. Two power levels, Level 8 (1320 W) and Level 10 (1650 W) were used to synthesize the biochar. A 60-minute duration was used for both power levels, and a third product was synthesized at 1650 W for 30 minutes, producing a total of 9 microwave-mediated biochar samples. When half the time was reached, the vessel was shaken to disperse the contents. Because the vessel was enclosed, it became pressurized with $N_2$ gas as well as biogas from the breakdown of the feedstock.

The yield of biochar was estimated by proportion of solid product to the original weight (wt/wt). The produced biochar from two methods were grinded to a fine composition with a mortar and pestle (<0.5 mm). They were then stored in sealed plastic containers at room temperature to prevent moisture absorption. Different pyrolysis conditions and biochar labels are listed in the Table 1.

TABLE 1

Experimental conditions and yields of biochar specimens.

| Feedstock* | Label | Pyrolysis Method | Temperature (° C.) or Power Level (W) | Time (min) |
|---|---|---|---|---|
| BS | 300P | Slow Pyrolysis | 300 | 60 |
| | 500P | Slow Pyrolysis | 500 | 60 |
| | 700P | Slow Pyrolysis | 700 | 60 |
| | 1320-60M | Microwave Pyrolysis | 1320 | 60 |
| | 1650-30M | Microwave Pyrolysis | 1650 | 30 |
| | 1650-60M | Microwave Pyrolysis | 1650 | 60 |
| L | 300P | Slow Pyrolysis | 300 | 60 |
| | 500P | Slow Pyrolysis | 500 | 60 |
| | 700P | Slow Pyrolysis | 700 | 60 |
| | 1320-60M | Microwave Pyrolysis | 1320 | 60 |
| | 1650-30M | Microwave Pyrolysis | 1650 | 30 |
| | 1650-60M | Microwave Pyrolysis | 1650 | 60 |
| SG | 300P | Slow Pyrolysis | 300 | 60 |
| | 500P | Slow Pyrolysis | 500 | 60 |
| | 700P | Slow Pyrolysis | 700 | 60 |
| | 1320-60M | Microwave Pyrolysis | 1320 | 60 |
| | 1650-30M | Microwave Pyrolysis | 1650 | 30 |
| | 1650-60M | Microwave Pyrolysis | 1650 | 60 |

*BS: biosolids; L: water oak leaves; SG: switchgrass P: slow pyrolysis-derived; M: microwave pyrolysis-derived.

2.2. Physicochemical Characteristics Analysis 2.2.1. MESTA Ultimate Analysis and Thermogram The multi-element scanning thermal analysis (MESTA) was performed using a carrier gas of 33% 02 in helium (Hsieh, Y. P. *J Aoac Int* 2007, 90, 54-59). The loaded sample (15 mg) at ambient temperature (22±1° C.) was heated to 750° C. at a 50° C./min temperature ramp. Integration of thermograms of carbon (C), nitrogen (N), hydrogen (H), and sulfur (S) were used to determine the elemental composition (wt %) of biochar. Mass balance was performed to estimate the oxygen (O) content (wt %): O=100−(C+N+H+residual ash). Elemental compositions allow to calculate significant parameters such as the atomic H/C and atomic O/C ratios, as well as the polarity index.

2.2.2. Thermogravimetric Analysis

The feedstock and biochar samples were analyzed by TGA thermalgravimetric analyzer (GA 550, TA Instrument, New Castle, DE) under the flow of argon (50 mL/min). The sample was weighed to approximately 5-7 mg. Before the sample was placed, a tare was performed so that only the sample weight was measured in the thermal weight-change analysis. The temperature ramp was set as follows: (1) isotherm at room temperature (21° C.) for 5 min; (2) temperature equilibrium at 21° C. to 100° C.; (3) isotherm at (100° C.) for 5 min; (4) ramping of 5° C./min from 100° C. to 700° C.

2.2.3. Porous Structure Analysis

The Brunauer, Emmett, and Teller (BET) test was performed using an autosorb iQ automated gas sorption analyzer (Boynton Beach, FL) to determine the specific surface area of the biochar samples within the 0.01-0.30 relative pressure ($P/P_o$) range of $N_2$ sorption isotherm. Degassing of the sample was done as a pretreatment by heating the tube around the sample to 120° C. for 4 hours and vacuuming any remaining gas out of the vessel. Polanyi theory ($P/P_o$=0.98) was used to calculate the total pore volume (Polanyi, M. Z *Phys Chem-Stoch Ve* 1914, 88, 622-631). The built-in Non-Local Density Functional Theory determined the pore size distribution in the pressure region (0.01-0.98). NovaWin 11.0 (Quantachrome Instruments, Boynton Beach, FL) performed the data analysis.

2.2.4. Surface Morphology Analysis

The scanning electron microscopy (SEM) imaging was performed on all biochar and feedstocks utilizing a FEI Nova 400 Nano SEM (Hillsboro, OR). Samples were first coated with Iridium (Ir) via sputter coater (Cressington HR208 Sputter Coater, Ted Pella, Inc) with $N_2$ gas purging to dissipate charging artifacts and minimize the beam damage. A 4 nm coat was applied to each sample. Images were taken on samples under vacuum following the standard procedures at scales 50 μm, 10 μm, and 5 μm, which was magnifications of 1000, 5000, and 10000, respectively. Characterization of surface morphology was performed using the SEM detector (ETD) at a voltage of 5 kV, 10 kV, or 15 kV, current of 96 pA, and focal length of 5 mm to 10 mm.

2.2.5. FTIR Analysis

Fourier transform infrared (FTIR) spectroscopy using a PerkinElmer 100 spectrometer (Waltham, MA) was performed to analyze the structure of biochar using the non-contact reflectance imaging method. For the FTIR spectra, there were 16 scans performed on each sample with a spectral resolution of 4 $cm^{-1}$ and in the mid-infrared range of 4000 to 650 $cm^{-1}$. Broad-bands within the detection ranges include aromatic C—H rings, O—H stretch of phenolic compounds, aromatic and olefinic C═C vibrations, C—H alkyl structures, and H-bonded O—H stretch vibrations of hydroxyl groups from alcohols, phenols, and organic acids (Li, S. M., et al., *Waste Manage* 2018, 78, 198-207).

2.3. Nitrate Adsorption Isotherm Experiments

Batch sorption experiments were conducted to investigate the ability of different biochar to adsorb $NO_3^-$. A series of polyethylene centrifuge tubes with 15 mL volume containing 100 mg of biochar sample and 12 mL $NaNO_3$ solutions (10, 25, 50, 75, and 150 mg $L^{-1}$ $NO_3^-$) were agitated on a wrist action shaker (Model 75, Burrel Scientific, Pittsburgh, PA) to reach sorption equilibrium. Tests were triplicated with each trial beginning with a blank at each concentration to gain a calibration curve ($R^2$=0.998). The samples suspension were then centrifuged for 15 minutes at 2500 rpm. Concentrations of $NO_3^-$ in 6 mL of sample supernatant were estimated by ion chromatography (Dionex Aquion, Thermo Scientific, Waltham, MA). A 4-mm AS15 analytical column set at 40° C. was coupled with a 4-mm AG15 guard column, and a 4-mm AMMS Micromembrane suppressor to take measurements of $NO_3^-$ (Thermo Scientific, Waltham, MA). During the test, 38 mM NaOH was used as an eluent at a flow rate of 1.2 mL/min.

The amount of $NO_3^-$ adsorbed on the biochar was calculated via Eq. 1:

$$q=(C_0-C_e)V/M \qquad 1)$$

Where, q (mg $g^{-1}$) is the amount of $NO_3^-$ adsorbed onto the biochar at equilibrium; $C_0$ and $C_e$ (mg $L^{-1}$) are the initial and equilibrium concentrations of $NO_3^-$; V (L) is the volume of the aqueous solution; and M (g) is the mass of the added biochar.

The Freundlich model (Eq. 2), a widely utilized sorption model, was fitted to the sorption data.

$$\ln q = \ln K_F + (1/n)\ln C_e \quad (2)$$

Where $K_F$ and n are experimentally derived constants.

2.4. Statistical Analysis

Statistical analyses for means and errors of the data were executed using Microsoft Excel for Windows 10 (Microsoft Office, Redmond, WA) and SigmaPlot (Version 10.0, Systat Software, Inc., San Jose, CA, USA).

3. Results and Discussion

3.1. Yield of Biochar

Figure 1:
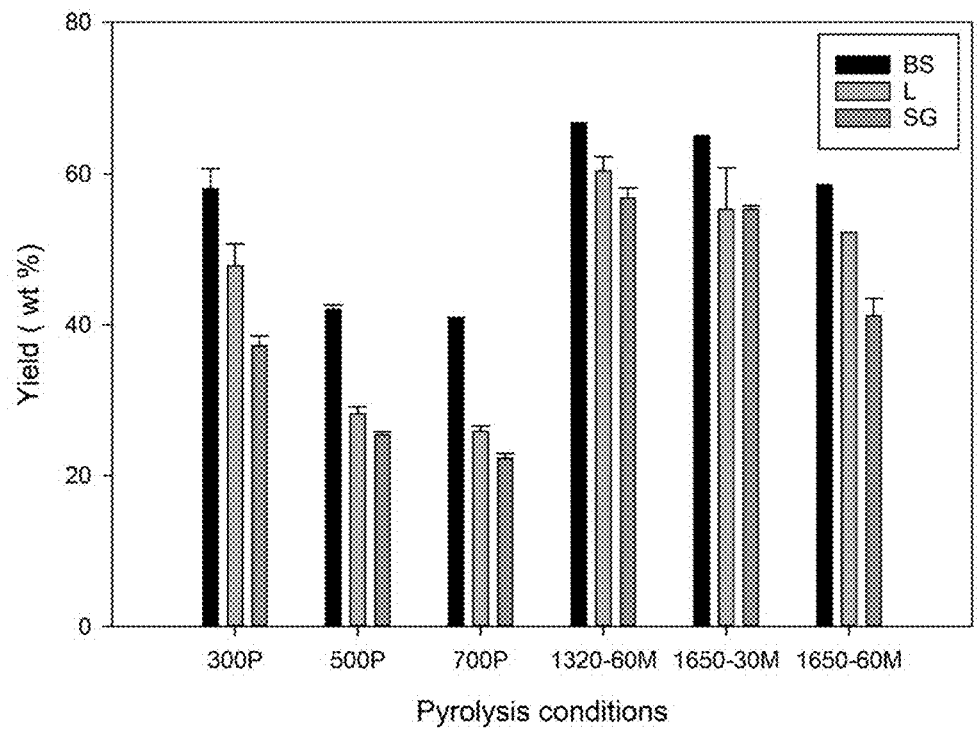
FIG. 1 shows yields of biochar specimens. BS: biosolids; L: water oak leaves; SG: switchgrass P: Slow pyrolysis; M: Microwave pyrolysis.

The biochar yield observed from the slow pyrolysis from the different feedstocks showed that BS had the largest yield across the three different temperatures (FIG. 1). This might because the higher concentration of inorganic compounds and lower volatile organic contents in BS (Antunes, E., et al., *J Environ Manage* 2017, 196, 119-126). Both SG and L had yields between 20% and 30% for temperatures of 500° C. and 700° C., but then increased to almost 40% and 50% at 300° C., respectively. There was an interesting commonality among the three feedstocks: the 300° C. biochar had high variability (3-10 times more) in yield compared to the 500° C. and 700° C.

The microwave pyrolysis derived biochar had a similar trend of decreased yield when a higher power level was applied for the same duration. Although, when the feedstock was radiated at 1.65 kW for half the time as the other specimens, it had a similar yield to that of 1320-60M biochar. There was 150-200% increase in yield from microwave-mediated biochar yield compared to the pyrolysis-derived biochar. Additionally, the minimum yield of microwave-mediated biochar, found at 1.65 kW for 60 minutes, was observed to be the same or higher than the maximum yield observed from the pyrolysis-derived biochar, i.e. 300° C.

Knowledge on measured temperature from previous studies during the microwave pyrolysis-derived biochar synthesis was used in this study. A recent study observed temperature for microwave biochar synthesis at 700 W; their findings showed that after 15 minutes, a temperature of at least 650° C. was achieved (Ge, S. B., et al., *Renew Sust Energ Rev* 2020, 127). Another study measured 400° C. in a microwave at 750 W (Mohamed, B. A.; et al., *Bioresource Technol* 2016, 201, 121-132). Ge et al., 2020 also observed that there was an average 60° C. $\min^{-1}$ increase in temperature within first 5 minutes, but dropped to roughly a 30° C. $\min^{-1}$ increase for the remainder of the synthesis, with signs of plateauing in the last 2 minutes of synthesis (Ge, S. B., et al., *Renew Sust Energ Rev* 2020, 127).

3.2. Elemental Composition of Biochar

Elemental composition of biochar exhibited great dependence on the feedstock types. Since the initial benefit of biochar was carbon sequestering, it was expected that the percent composition of C increased with temperature/power increase (Li, S. M., et al, *Waste Manage* 2018, 78, 198-207). This expected result was only not evident for BS biochar (Table 2). Relatively high carbon contents (>50%) were found in the L and SG biochar, proving that the feedstocks have the potential to provide carbon-rich biochar (Liew, R. K., et al., *Process Saf Environ* 2018, 115, 57-69). The variation of C consequently led to the variation of O content, even though increased dehydrogenation and condensation were to promote significant decreases in both H and O (Jindo, K., et al., *Biogeosciences* 2014, 11, 6613-6621). BS raw materials and resulting biochar consistently composed most of elemental N among three feedstocks. This indicates that heterolytic N-containing structure may be formed as a result of pyrolysis (Gonzaga, M. I. S., et al., *Soil Till Res* 2017, 165, 59-65). According to previous study, the formed N-functional group may affect nutrient such as NH4-N and organic-N adsorption, which consequently resulting in N immobilization (Zheng, H., *Geoderma* 2013, 206, 32-39). Element S, as one of essential plant nutrients and soil amendment (Li, R., et al., *Bioresource Technol* 2020, 312, 123653), was detected in very low concentration (<1.0 wt %) in BS and SG-300P biochar.

Atomic O/C ratios of the biochar ranged from 0.19-1.34 (Table 2). Higher O/C ratios have been attributed to hydrophilic surfaces from more O-containing functional groups (Li, S. M., et al., *Waste Manage* 2018, 78, 198-207). When applied in agricultural fields, lower atomic O/C ratios may provide larger half-lives (>1000 years), allowing it to be retained in the soil and providing its other benefits perpetually (Spokas, K. A. *Carbon Manag* 2010, 1, 289-303). Atomic H/C ratios of biochar, which specify degree of original organic carbon preserved, varied from 0.19-1.52 with lower ratios occurring at higher temperatures and power outputs, though more uncertainty was evident with the microwave-mediated biochar. BS1320-60M had the highest atomic H/C ratio. Higher ratios eluded that increased filtering efficiency of inorganic contaminants could be achieved (Ahmad, M., et al., *Chemosphere* 2014, 99, 19-33). The atomic H/C ratio is a key factor when associated with agricultural fields as it has been found to impact the intensity of reducing $N_2O$ emissions, where lower H/C ratios were observed having higher capacity for reduction of $N_2O$ emissions (Alburquerque, J. A., et al., *Environ Pollut* 2015, 196, 72-77).

Figure 2A:
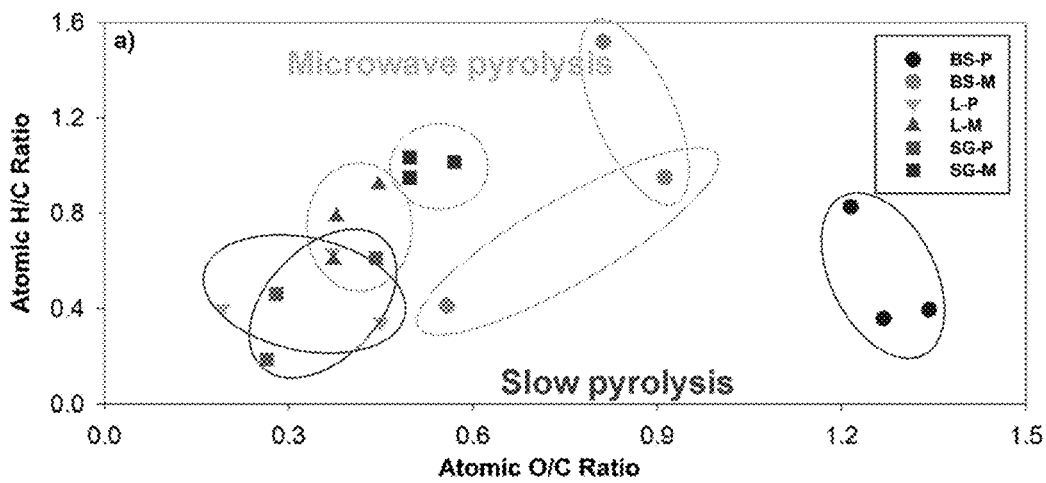
FIGS. 2A-2C show van Krevelen diagrams of atomic ratios for biochar from biosolids (BS), switchgrass (SG), and water oak leaves (L) via slow pyrolysis (P) and microwave pyrolysis (M).
Figure 2B:
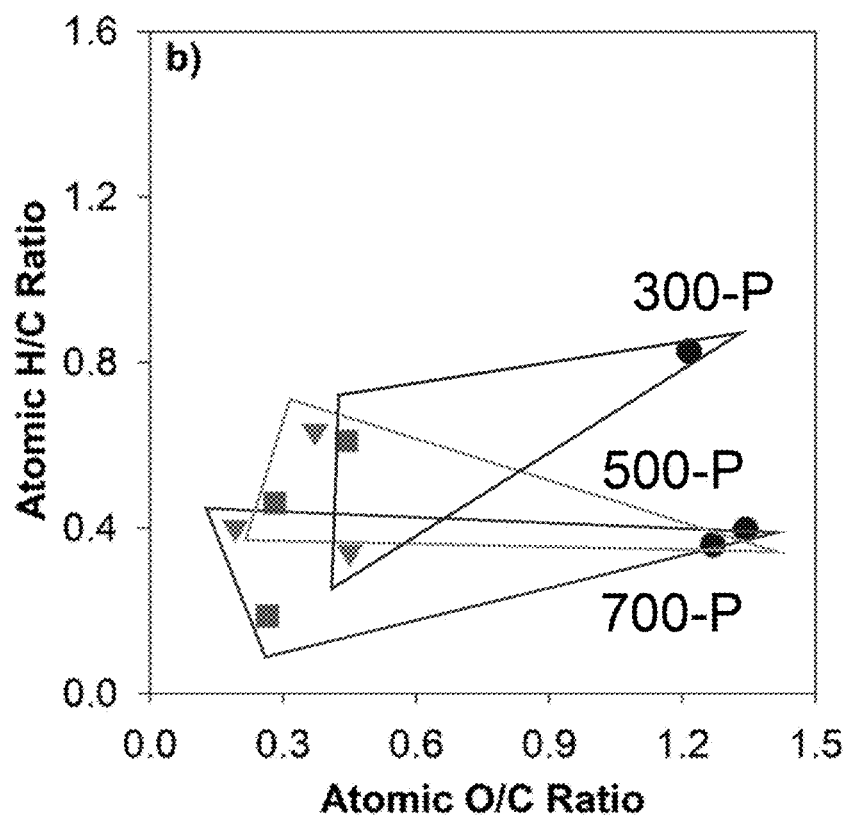
Figure 2C:
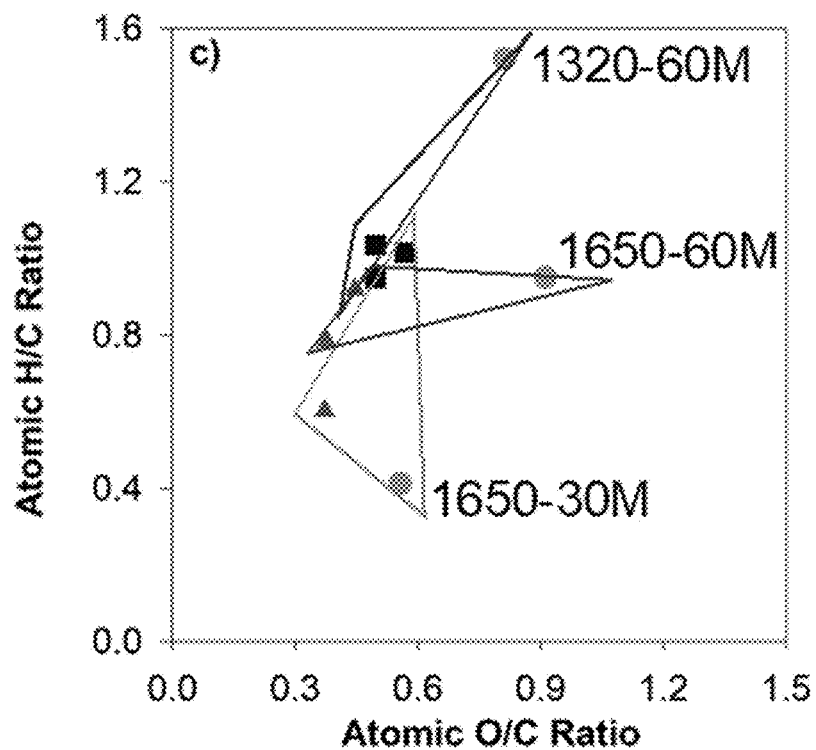
Figure 3A:
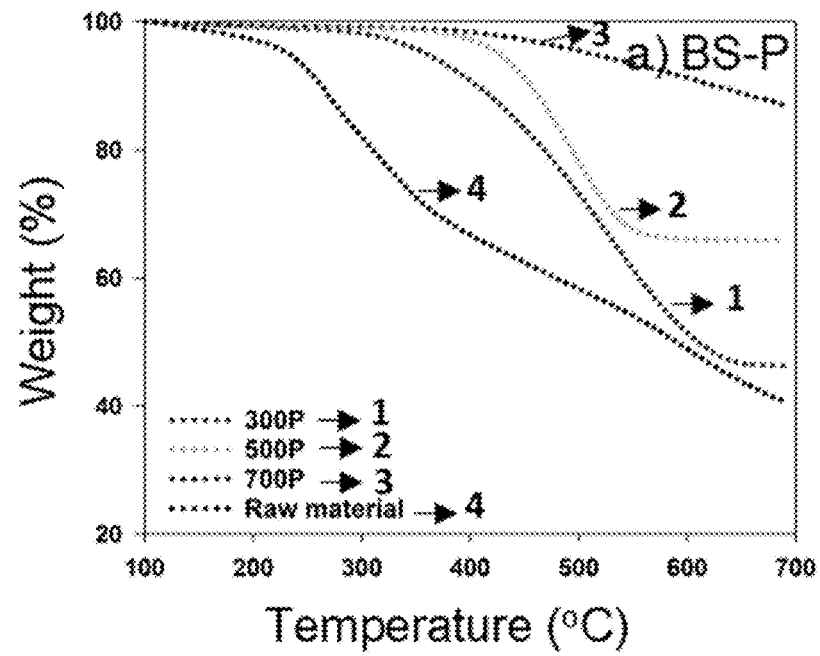
FIGS. 3A-3D show TGA of biosolid and resulting pyrolysis-derived biochar via (FIG. 3A) slow pyrolysis and (FIG. 3C) microwave pyrolysis.
Figure 3B:
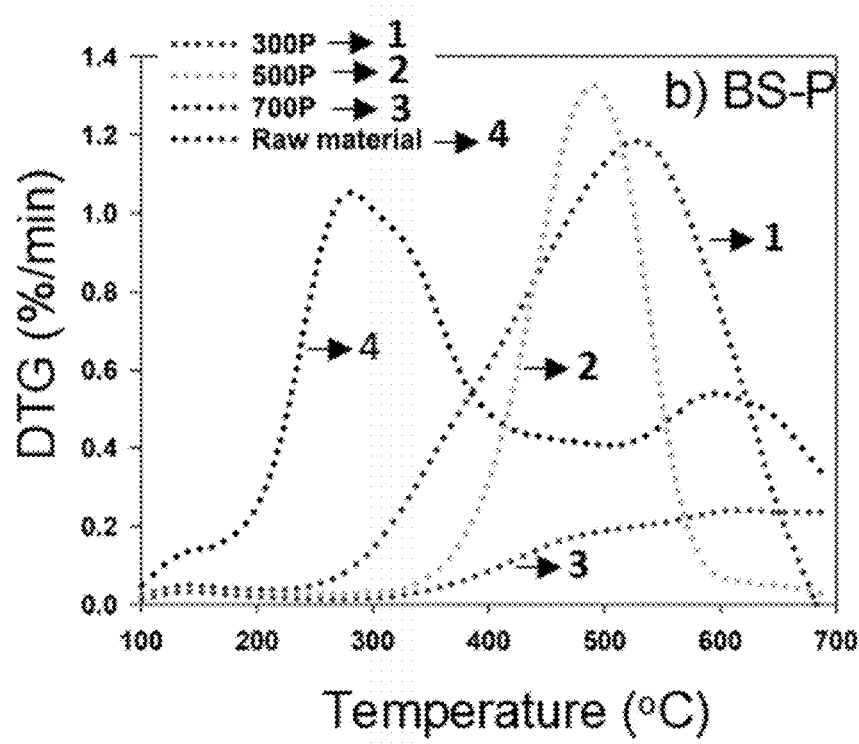
Figure 3C:
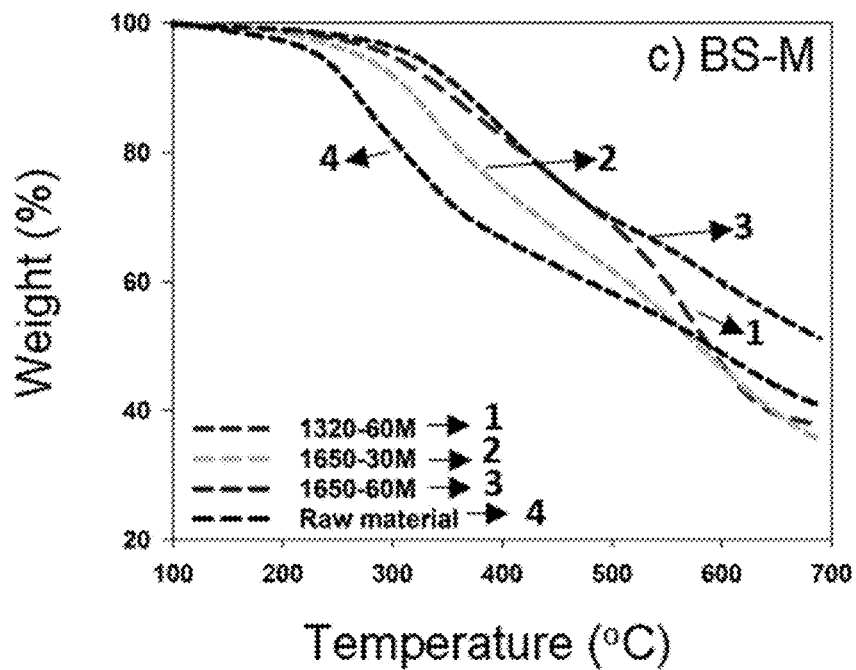
Figure 3D:
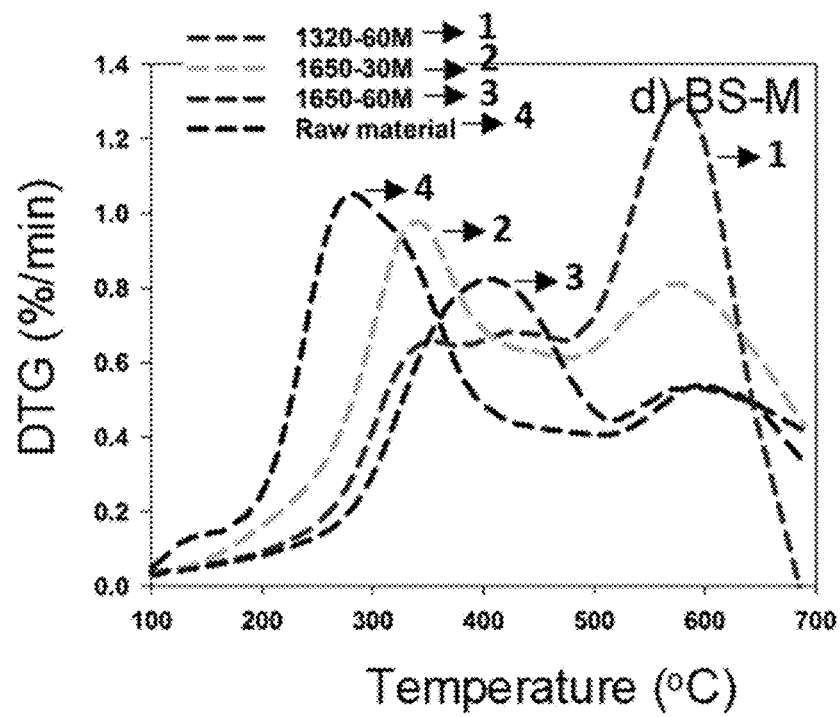
Figure 4A:
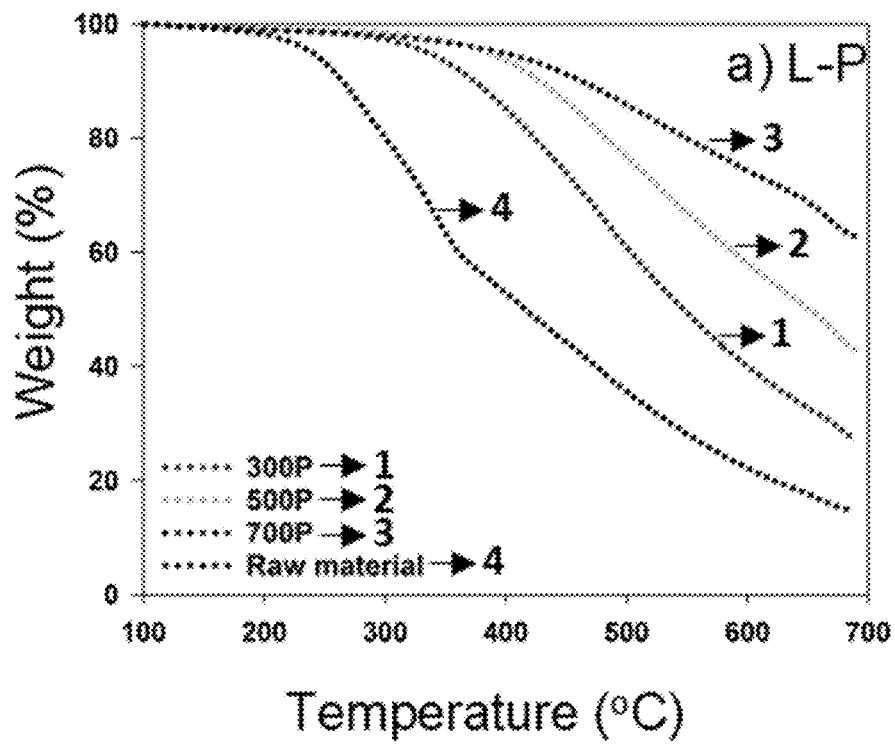
FIGS. 4A and 4C show TGA of water oak leaves and resulting pyrolysis-derived biochar via (FIG. 4A) slow pyrolysis and (FIG. 4C) microwave pyrolysis.
Figure 4B:
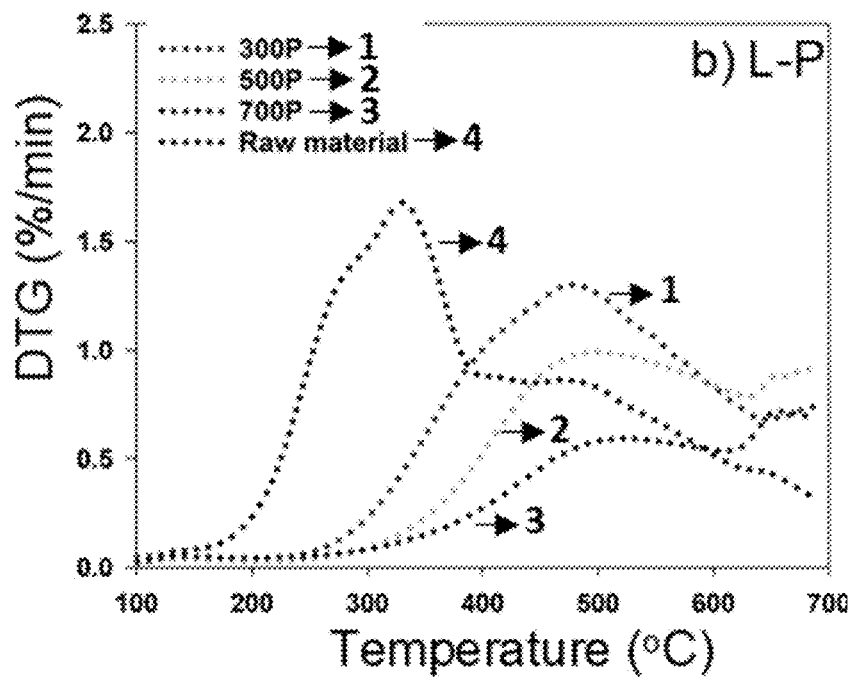
FIGS. 4B and 4D show DTG curves of biosolid and resulting pyrolysis-derived biochar via (FIG. 4B) slow pyrolysis and (FIG. 4D) microwave pyrolysis.
Figure 4C:
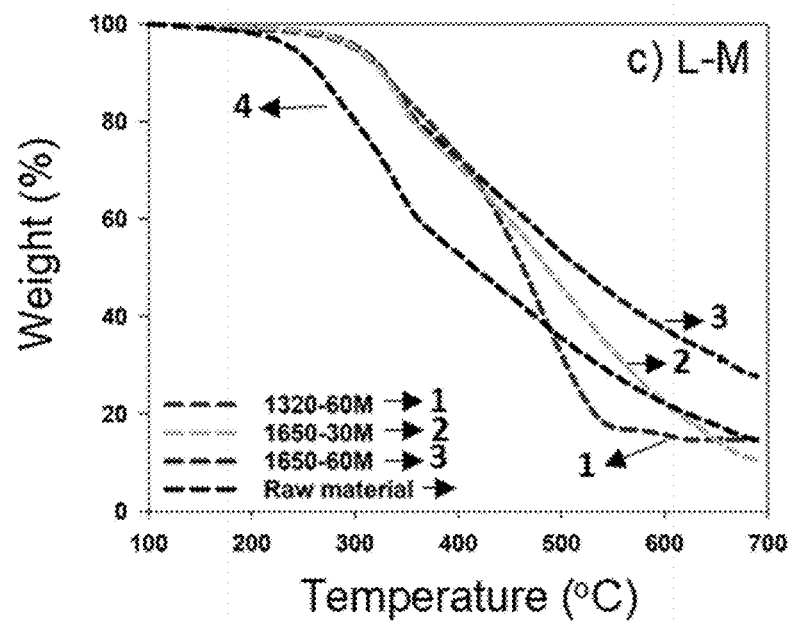
Figure 4D:
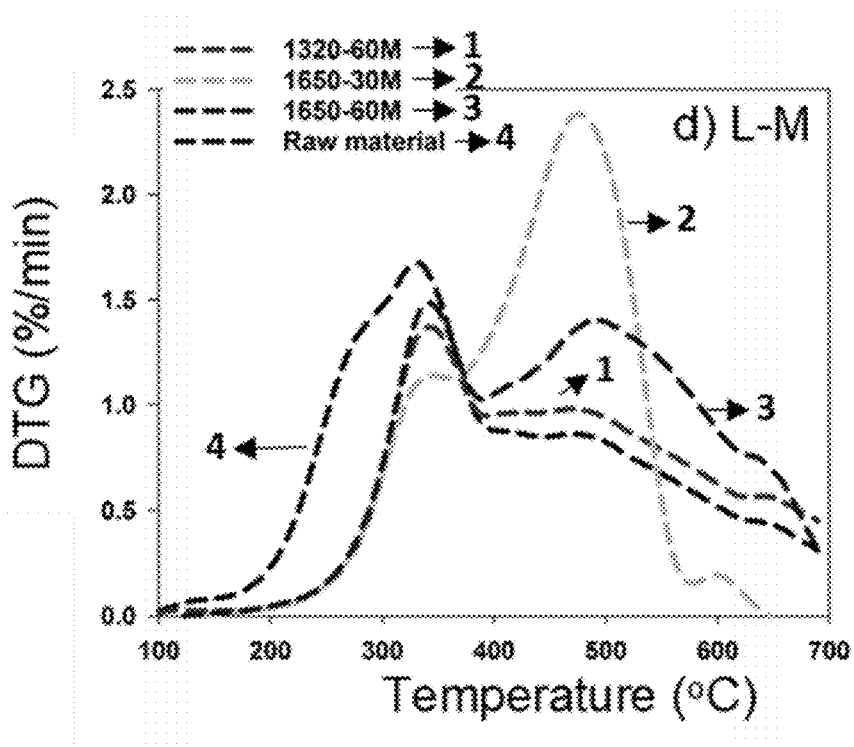
Figure 5A:
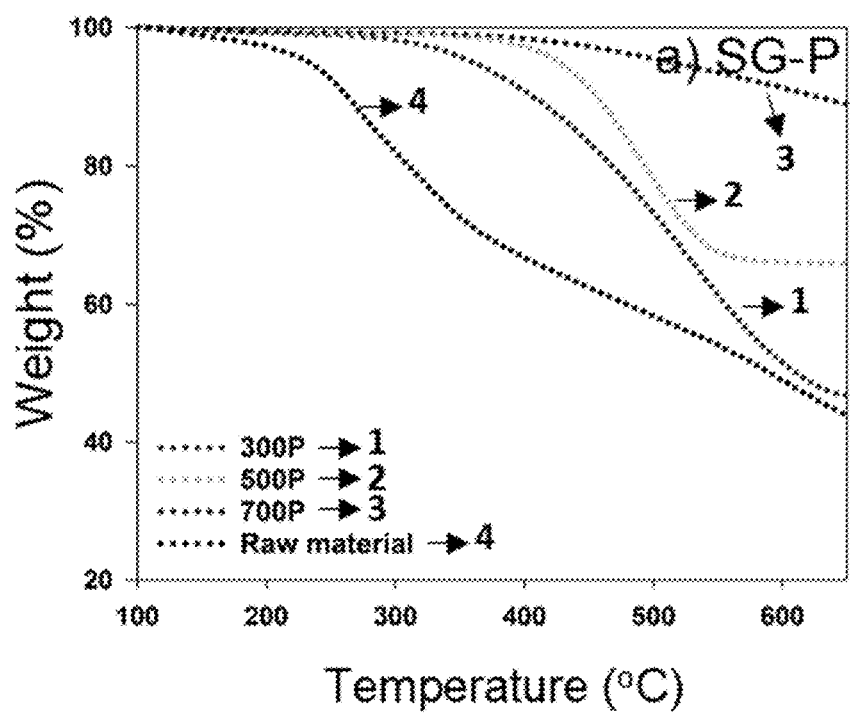
FIGS. 5A and 5C show TGA of switchgrass and resulting pyrolysis-derived biochar via (FIG. 5A) slow pyrolysis and (FIG. 5C) microwave pyrolysis.
Figure 5B:
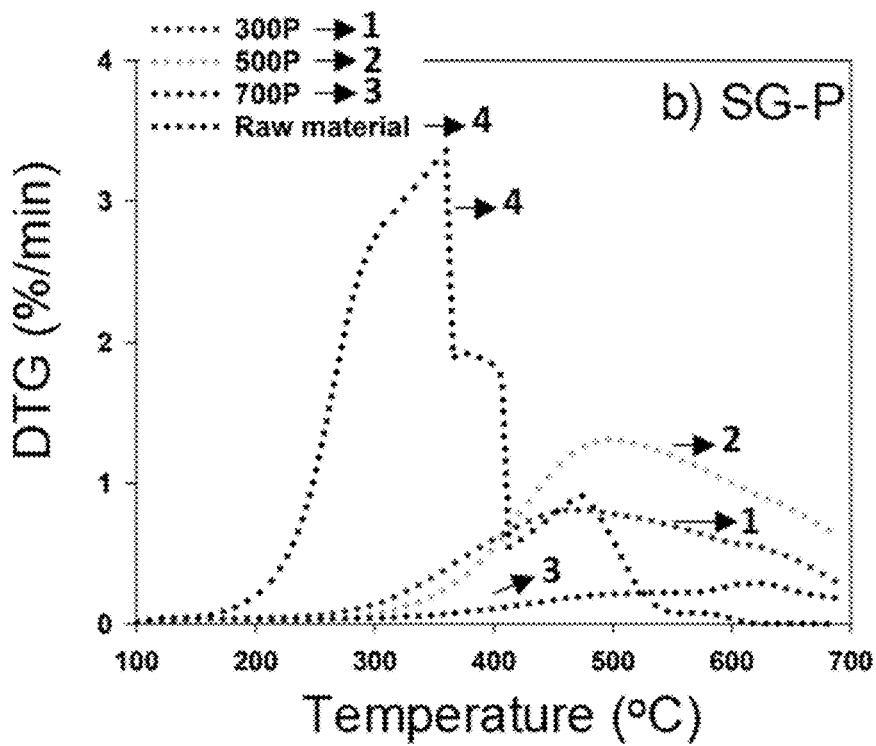
FIGS. 5B and 5D show DTG curves of biosolid and resulting pyrolysis-derived biochar via (FIG. 5B) slow pyrolysis and (FIG. 5D) microwave pyrolysis.
Figure 5C:
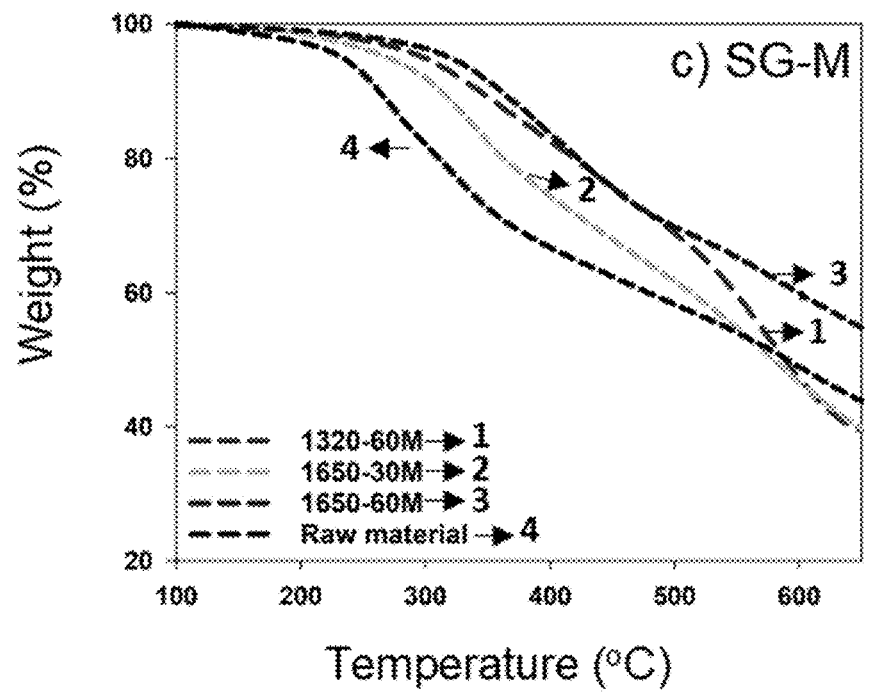
Figure 5D:
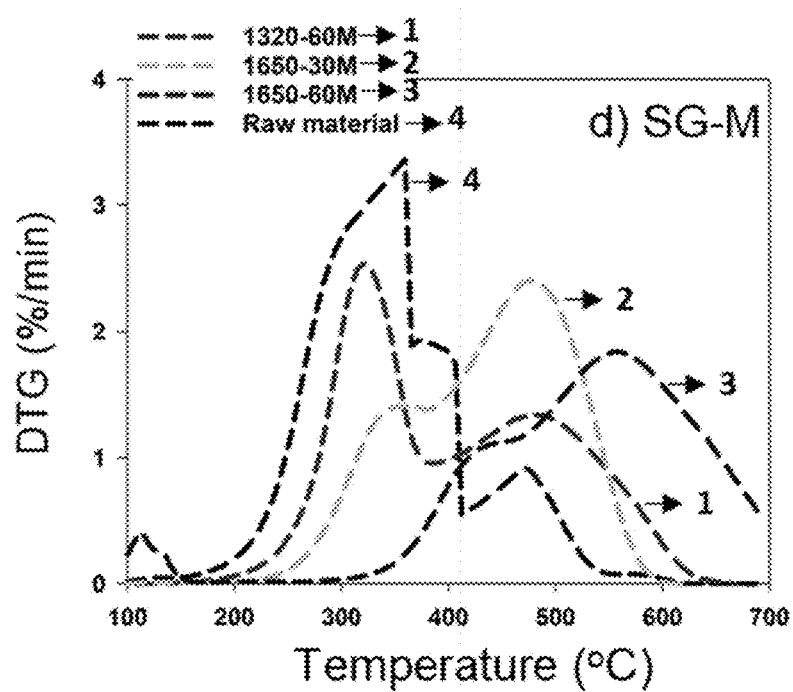

The gradation of recalcitrance and aromaticity of biochar was approximated by the data from Table 2, developed as a van Krevelen diagram (FIG. 2A-2C). Generally, the lower H/C and O/C ratios occurred at SG and L biochar, attributed to the formation of aromatic rings, increase of single C-bonds, decrease in H—C and O—C bonds, and reduction of easily biodegradable organic compounds (Jindo, K., et al., *Biogeosciences* 2014, 11, 6613-6621). However, BS biochar has a relatively high O/C and H/C producing from both pyrolysis methods. This indicates SG and L biochar may mineralize slower than BS biochar, contributing to higher biochar stability in the application (Gonzaga, M. I. S., et al., *Soil Till Res* 2017, 165, 59-65). Compared to slow pyrolysis, microwave pyrolysis resulted in similar ratios for SG and L feedstocks, while biosolid exhibited less predictable results from two pyrolysis procedures. The lack of gas circulation and the heating of water particles in the microwave-mediated biochar process may resulted in less dehydration, which could account for difference in ratio trends.

TABLE 2

Elemental composition and atomic ratios for different biochar specimens.

| Feedstock Sample | | C (wt %) | N (wt %) | S (wt %) | H (wt %) | O (wt %) | Atomic H/C | Atomic O/C |
|---|---|---|---|---|---|---|---|---|
| BS | 300P | 42.60 | 4.87 | 0.96 | 5.40 | 46.16 | 0.34 | 0.45 |
|  | 500P | 52.49 | 5.96 | 0.70 | 1.80 | 39.03 | 0.63 | 0.37 |
|  | 700P | 41.45 | 4.24 | 0.61 | 3.28 | 50.41 | 0.40 | 0.19 |
|  | 1320-60M | 35.59 | 3.91 | 0.34 | 2.45 | 57.66 | 0.61 | 0.44 |

TABLE 2-continued

Elemental composition and atomic ratios for different biochar specimens.

| Feedstock | Sample | C (wt %) | N (wt %) | S (wt %) | H (wt %) | O (wt %) | Atomic H/C | Atomic O/C |
|---|---|---|---|---|---|---|---|---|
| | 1650-30M | 35.64 | 2.86 | 0.08 | 1.06 | 60.29 | 0.46 | 0.28 |
| | 1650-60M | 34.49 | 2.35 | 0.20 | 1.14 | 61.75 | 0.19 | 0.26 |
| L | 300P | 59.14 | 0.85 | 0.00 | 1.74 | 35.21 | 0.83 | 1.21 |
| | 500P | 63.62 | 0.30 | 0.00 | 3.40 | 31.61 | 0.36 | 1.27 |
| | 700P | 62.88 | 1.35 | 0.00 | 2.55 | 31.65 | 0.40 | 1.34 |
| | 1320-60M | 60.90 | 1.11 | 0.00 | 4.53 | 36.51 | 0.92 | 0.45 |
| | 1650-30M | 64.38 | 1.56 | 0.00 | 3.20 | 31.92 | 0.60 | 0.37 |
| | 1650-60M | 76.51 | 1.36 | 0.00 | 4.11 | 19.57 | 0.78 | 0.38 |
| SG | 300P | 56.56 | 0.69 | 0.00 | 3.08 | 37.47 | 1.03 | 0.50 |
| | 500P | 53.87 | 0.91 | 0.00 | 2.69 | 40.92 | 1.01 | 0.57 |
| | 700P | 56.84 | 0.95 | 0.00 | 1.13 | 37.65 | 0.95 | 0.50 |
| | 1320-60M | 60.50 | 1.10 | 0.05 | 4.87 | 35.68 | 1.52 | 0.81 |
| | 1650-30M | 70.16 | 0.65 | 0.00 | 4.56 | 26.22 | 0.41 | 0.56 |
| | 1650-60M | 72.40 | 1.00 | 0.00 | 4.49 | 25.52 | 0.95 | 0.91 |

3.3. Thermogravimetric Characteristics of Biochar

The decomposition stability of the slow and microwave pyrolysis-derived biochar and their respective feedstocks were analyzed by TG decomposition and derivative thermogram (DTG) curves (FIGS. 3A-3D, FIGS. 4A-4D, and FIGS. 5A-5D). DTG curves were derived by data obtained from TG decomposition data, which displayed differences in thermal peak quantity, temperature occurrence, and magnitude/shape of peak across each feedstock and its respective temperature or radiation applied, indicating differences in structure by all types of biochar. Compared to microwave pyrolysis, slow pyrolysis exhibited great carbon sequestration of all feedstocks evidenced from less pronounced and less amounts of thermal peaks. The first dominant thermal peaks occurred between 200 and 400° C. on original feedstocks and microwave pyrolysis biochar, resulting from the combustion of cellulose and hemicellulose (Alhinai, M., et al., Int J Renew Energy R 2018, 8, 1648-1656). All of the microwave-mediated had significant increased weight reduction within 350-550° C. mainly attributed to the breakdown of lignin and autocatalytic reactions (Yang, H. P., et al, Fuel 2007, 86, 1781-1788). Lignin has been suggested to begin showing loss of mass beginning at 200° C., but at small increments, as is the most difficult component to decompose compared to cellulose and hemicellulose, due to its complex chemical composition (Alhinai, M., et al., Int J Renew Energy R 2018, 8, 1648-1656). The differences in decomposition that occurred across the feedstocks as well as by methods of pyrolysis show that there was a clear difference of structural integrity of the samples, with generally more stability in the samples that occurred at higher temperature or power.

3.4. Surface Structure Analysis of Biochar

Figure 6A:
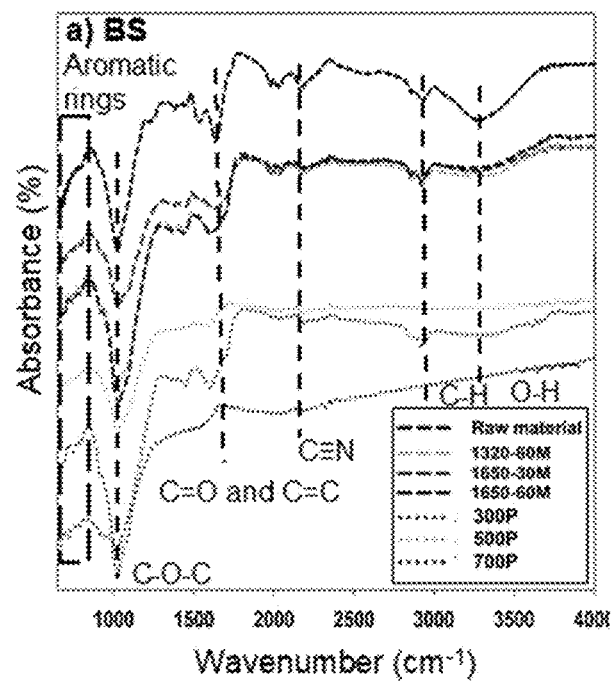
FIGS. 6A-6C show FTIR spectra of feedstocks and resulting biochar produced by slow pyrolysis and microwave pyrolysis.
Figure 6B:
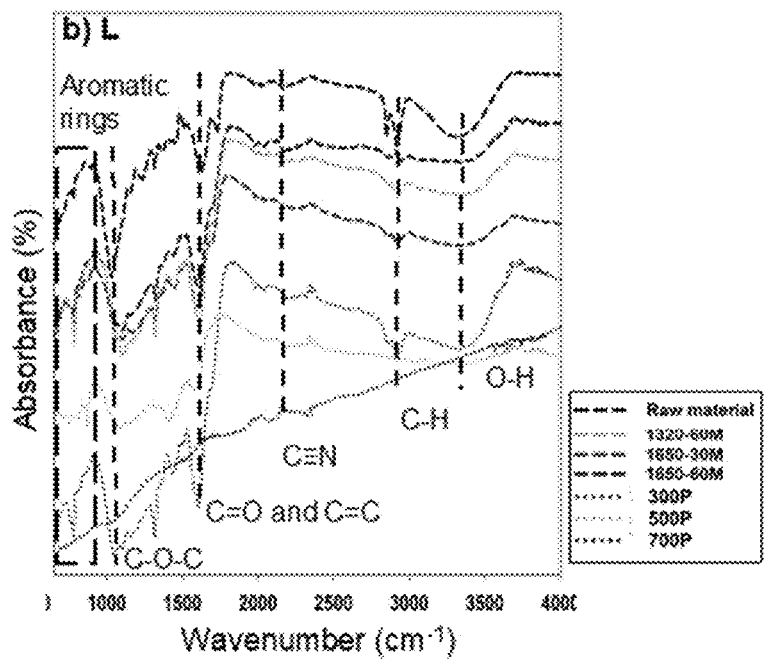
Figure 6C:
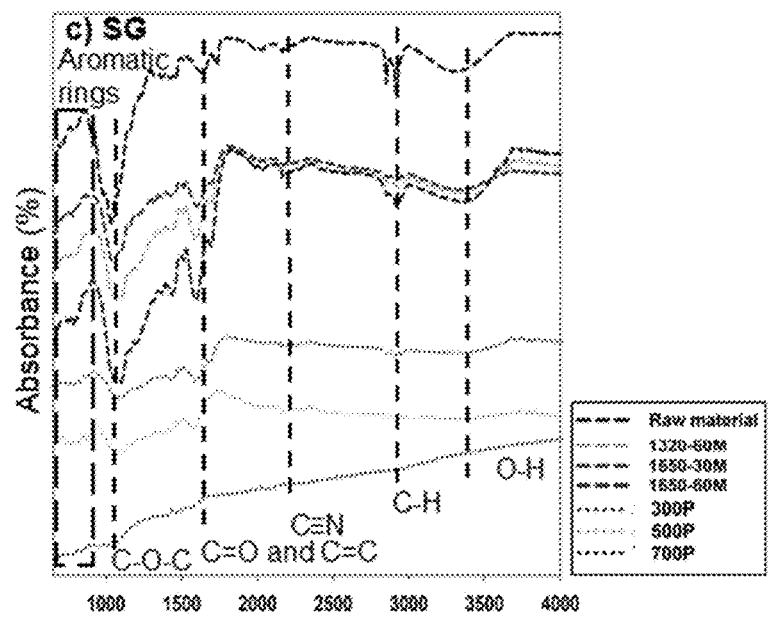

Surface structures were observed from the infrared spectra of the biochar and their respective feedstock at the various slow and microwave pyrolysis syntheses (FIG. 6A-6C). The spectral peaks enabled the diverse functional groups in the raw feedstock, microwave-mediated, and low temperature samples to be evident. The raw feedstocks, all microwave-derived biochar, and slow pyrolysis at 300° C. (except for SG) detected the unstable functional groups of O—H (~3400 $cm^{-1}$) and alkyl C—H (~3000 $cm^{-1}$). This occurrence was attributed to the breaking of hydroxyl groups of aliphatic groups which occur between 120 and 200° C. The further increasing of temperature to 400° C. cause the breaking of the aliphatic methoxyl, methyl, and methylene groups (Li, S. M., et al., Waste Manage 2018, 78, 198-207). For most feedstocks and biochar except at 700° C., and in BS- and SG-500° C., broadbands near 1000 and 1700 $cm^{-1}$ were still evident.

The only broadbands that seemed to disappear for the microwave-mediated biochar were the C—H stretching and O—H stretching near 3000 $cm^{-1}$ and 3400 $cm^{-1}$, respectively, indicating that half the functional groups were released through microwave irradiation. At 3200-3400 $cm^{-1}$, non-detection of the hydroxyl group signified a release of hydroxyl-containing compounds (phenolic or aliphatic alcohol) as volatile matter (Verma, L., et al., J Environ Manage 2019, 248). Additionally, alkyl-hydroxyl chain cracking within lignin [Zhu, L., et al., J Anal Appl Pyrol 2015, 115, 149-156] potentially cracked (within the carbonization process), attributing to the release of the hydroxyl groups (Cao, J., et al., Fuel Process Technol 2013, 106, 41-47). In the 2850-2950 $cm^{-1}$ range, C—H stretching functional groups were released partly due to demethylation (Asmadi, M.; J Anal Appl Pyrol 2011, 92, 76-87) and methyl group transforming into species containing carbon (CO and/or $CO_2$) by means of ether bond breaking (Liew, R. K., et al., Process Saf Environ 2018, 115, 57-69). The band of C—O—C stretching near 1000 $cm^{-1}$ were more pronounced for both 1.65 kW biochar for BS and L, corresponding to the increased C and O elements found from the MESTA results in section 3.2. The dehydration of cellulosic materials and ligneous compounds occurring at temperatures >400° C. attribute to the increased pronunciation (Zhu, L., et al., J Anal Appl Pyrol 2015, 115, 149-156).

3.5. Structural Porosity and Morphology of Biochar

Figure 7A:
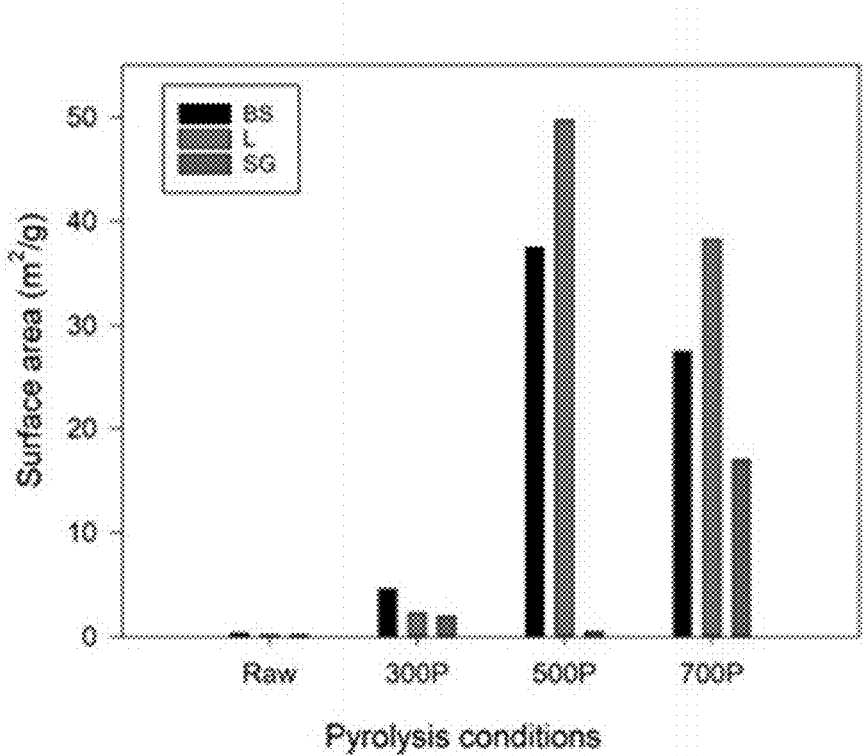
FIGS. 7A-7B show specific surface areas of feedstocks and their resulting (FIG. 7A) slow and (FIG. 7B) microwave pyrolysis-derived biochar. BS: biosolids; L: water oak leaves; SG: switchgrass P: Slow pyrolysis; M: Microwave pyrolysis.
Figure 7B:
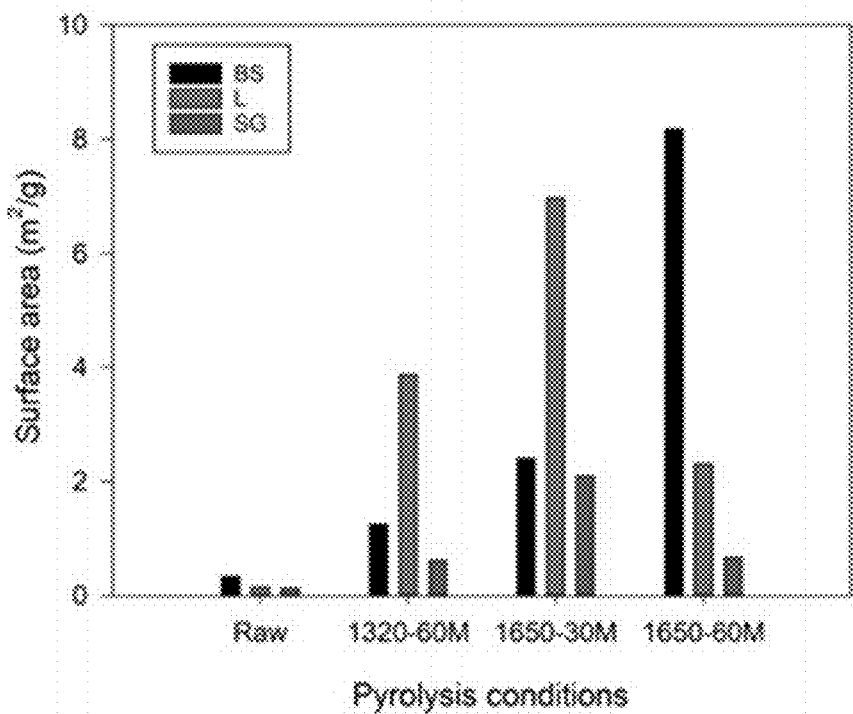

The surface area and porosity of biochar have been noted as two of the most critical properties for nutrient sorption of biochar (Mukherjee, A., et al., Geoderma 2011, 163, 247-255). The greater surface area the biochar contains per gram can promote increased space for adsorption along with more microbial communities to grow and assist in crop growth (Liew, R. K., et al., Process Saf Environ 2018, 115, 57-69). There were many similarities discovered in the surface area between the different specimens (FIG. 7A-7B). For slow pyrolysis-derived biochar at 500° C., the highest surface area was recorded for L and BS at 42 $m^2$ $g^{-1}$ and 29 $m^2$ $g^{-1}$, respectively. Whereas the 700° C. biochar had the most surface area for SG at 18 $m^2$ $g^{-1}$. The feedstocks showed varied results. SG was collectively the feedstock with the least surface area among all the variations of slow and microwave pyrolysis derived. The other two feedstocks had similar surface areas which were contained between 2-10 $m^2$ $g^{-1}$, with the exception of the 500 and 700° C. samples. Higher temperature/energy input was expected to yield a more porous/increased surface area biochar due to more mesopores and micropores being formed from the intensified structural condensation (Li, S. M., et al. J Anal Appl Pyrol 2018, 133, 136-146); however, decreased pore size is a consequence of high temperature/energy input pyrolysis. The microwave pyrolysis-derived biochar for SG showed consistent results (0.5-2 $m^2$ $g^{-1}$), despite the increase in power or time. While the highest specific surface area for BS 1650-60M (8.3 $m^2$ $g^{-1}$) and L 1650-30M (7.2 $m^2$ $g^{-1}$), respectively. Compared to the feedstocks, there was at least a 350% increase in specific surface area as energy was used to heat the feedstocks. The elevated power level increased heat energy that led to enhanced carbonization, which allowed more volatile matter to be released, theorized to create more pores in remaining non-volatile parts (Liew, R. K., et al., *Process Saf Environ* 2018, 115, 57-69). Therefore, results showed promise to be a successful soil amendment to adsorb N nutrients and facilitate plant growth.

Figure 8:
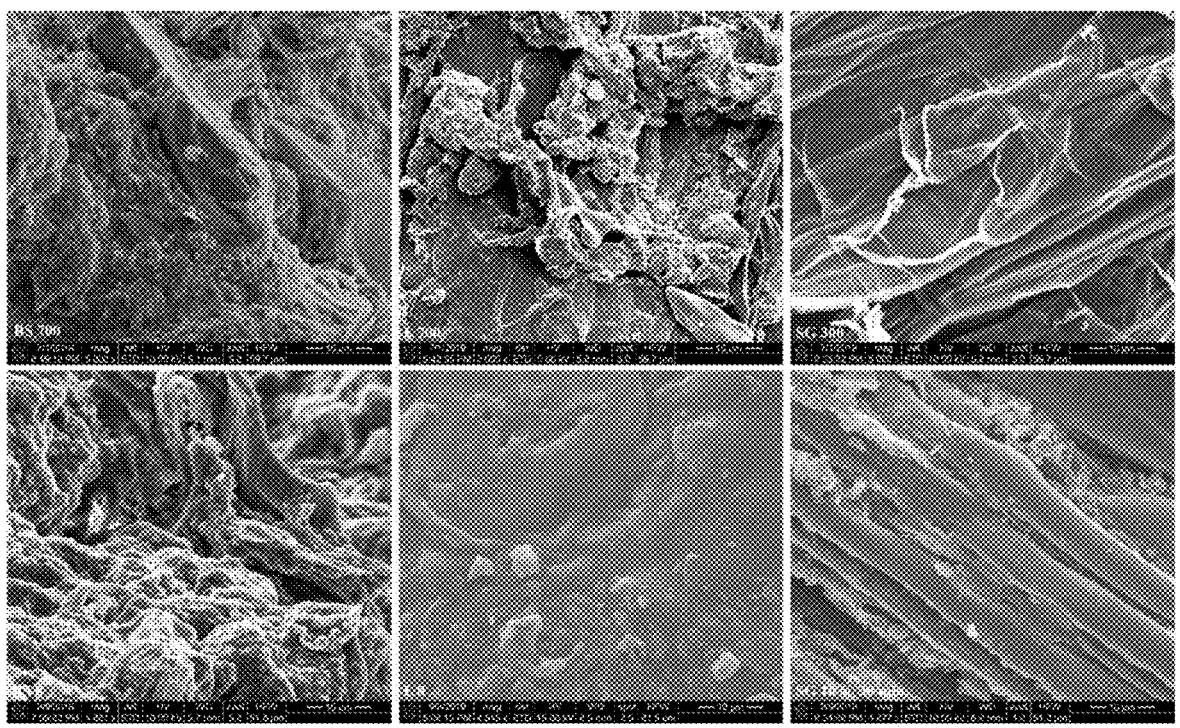
FIG. 8 shows SEM images at 10 µm scale. Top row: Slow pyrolysis-derived biochar; bottom row: microwave pyrolysis-derived biochar; left column: biosolids (BS); center column: water oak leaves (L); right column: switchgrass (SG).

BS specimens were expected to contain the highest surface area as the temperature and radiation level increased (FIG. 7A-7B), as well as by the evident amount of pore space shown from the SEM images (FIG. 8). The BS feedstock showed the most visual surface area from SEM. L surface was primarily smooth across all versions of the biochar species, but there was an area that showed capacity for an increased amount of surface are. For the SG biochar, there was primarily strings of parallel rods that ran the length of the sample. Within these rods there were strings of silicon bands that remained within the biochar (found via Energy Dispersive Spectroscopy detector). Between SG 1320-60M and SG 1650-60M, the increased energy dissipation onto the biochar provided clear deterioration of the surface, creating grooves along the length of the specimen, indicating an increased surface area when energy was increased.

3.6. $NO_3^-$ Adsorption Isotherms and Characteristics

Like $NH_4+$, $NO_3^-$ is a species of N required for adequate and/or enhanced crop growth. $NO_3$—N is a key component in the nitrogen cycle, specifically starting the denitrification process, and ending up as $N_2O$, a GHG. Previous studies have looked primarily at $NH_4+$ adsorption on biochar (Li, S. M., et al. *J Anal Appl Pyrol* 2018, 133, 136-146), while few investigated $NO_3^-$ (Kameyama, K., et al., *Soil Sci Plant Nutr* 2016, 62, 180-184), and mainly found that little or no $NO_3^-$ adsorption capacity was evident for biochar. Additionally, there has not been much exploration of $NO_3^-$ sorption on microwave-mediated biochar (Chintala, R., et al., *Micropor Mesopor Mat* 2013, 179, 250-257).

Vital information of nutrient sorption by slow and microwave pyrolysis-derived biochar was observed through the equilibrium isotherm of $NO_3^-$ (FIG. 9A-9F). Biochar derived from two pyrolysis methods shared similar $NO_3^-$ adsorption capacities. In addition, there was a significant increase of N nutrient adsorption for SG 1650-30M, where 6.2 mg $g^{-1}$ $NO_3^-$—N showed more than a 200% increase than all other feedstocks for an initial concentration of 150 mg $L^{-1}$ $NO_3^-$ (FIG. 9F). However, there was considerable variability among all SG samples derived from both pyrolysis methods. There was a difference of behavior from the different pyrolysis temperatures as well as the microwave power dispersion; i.e., for pyrolysis-derived and microwave-mediated, the adsorption of $NO_3^-$ was 500P>300P>700P and 1320-60M>1650-30M>1650-60M for BS, respectively, 300P>700P>500P and 1650-60M>1320-60M>1650-30M, for L respectively, and 300P>500P>700P and 1650-30M>1320-60M>1650-60M for SG respectively. In these differences, it is clear that lower temperatures and lower irradiation concluded with more $NO_3^-$ adsorbed by biochar, due to the reduced amount of dehydrogenation and dehydration that occurred at higher temperatures and radiation. It is suggested that increased sorption of $NO_3^-$ is possible when an acid activation with hydrochloric acid is performed to reduce negative surface charge of biochar, as indicated in a previous study (Chintala, R., et al., *Micropor Mesopor Mat* 2013, 179, 250-257).

There were certain samples of the biochar, namely all derivations of SG and L1320-60M that were not able to comply with the Freundlich model from the experimental data of $NO_3^-$ adsorption ($R^2$<0.72). In relation to increased sorption intensity and capacity, the constants 1/n and $k_F$ tend to have higher values (Li, S. M., et al. *J Anal Appl Pyrol* 2018, 133, 136-146). However, a decrease in $R^2$-value occurred with an increased $k_F$ and decreased, implying increased variability occurred with decreased intensity. The high correlations with low SE values of the Freundlich model indicates that the adsorption of $NO_3^-$ follows a heterogeneous behavior (Singh, P., et al., *Waste Manage* 2018, 77, 78-86) for BS and L, while SG is assumed to follow a homogenous behavior (Li, S. M., et al. *J Anal Appl Pyrol* 2018, 133, 136-146).

3.7. Summary

One of the studies pointed out that energy consumption, chemicals and reactors running cost required 50% of the total processing cost (Saini, R., et al., *Current Sustainable/Renewable Energy Reports* 2020, 7, 122-136). Therefore, the involvement of microwave irradiation could be beneficial because of less energy requirement and equipment installation. Furnaces, such as the one used in this study, required time to warm up, to ramp to the desired temperature, and to hold that temperature to produce the biochar, which demands increasingly more amounts of energy for each stage. Costs associated with ramping alone were shown to increase four-fold for a biochar specimen of 600° C. (400 USD $ton^{-1}$) compared to one at 400° C. (~100 USD $ton^{-1}$). With a microwave-irradiated instrument, however, there is no/little additional energy or time requirement for warming and ramping, only time to produce the product at the desired energy level. Additionally, the biochar yield of microwave-mediated biochar was on average about 50% more than what the yield of pyrolysis-derived biochar (FIG. 1), potentially allowing for higher production in addition to the reduced energy costs. Therefore, perfecting the microwave mediation process of biochar can open new opportunities for a cost-effective soil additive by reducing the production time and energy input required.

Although temperature was not measured during the microwave pyrolysis in this study, the amount of power from the microwave can be used as a pseudo-variable to measure temperature if the specific heat capacity of the feedstock is known. However, the specific heat capacity of the feedstock used in this study is not available. This brings out the need for estimating specific heat capacity of alternative feedstocks and is deferred for future work. The ash content of the original feedstock was not measured in this study. However, it can help understand reasons of high oxygen content in some of the biochar specimens. Raw material analysis from an earlier study using the same feedstock was used to estimate ash content.

Further field application studies as well as techno-economical estimation are needed to display realistic conditions and the ability for microwave-mediated biochar to confirm its ability for N adsorption via fertilizer application and its ability to enhance crop production for cost driven farmers (Sara, M., et al., Chapter 4, *Platform Chemical Biorefinery*, 2016). A prior study had found that pyrolysis-derived biochar would not be economically feasible without the additional application of fertilizer products (Clare, A., et al., *Int J Agr Sustain* 2014, 12, 440-458), whereas it is still unknown whether this requirement also applies to microwave-mediated biochar. Studies also need to increase exploration on additional feedstock materials and their respective product properties to determine the scale of variability that microwave-mediated biochar can have across various regions. Though feedstock dependent, there may be obvious trade-offs for this method of synthesis, i.e., a low-cost production versus a high specific surface area and carbon sequestration. Such knowledge can remove the lingering uncertainty for biochar products and potentially provide a variety of cost-effective method of biochar application.

4. Conclusion

This study indicated that microwave irradiation is a promising pyrolysis method. Carbon content of all produced biochar were similar, except biosolid, where variation was found between different pyrolysis methods. Higher yield from microwave-mediated biochar can benefit in large scale production and reduce cost. Specific surface area was a characteristic that greatly differentiated between the two pyrolysis, in which the microwave pyrolysis-derived biochar exhibited smaller surface area compared to slow pyrolysis-derived biochar (500° C. or higher). The biggest difference was the considerable adsorption of $NO_3^-$ observed in all biochar, and in the case of switchgrass, exceptionally more adsorption from microwave pyrolysis-derived biochar than slow pyrolysis-derived biochar. Such high adsorbency might because of the more hydrophilic functional groups on the biochar surface, which also indicated by the FT-IR and TGA results. The application of microwave pyrolysis-derived biochar in agricultural fields may provide a potential soil additive to incorporate increased N retention for enhanced crop production. Indicating from previous studies, the significant reduction in energy requirement and cost increases the likelihood for future use; however, in situ experiments and techno-economical assessment to expand on the application potential of microwave pyrolysis-derived biochar are required in future study.

Example 2: Synthesis of Microwave-Mediated Biochar-Hydrogel Composites for Enhanced Water Absorbency and Nitrogen Release Abstract:

Superabsorbent hydrogels have been used to enhance water and nutrient retention in agricultural soils. However, wide applications of these polymeric soil amendments on large farms are plagued by their high costs and environmental footprints. Therefore, solutions are urgently needed in order to optimize the hydrogel application. Biochar, which is a cost-effective pyrolysis product, has been applied as soil amendments for soil fertility reservation. In this study, biochar was co-polymerized with hydrogels to explore the agronomic potentials. Biochar-hydrogel composites were synthesized through rapid mediation of microwave radiation. The physicochemical properties of these composites, such as surface functionality, thermal stability, and morphology, were characterized using various state-of-the-art analytical techniques. The discoveries in this study demonstrated that microwave irradiation could effectively facilitate structural alteration and optimize cross-linkage of biochar-hydrogel composites. Biochar-hydrogel composite (7.5% w/w biochar/composite) significantly improved swelling capacity (20.18% water was absorbed after 48 hours) and optimized the nitrogen release (20.03% of nitrogen was release after 30 days) of composites. Water adsorption and nitrogen release obeyed Gallagher-Corrigan model and Korsmeyer-Peppas model, respectively. The results revealed the microwave-irradiated biochar-hydrogel composite is a promising soil amendment with regard to economic benefit and environmental footprint.

1. Introduction

Excessive irrigation and inefficiency of instant fertilizer are two major issues last for a very long time in agricultural practices (T. S. Du, et al., J. Exp. Bot. 66(8) (2015) 2253-2269). It was estimated that 40% to 60% of irrigation water has been leached through subsurface soil and erosion (D. Laird, et al., Geoderma 158(3-4) (2010) 436-442). At the same time, agricultural fertilizers contribute significant amounts of phosphorus (P) and nitrogen (N) fluxes to lakes and rivers in the United States because of wasteful water usage. 70% of N and P input to the Gulf of Mexico, where dead zone and eutrophication kept recurring, came from the agricultural activity of the upper river basin (J. N. Houser, et al., Hydrobiologia 640(1) (2010) 71-88). Therefore, it is an exigency to solve these two major concerns (i.e., excessive irrigation and inefficiency of instant fertilizer) to enhance the agricultural production.

Efforts have been made on the enhancement of instant fertilizer efficiency. Enhanced efficiency fertilizers (EEFs) are proposed to control fertilizer release or eliminate reactions that lead to nutrient losses. Different EEFs such as sulfur-coated urea, polymer-coated urea, and urea formaldehyde were widely investigated in previous studies. The application of attapulgite-coated fertilizer successfully increased the maize yield by 15% to 18% (Y. P. Timilsena, et al., J. Sci. Food Agric. 95(6) (2015) 1131-1142); polymer-coated urea was able to enhance the grain yield to 26.4% (X. Gao, et al., Field Crops Res. 181 (2015) 60-68). However, the performances of EEFs are largely dependent on the geographical conditions and climate. Although $N_2O$ emission showed a significant decrease on the site applying polymer-coated urea, the crop yield and nitrogen usage efficiency were not affected in tropical cropping system (C. Scheer, et al., Soil Res. 54(5) (2016) 544-551). Targeting on balancing the inconsistency of EEFs' performance, biochar is proposed to be co-applied with EEFs. Because of its multi-benefits and cost effectiveness, biochar has been assigned extensively in agriculture and horticulture for enhancements of soil fertility, crop production, water storage and microorganism activity in soil environments (P. Wen, Z. S., et al., ACS Sustain. Chem. Eng 5(8) (2017) 7374-7382). It has been observed that up to 70% increase in crop yield could be achieved in nutrient-poor tropical soil with addition of nutrient biochar (S. Jeffery, Environ. Res. Lett 12(5) (2017) 053001). At the same time, soil microbes exhibited strengthened resistance and resilient to the drought after applying biochar, which would be helpful for the nutrient cycling and soil carbon sequestration simultaneously (C. Liang, X., Environ. Res. Lett. 9(6) (2014) 064013). Moreover, the introduction of biochar enhances the mechanical strength and prolong the nutrient release period, demonstrating great potential for improving performance of EEFs (S. Chen, Sci. Total Environ. 615 (2018) 431-437).

Hydrogel is suitable to be a coating material as it provides protection to stored nutrients from leaching as well as store appreciate amount of water. Hydrogels are crosslinked polymers, on which hydrophilic functional groups are attached (S. Li, Environ. Dev. Sustain. 22(4) (2020) 2703-2741). Their distinct permeable structures and diverse hydrophilic functional groups make them potential reservoirs for excess water and nutrients in agricultural soils. A prior review reported that conventional polyacrylamide hydrogels could retain distilled water of as much as 326 times their dry weigh (S. Kim, Int. J. Polym. Anal. Charact. 15(5) (2010) 307-318). Despite its promising application to EFFs, the major issue of this novel technology is its weak biodegradability. Conventional hydrogels such as polyacrylic acid and polyacrylamide are difficult to decompose, which consequently leads to the undesirable environmental footprint (M. Curcio, et al., Am J Agric Biol Sci 3(1) (2008) 299-314). Cellulose, which is an abundant natural polymer, is considered for eliminating the disadvantages of conventional polymers (S. Mohammadi-Khoo, et al., J. Appl. Polym. Sci 133(5) (2016)).

The major concerns of a classical polymerization of hydrogel are the involvement of organic solvents and production of byproducts (C. J. Clarke, et al., Chem. Rev. 118(2) (2018) 747-800). Conventional heating during polymerization employs long-period rotations in an organic media. Hydrogels derived from classical methods retain additives and residues, which pose severe environmental threats if directly be applied into the agricultural field (I. Kyrikou, et al., J Polym Environ 15(2) (2007) 125-150). The removal of byproducts requires high temperature and high vacuum (K. Pang, et al., Prog. Polym. Sci. 31(11) (2006) 1009-1037). Hence, microwave-mediated polymerization, which is clear from the organic solvents and byproducts, is promising for green production. Microwave irradiation provides rapid dipole rotation and generate inherent heat within the materials, which significantly speed up the reaction process and limit the side reactions (S. S. Lam, et al., J. Clean. Prod 236 (2019)). Giachi et al. demonstrated that a microwave-irradiated hydrogel exhibited a faster swelling and shrinking behavior (G. Giachi, et al., Microwave Heating, 2011, pp. 181-206). High efficiency of microwave irradiated cellulose/acrylamide hydrogel for delivering oral drug was also demonstrated, with the properties of non-cytotoxicity and biocompatibility (M. Pandey, Mol. Pharm. 11(10) (2014) 3596-3608). Although the major advantages of microwave irradiation are high efficiency of polymerization and cleaner process, it is significant to estimate its cost-effectiveness. Because of its simple apparatus, limited additives, and easy control, it can largely reduce processing cost and labor cost. However, few studies have reported biochar-hydrogel composites via microwave irradiation that can retain water and release nutrients.

The main objective of this study is to propose an efficient and cost-effective biochar-hydrogel composite using microwave-irradiated polymerization. It is hypothesized that microwave irradiation is an efficient strategy for polymerization. And the biochar-hydrogel composites would exhibit great water retention and nitrogen release. Biochar in the biochar-hydrogel composite is expected to prolong nitrogen release period and retain larger amount of water than the composite without biochar. At the same time, different dosages of biochar would alter the structure architecture of the composite. To evince the structural characterizations and morphology of synthesized composites, thermogravimetric (TG) analysis, Fourier transform infrared spectroscopy (FTIR), and scanning electron microscope (SEM) would be utilized. Water retention and nitrogen release behavior were also analyzed.

2. Materials and Methods

2.1 Slow Pyrolysis of Biochar Synthesis

Biochar was produced from switchgrass (*Panicum virgatum*). Switchgrass (SG) is a perennial lowland species, which is prevalent in Florida. The original SG feedstock was dried at 60° C. for 48 hours until no significant weight change was observed. Biochar was synthesized through slow pyrolysis. During the pyrolysis, pure $N_2$ gas (purity >99.99%) was used at temperatures 500° C. in a bench scale pyrolysis apparatus described in previous study (S. Li, et al., Waste Manage. 78 (2018) 198-207). In brief, dried feedstock (between 10-14 g) was centered in a quartz tube (inner diameter: 2 cm, length: 45 cm). The tube was fitted with airtight connectors and rubber O-rings. The tube packed with feedstock was heated in a controllable S-line single-zone split tube furnace (Thermcraft Inc., Wiston-Salem, NC) at heat ramp of 10° C. $min^{-1}$ until the desired temperature and was kept at designate temperature for 60 minutes. The quartz tube was purged with $N_2$ gas (80 mL $min^{-1}$) during pyrolysis and cooling to prevent rapid oxidation and/or auto-ignition.

2.2 Preparation of Biochar-Hydrogel Composite

Acrylamide (MAA, purity >99.99%), cellulose, urea fertilizer, potassium persulfate (KPS, purity >99%), N, N'-methylene bisacrylamide (MBA, purity: 99%) were purchased from Sigma-Aldrich (Steinheim, Germany) Materials were ground using a pestle and mortar, sieved to be less than 0.5 mm in diameter. A Domestic Electric microwave (JES2051SNSS, General Electric, Boston, MA), which possesses a 2.45 GHz frequency and a maximum 1650 W power output was utilized for the synthesis of biochar-hydrogel composites. Each sample solution containing 0.3 g of urea, 0.4 g of cellulose, 3 g MAA, 0.03 g KPS, 0.03 g MBA and 40 mL distilled water was introduced to a 100 mL glass container. Four samples containing biochar dosages of 0 g, 0.1 g, 0.2 g and 0.3 g are named as composite 1, 2, 3, and 4, respectively. Therefore, biochar constituted approximately 0%, 2.5%, 5.0%, and 7.5% (w/w) of four composites. The mixed solutions have been stirred until homogeneity and then flushed with $N_2$ gas for 20 minutes. Two power levels, Level 3 (495 W) and Level 5 (825 W), were used to synthesize. The samples were irradiated for 1 minute at the two power levels, respectively. The products were washed with distilled water and dried to constant weight in an oven at 60° C. for further use.

2.3 Physicochemical Properties Characterization of Biochar and Biochar-Hydrogel Composite

2.3.1 Fourier Transform Infrared Spectroscopy (FTIR) Analysis

FTIR spectra of raw materials (i.e., urea, cellulose, MAA and SG biochar) and biochar-hydrogel composites were recorded on a PerkinElmer 100 spectrometer (Waltham, MA) using non-contact reflectance imaging method. Raw materials and composites were ground to fine particles using a pestle and mortar. The FTIR spectra were conducted in the region of 4000 to 650 $cm^{-1}$ with a spectral resolution of 4 $cm^{-1}$ and total number of 16 scans per sample. Before each measurement, background spectrum was scanned without loading samples for calibration.

2.3.2 Thermogravimetric Analysis (TGA)

Thermal behavior of raw materials (i.e., urea, cellulose, MAA and SG biochar) and biochar-hydrogel composites were analyzed using an MS-TGA thermalgravimetric analyzer (GA 550, TA Instrument, New Castle, DE) under a flow of argon (50 mL $min^{-1}$) Each time, 5 mg of sample was weighed and then used for the thermal weight-change analysis. The temperature ramp was set as follows: (1) isotherm at room temperature (21° C.) for 5 min; (2) temperature equilibrium at 21° C. to 100° C.; (3) isotherm at (100° C.) for 5 min; (4) ramping of 5° C. $min^{-1}$ from 100° C. to 700° C.

2.3.3 Morphology Analysis

The surface morphology of four different biochar-hydrogel composites and SG biochar were investigated via a FEI Nova 400 Nano SEM (Hillsboro, OR). Samples were first coated with iridium (Ir) via sputter coater (Cressington HR208 Sputter Coater, Ted Pella, Inc) with $N_2$ gas purging to dissipate charging artifacts and minimize the beam damage. As a result, a 4 nm coat was applied to each sample Images were taken on samples under vacuum environment following the standard procedures at scales ranging from 2 to 50 μm. Characterization of surface morphology was performed using the SEM detector (Energy Dispersive Spectroscopy, ETD) at voltage between 10 and 20 kV, current of 96 pA, and focal length between 5 mm and 10 mm

2.4 Study of Water Absorbency and Fertilizer Release Properties of Biochar-Hydrogel Composite

2.4.1 Measurements of Water Absorbency Capacity and Nutrient Release

Water absorbency of biochar-hydrogel composites were examined using a gravimetric method. Weighted dry sample (1.0±0.1 g) was immersed in 50 ml distilled water at room temperature and allowed to reach equilibrium water absorbency. In order to determine the sorption kinetics, tests were run where at designated intervals. The water absorption capacity $f_1$ is calculated using the following equation:

$$f_1 = (M_t - M_1)/M_1 \times 100\% \tag{1}$$

Where $M_t$ (g) is the weight of sample after water absorbency, $M_1$ (g) is the weight of dry sample at initial stage.

Nitrogen release profile $f_2$ of biochar-hydrogel composite were measured by a batch-scaled experiment. Weighted dry sample (1.0±0.1 g) was incubated in a glass bottle of 20 mL distilled water. 20 mL sample were taken at designated intervals and fresh distilled water was added immediately to keep the volume constant. The accumulated release of urea fertilizer was measured in form of total nitrogen in the solution following a persulfate digestion method. The absorbance of sample solution was then detected by a visible spectrophotometer (DR 3900, Hach, Loveland, CO) to quantify total nitrogen concentration. The amount of released nitrogen is calculated using the following equation:

$$f_2 = (C_2 \times V_2 - C_1 \times V_1)/M_3 \times 100\% \tag{2}$$

Where $M_3$ (g) is the initial weight of urea fertilizer (in form of nitrogen) in the composite, $V_1$ (L) is the initial volume of sample solution in the glass bottle, $C_1$ (mg L$^{-1}$) is the initial nitrogen concentration in the glass bottle. $C_2$ (mg L$^{-1}$) is the nitrogen concentration in the sample solution, $V_2$ (L) is the volume of sample. The measurements of water absorbency and nitrogen release was tripled for each sample, respectively.

2.4.2 Water Absorbency Kinetics

The absorbency characteristic has been described as a quick swelling burst and then followed by a slower absorbency. To better understand the absorbency mechanism, the Gallagher-Corrigan model was applied to describe the data. Gallagher-Corrigan model divides the water absorbency profile into two stages, i.e., biphasic water absorbency consisting of a first-order quick burst and a subsequent smooth diffusion controlled by polymer degradation (C. Chang, et al., Carbohydr. Polym. 84(1) (2011) 40-53). The quick burst and smooth diffusion are denoted as Stage I and Stage II, respectively.

$$f_1 = (f_1)_B[1-\exp(-k_{g,1} \times t)] + [(f_1)_{max} - (f_1)_B][\exp(k_{g,2} \times t - k_{g,2} \times t_{max})/(1+\exp(k_{g,2} \times t - k_{g,2} \times t_{max}))] \tag{3}$$

Where, $(f_1)_B$ is the cumulative absorbency profile in Stage I; $K_{g,1}$ and $K_{g,2}$ are the absorbency factors in Stage I and Stage II, respectively; and $(f_1)_{max}$ is the maximum absorbency ratio during the process.

2.4.3 Nutrient Release Kinetics

Korsmeyer-Peppas model has been applied to study the mechanism of nutrients release. The release mechanism can be explained by the combined effect of polymer matrix relaxation and concentration-dependent diffusion (X. Gao, C, et al., Field Crops Res. 181 (2015) 60-68).

$$f_2 = K_K t^n \tag{4}$$

Where $K_K$ and n swelling rate constant in the Korsmeyer-Peppas model and diffusion exponent, respectively. The exponent n in the equation indicates different swelling behaviors: 1) Fickian/case I transport (n=0.5); 2) n=1.0, case II transport (n=1.0); and 3) anomalous transport (0.5<n<1.0) (J. Siepmann, Adv. Drug Deliv. Rev. 64 (2012) 163-174).

2.5 Statistical Analysis

The experimental data were processed and analyzed by one-way analysis of variance (ANOVA) using SPSS for Windows 14.0 (IBM, Armonk, NY). The corresponding Scheffé test was made to differentiate means with 95% confidence (p<0.05) when the study of variance showed differences between means.

3. Results and Discussion

3.1 Surface Structure Analysis of Biochar-Hydrogel Composite

Intermolecular interactions affect the vibration of groups on polymer segments. This information can be obtained by FTIR analysis (FIG. 10A-10D). In general, composites with higher dosages of biochar resulted in low transmission, which indicates enhanced molecular vibrations and/or complexity of structure. Aromatic and heteroaromatic compounds on SG biochar are confirmed by C—H wagging vibrations between 800 and 700 cm$^{-1}$. In the same region, the spectrum of composite 1 to composite 4 revealed peaks with different transmittances. Higher absorbency exhibited on the composite 4 spectrum, which might result from the increasing dosage of biochar. The spectrum of cellulose, MAA and biochar showed multiple peaks in the region of 990-1215 cm$^{-1}$. The C—O—C stretching of cellulose, hemicellulose, and lignin is the reason of observed peaks on cellulose spectrum and biochar spectrum. This base region overlapped the bands of Si—O (1030-950 cm$^{-1}$) observed on biochar (S. Li, et al., Waste Manage. 78 (2018) 198-207). Silica is the essential element for plant phytoliths, as it could protect the plant carbon from degradation. On MAA spectrum, the peaks in this region are usually assigned to the C—N—H stretching (R. Ullah, S., et al., J Spectrosc (Hindawi) 2013 (2013)). Therefore, the nadir in the region of 990-1215 cm$^{-1}$ on the composite spectrums might have several contributions: 1) C—O—C stretching on cellulose and biochar surface; 2) Si—O bands on biochar surface; 3)

the linkage of crosslinked MAA and cellulose. Similar results have also revealed in previous studies, such as chitosan/biochar hydrogel (M. Z. Afzal, X, et al., Sci. Total Environ. 639 (2018) 560-569) and carboxymethyl cellulose-acrylamide-graphene oxide composite (K. Varaprasad, et al., Carbohydr. Polym. 164 (2017) 186-194). The peaks at 1460 and 1662 $cm^{-1}$ on composite spectrums indicated the characteristic absorption of amine C—NH bond and CH2-CO—NH bending vibration, combinedly corresponding to the urea and MAA structure (X. Liu, et al., Sci. Rep. 9(1) (2019) 9548). The absorption peaks at 2910, 3183, and 3330 $cm^{-1}$ ascribes to C—H and O—H stretching vibration. The band at 3330 $cm^{-1}$ might also be attributed to the overlapping vibration of O—H and N—H stretching (A. J. M. Valente, et al., Eur. Polym. J. 42(9) (2006) 2059-2068).

3.2 Thermogravimetric Characteristics of Biochar-Hydrogel Composites

Figure 11A:
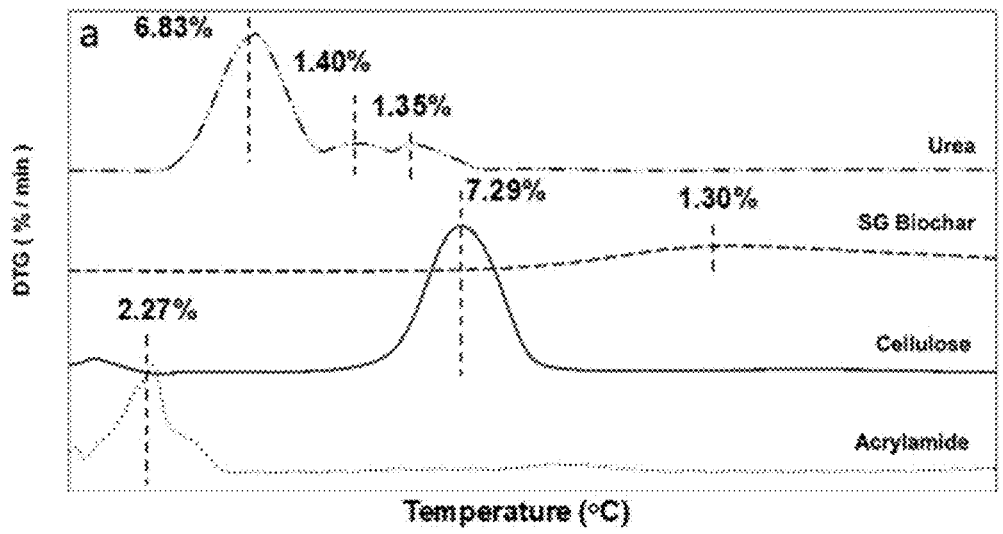
Figure 11B:
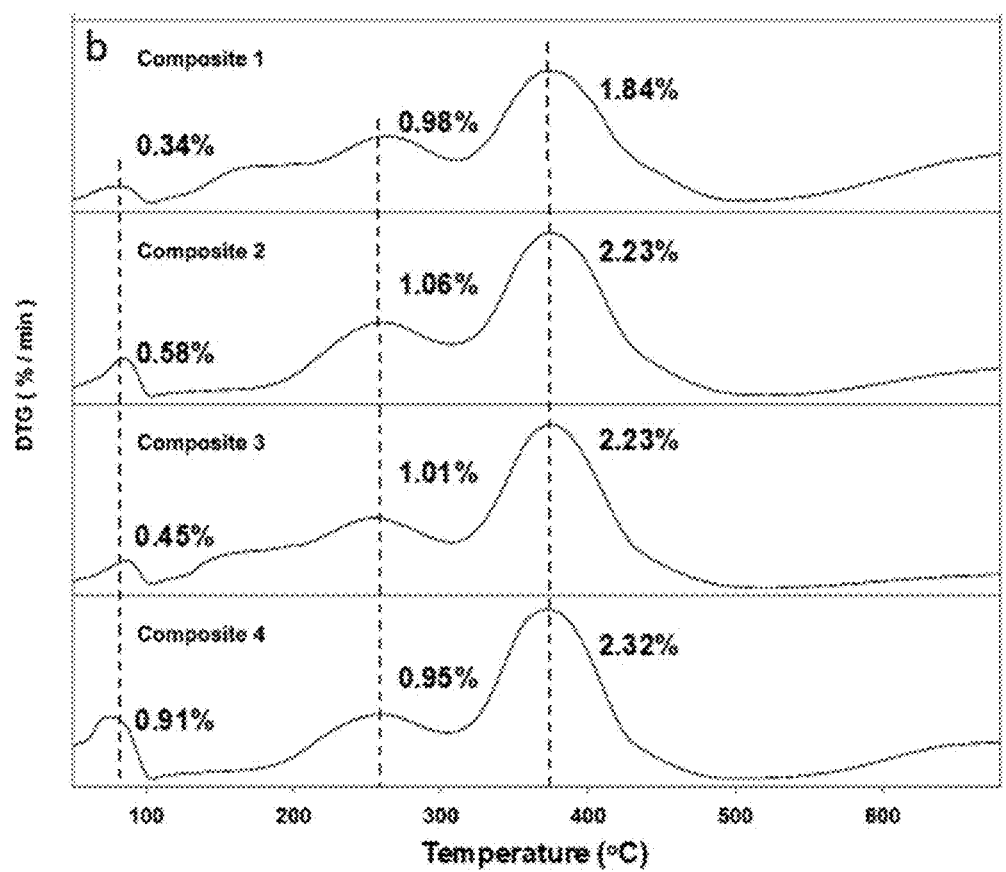
Figures 11C, 11D, 11E, 11F:
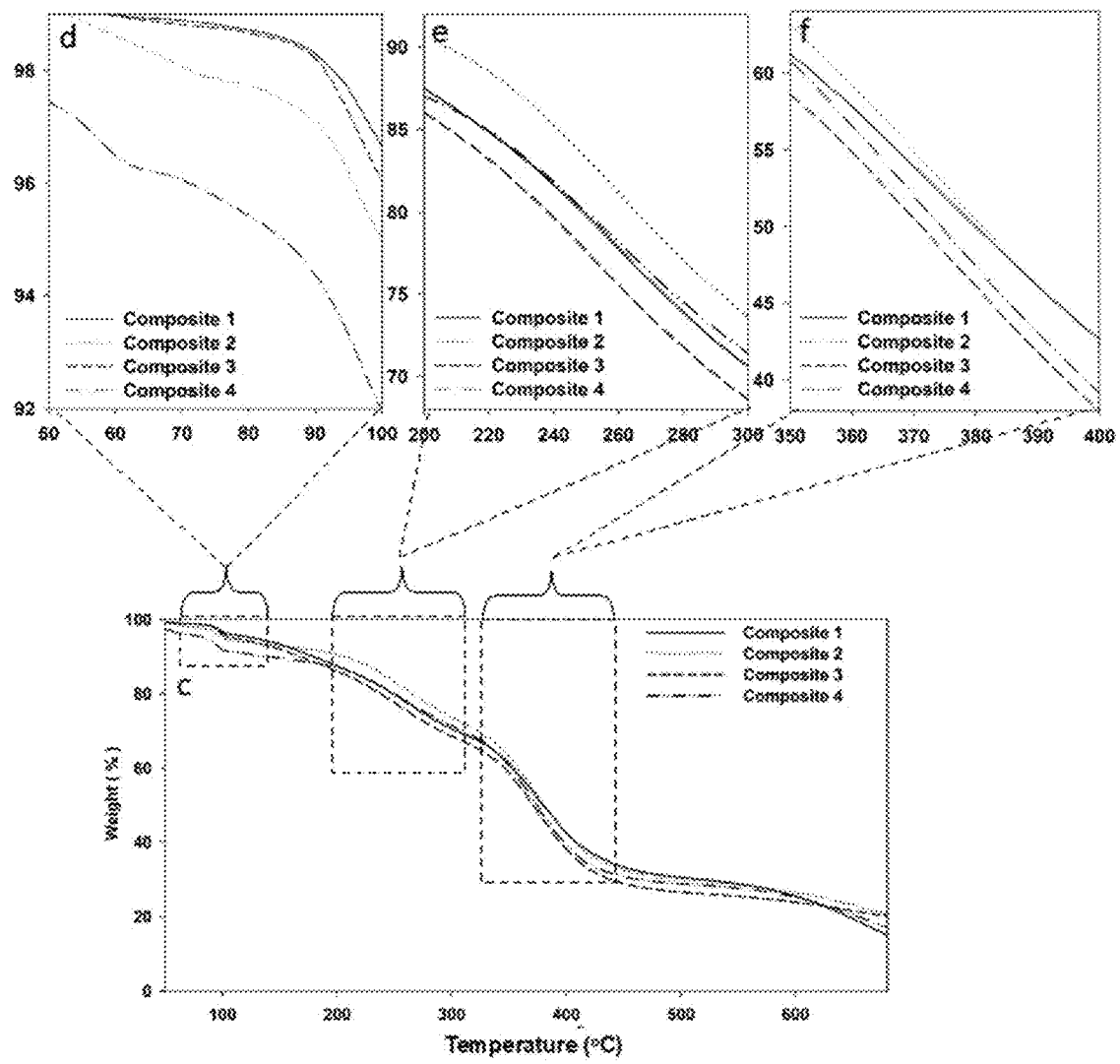

TG and DTG decomposition curves were analyzed for thermal stability. The composites exhibited three distinct stages of decomposition from 50 to 700° C. Initially, the thermal peaks observed before 100° C. are contributed to the moisture loss associated with the hydrogel and biochar (FIG. 11D) (S. Li, et al., Waste Manage. 78 (2018) 198-207). These thermal peaks increased with the increasing dosage of biochar. This might indicate that biochar helped preserve water in the composite. The second stage between 200 to 300° C. can be interpreted as the result of labile functional groups on MAA and cellulose, leading to the ammonia, CO and $CO_2$ formation (FIG. 11E) (C. Zhou, et al., Colloids Surf. B 84(1) (2011) 155-162). Temperature at which maximum decomposition rate occur, i.e., $T_{max}$ is found within the temperature from 360.31-382.44° C. The last stage of degradation and $T_{max}$ can be ascribed to main-chain scission and the destruction of crosslinked matrix (FIG. 11E) (Y. Bao, Carbohydr. Polym. 84(1) (2011) 76-82). Four composites exhibited parallel rates of destruction. $T_{max}$ (360.31-382.44° C.) of four composites was clearly higher than that of the raw materials (FIG. 11A and FIG. 11B). Different dosages of biochar in samples did not alter the thermal stability. Microwave irradiation efficiently produced the crosslinking characteristic, resulting a stabilized composite than the raw materials. This conclusion is consistent with previous study, which reported the crosslinking of cellulose and gelatin is responsible for the improved thermal stability (S. Sethi, Funct. Polym 142 (2019) 134-146).

3.3 Morphology Analysis of Biochar-Hydrogel Composites

Figure 12A:
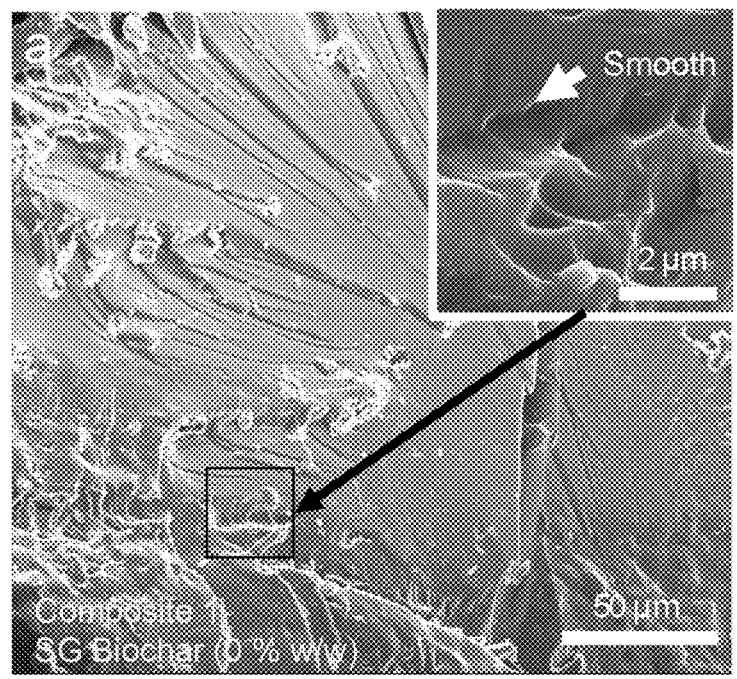
Figure 12B:
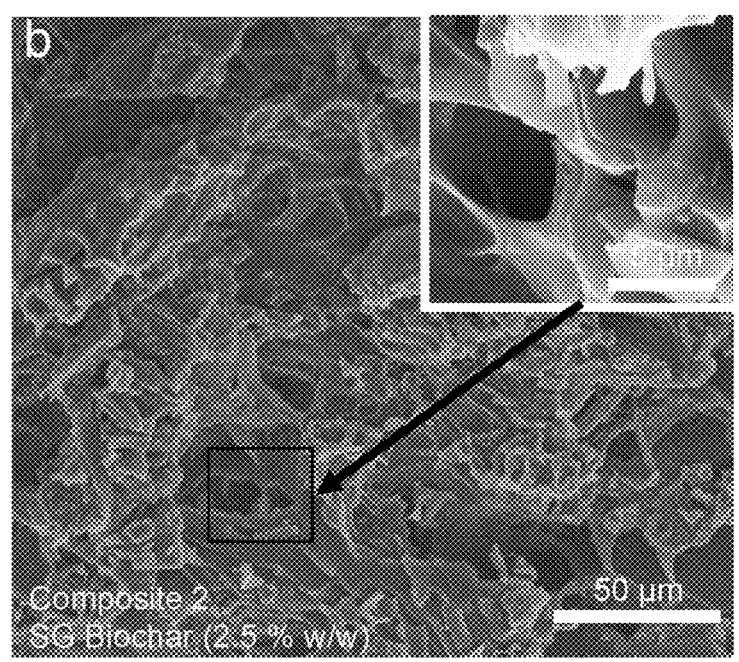
Figure 12C:
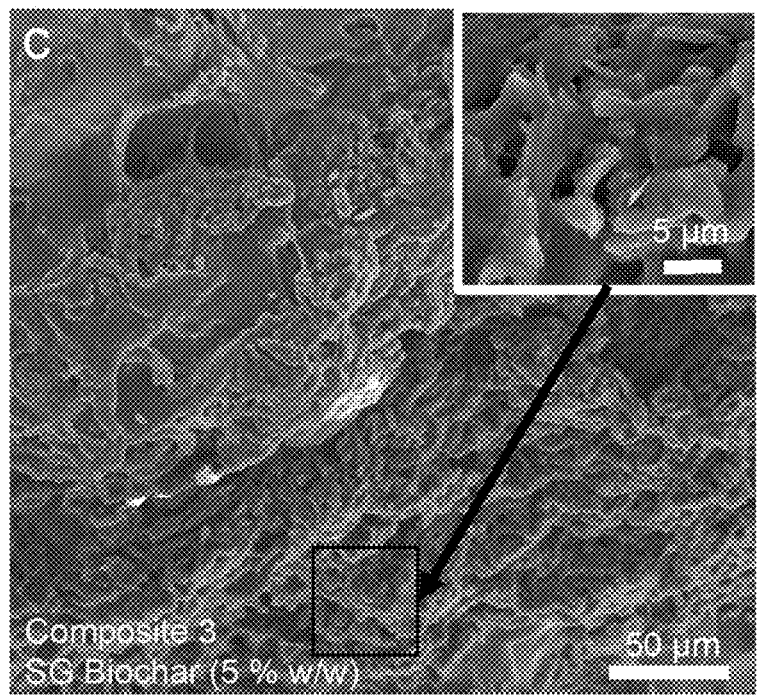
Figure 12D:
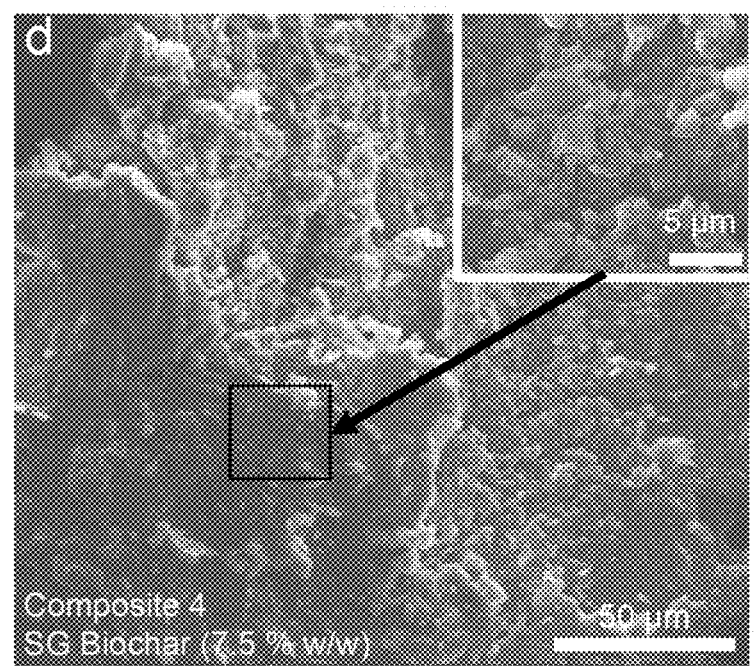
Figure 12E:
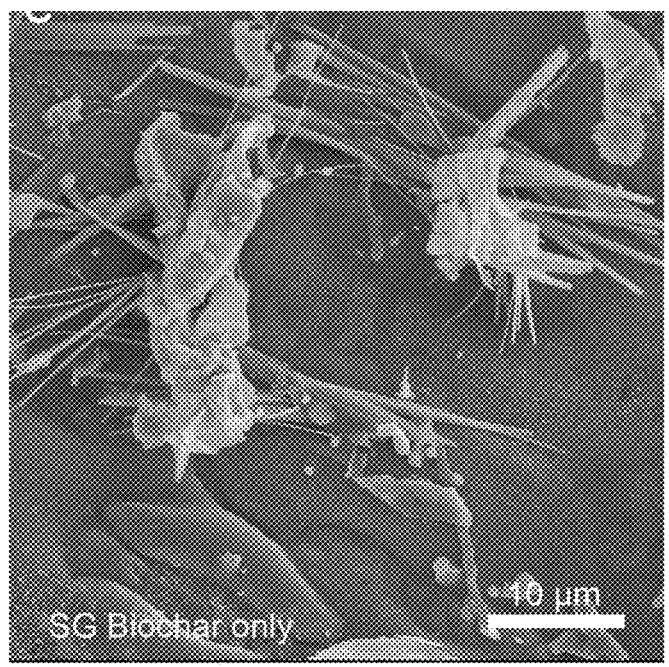

A well-defined three-dimensional interconnected porous surface allows the transportation of guest molecules such as water and nitrogen to diffusion and/or release (C. B. Godiya, et al., Mater. 364 (2019) 28-38). Thus, the microstructure of composite is an important component to study. The composite without biochar (composite 1) has a compact surface structure (FIG. 12A). This indicate the homogenous distribution of raw materials after the microwave-irradiated synthesis. But the composites with biochar exhibited coarse surfaces, demonstrating biochar dispersed on the matrix surface as well as in the porous structure (FIG. 12B to 12D). Similar observation was reported that a fertilizer-polymer composite (includes chitosan, acrylic acid, bentonite and $NH_4^+$-loaded biochar) displayed an undulant and coarse surface, resulting from the graft polymerization of raw materials (P. Wen, Z. S., et al., ACS Sustain. Chem. Eng 5(8) (2017) 7374-7382). Irregular bulges dispersing on the surface of composite are positively correlated with the biochar content as reported in literatures (W. Zhang, et al., J. Hazard. Mater. 384 (2020) 121445).

3.4 Water Absorbency of Biochar-Hydrogel Composite

Water absorbency capacities had the order of composite 4>composite 3>composite 1>composite 2. Water absorbency capacity has been enhanced by the increasing dosage of biochar (FIG. 13A-13B). The differences became more pronounced after 15 hours (FIG. 13B). However, water absorption rate of composite 2 is slightly slower than the composite without biochar (i.e., composite 1). Comparing to other three composites, only composite 1 showed a decreasing trend after 35 hours. It proves that biochar-hydrogel composite has better water swelling capacity and longer water retention ability. The Gallagher-Corrigan model fitted water absorbency of 4 composites (Table 3, $R^2$ from 0.9182 to 0.9736). This fitting revealed the two-phase water absorbency profile of four composites: an initial quick burst (phase I) and a polymer relaxation-controlled phase (phase II). During phase I, 77% of water can easily diffused into the polymer matrix. The polymer matrix relaxation is clearly observed after 24 hours (phase II), coupling with the nitrogen release behavior. This result is consistent with FTIR results. The transmittance on composite 2 is lower than the composite 1 in the region of 3500 to 3200 $cm^{-1}$ (FIG. 11C), indicating less hydrophilic C—H and O—H groups on composite 2 than 1. Small amount of biochar on the composite surface might combine with the surface functional group, whereas excessive biochar in composites inversely provides more hydrophilic groups.

TABLE 3

Kinetic fitting parameters of water absorbency of hydrogel-biochar composite.

| Composite # | $(Mt/M\infty)_B$ | $(Mt/M\infty)_{max}$ | Gallagher-Corrigan Model $K_{g,1}$ | $K_{g,2}$ | $R^2$ |
|---|---|---|---|---|---|
| Composite 1 | 10.40 | 13.37 | $3.87 \times 10^{-3}$ | $3.22 \times 10^{-12}$ | 0.9420 |
| Composite 2 | 9.42 | 12.27 | $6.05 \times 10^{-3}$ | $3.24 \times 10^{-12}$ | 0.9295 |
| Composite 3 | 12.25 | 15.97 | $3.06 \times 10^{-3}$ | $3.25 \times 10^{-12}$ | 0.9528 |
| Composite 4 | 14.94 | 19.40 | $1.60 \times 10^{-3}$ | $1.26 \times 10^{-14}$ | 0.9556 |

3.5 Nitrogen Release Behavior of Biochar-Hydrogel Composite

Nitrogen release behaviors were significantly different between composites with/without biochar (FIG. 14A-14B). Without biochar, the release rate was very slow, which is not sufficient for plant growth. With biochar, nitrogen was steadily released. As discussed above, there was no obvious crosslinking between biochar and other materials in the biochar-hydrogel composite (FIG. 10A-10D). Therefore, biochar tied with urea in the composite is likely to be gradually released during the composite expansion (corresponding to phase II of water absorbency profile). Except composite 1, the nutrient release behavior of other 3 composites are all defined as anomalous transport, indicating a combination of diffusion and polymer relaxation (J. Siepmann, Adv. Drug Deliv. Rev. 64 (2012) 163-174). Composite 1 is defined as a case II transport (n=1.1507), which is independent to time. The nutrient release from composite 1 is controlled by matrix relaxation (Table 4).

Indicated from the results, hydrogel-biochar composites with these advanced characteristics could effectively improve the utilization of nutrients and water. When imbedded in the soil, the composites are able to release nutrients along with portion of biochar, enhancing soil moisture content simultaneously. Indicating from previous studies, nitrogen released from the composite not only require sufficient amount, but also on-time amount according to the needs of plants. For example, snap bean has a slothful nutrient uptake (~10% of total nitrogen) at first 30 days followed by a rapid uptake (~40% of total nitrogen) lasting for a month (G. Liu, et al., Hortic. Sci. Dep, 2014). A slower rate at the beginning and a following rapid release is optimal for plants' need. Anomalous transport of composite 2 to 4 indicated that polymer matrix relaxation gradually occurred during the nutrient release (Table 4). Therefore, nitrogen release is expected to constantly increase afterwards, which fits the plants' need (FIG. 14A-14B).

TABLE 4

Kinetic fitting parameters of nitrogen release from hydrogel-biochar composite.

| | Korsmeyer-Peppas Model | | | |
|---|---|---|---|---|
| Composite # | $K_k$ | n | $R^2$ | Transport Mechanism |
| Composite 1 | $6.28 \times 10^{-4}$ | 1.1507 | 0.9646 | Case II transport |
| Composite 2 | 0.1106 | 0.8266 | 0.9850 | Anomalous transport |
| Composite 3 | 0.1230 | 0.8485 | 0.9842 | Anomalous transport |
| Composite 4 | 0.0447 | 0.9677 | 0.9931 | Anomalous transport |

3.5 Cost Benefit Evaluation of Microwave-Irradiated Polymerization Method

Production cost (per ton of composite) of hydrogel-biochar composite is various due to the different local prices of raw materials, energy input, and labor cost. But the comparison of lab-scale polymerization methods could be realized. For example, polyacrylamide polymerization required different experimental conditions in radical polymerization with microwave heating and conventional heating. The amount of initiator, crosslinker and solvent are largely reduced during the microwave polymerization (Table 5). In addition, it has been estimated that microwave irradiation yield reaction rate enhancement of about 130-150% comparing to conventional methods (D. Bogdal, 4.39 Polymer Science: A Comprehensive Reference, 2012, pp. 981-1027). Therefore, assuming the same protocol was applied to the pretreatments (homogenous stir, degassing, pH adjustment), the microwave irradiation can reduce at least 40% of the cost than conventional polymerization. The scale-up microwave reaction (size >1 L) is relatively hard to be estimated because limited information (J. D. Moseley, et al., Org Process Res Dev 12(1) (2008) 30-40). But there are several successful pilot-scaled examples (1000t/year) provided by Microwave Chemical Co. showing the promising applications (food additives, polyester, nanoparticle etc.) of this technology. Hydrogel and biochar are all desirable soil amendments but without large scale utilization. High demand and lack of production contributed to the high pricing of these soil amendments (S. Li, Environ. Dev. Sustain. 22(4) (2020) 2703-2741). With the utilization of microwave-irradiated polymerization, it is believed that production efficiency can be enhanced, and manufacturing cost can be largely reduced.

TABLE 5

Experimental conditions in polymerizations with microwave and with conventional heating.

| | Microwave irradiation | Dosage | Conventional heating | Dosage |
|---|---|---|---|---|
| Initiator | Potassium Persulfate, Ammonium Persulfate | 5% (w/w total raw materials) | Potassium Persulfate | 0.8% (w/w total raw materials) |
| Cross-linker | N,N-bisacrylamide Methylene | 1 to 5% (w/w total raw materials) | N,N-bisacrylamide Methylene | 0.8% (w/w total raw materials) |
| Solvent | Sodium Hydroxide, Urea, Distilled Water | 1 g products/ 2.5 mL | Distilled Water | 1 g products/ 2.5 mL |
| Reaction time | 2 hours to 20 hours | | 2 minutes to 15 minutes | |
| Temperature or Power level | 40° C. to 70° C. | | 300 W to 1200 W | |
| Reference | [37], [12], [38] | | This study, [39], [40] | |

Reference [12] S. Kim, Int. J. Polym. Anal. Charact. 15(5) (2010) 307-318; [37] S. K. Ghazali, et al., Appl. Mech. Mater. 695 (2015) 139-142; [38] E. M. Ahmed, J. Adv. Res. 6(2) (2015) 105-121; [39] R. Nagahata, Chem. Rec. 19(1) (2019) 51-64; [40] R. Hoogenboom, et al., Macromol Rapid Commun 27(18) (2006) 1556-1560.

4. Conclusions

The result showed that microwave irradiation was successfully employed to polymer composite production. Short time period (i.e., 2-minute duration) and clean production process were the dominant advantages observed during the synthesis. After the synthesis, microwave-mediated biochar-hydrogel composite exhibited appreciate water retention and prolonged nutrient releasing capacity. Estimating from the scanning electron microscope (SEM), biochar dispersed uniformly in the porous matrix and onto the polymer surface. Thermogravimetric analysis (TGA) indicated the thermal stability of linkages between cellulose and acrylamide, but not with the biochar. FT-IR analysis demonstrated the major functional groups of biochar-hydrogel composites. The linkages between cellulose and acrylamide were believed to maintain the polymer matrix where biochar can be attached on and a reservoir to store significant amount of water. The study revealed the significant role of biochar in the hydrogel composite. It enhanced the moisture retention as well as liberated nitrogen in an appropriate amount according to plants' need. Based on the cost benefit analysis and literature survey, it is expected that microwave-assisted products will circumvent disadvantages with conventional products.

Example 3: Microwave-Mediated Hydrogel Synthesis

Raw materials: NaOH, Urea, produced cellulose, and ECH (epichlorohydrin). The mass ratio of NaOH/Urea/$H_2O$ is 7/12/81.

A solution of 12 wt. % urea and 7 wt. % NaOH in distilled water was prepared and cooled down to −12° C. 10 wt. % of cellulose powder was added to the solution. Temperatures were kept at no lower than −12° C. The mixture is kept overnight at −12° C. and then stirred vigorously at 1000-1200 rpm using an overhead stirrer. During the complete process the solution was immersed in a bath of glycol and water (ratio 1:4) to keep the solution temperature constant at −12° C. ECH (10% v/v) was added with dropwise into cellulose solution and immediately purged with nitrogen gas to remove oxygen in the samples. It was then sealed and put in the microwave reactor. Samples were heated by using a microwave at power level 1 for 25 minutes with continuous stop to prevent overheating. Product shown in FIG. 15.

REFERENCE

Huber, T., *Materials*, 12(7), 1066, (2019)

Example 4: Water Absorption Capacity and Nitrogen Release Studies

The water absorption capacity and nitrogen release of the biochar-hydrogel composites in table 6 were assayed. The biochar-hydrogel composites were made using conditions as described in Example 2. Results are shown in FIGS. 16A-16D and 17A-17L.

TABLE 6

Summarizing biochar-hydrogel composition

| Sample # | urea (g) | biochar | cellulose | acrylamide | initiator | crosslinker | water | container weight | total weight before microwaving | total weight after microwaving | |
|---|---|---|---|---|---|---|---|---|---|---|---|
| 1-1 | 0.303 | 0.000 | 0.403 | 3.001 | 0.030 | 0.031 | 0.08% | 157.148 | 160.9 | 200.625 | 196.291 |
| 1-2 | 0.301 | 0.000 | 0.405 | 3.002 | 0.031 | 0.030 | 0.08% | 157.14 | 160.91 | | 195.26 |
| 1-3 | 0.301 | 0.000 | 0.400 | 3.000 | 0.031 | 0.031 | 0.08% | 157.988 | | | 197.151 |
| 1-4 | 0.301 | 0.000 | 0.400 | 3.005 | 0.030 | 0.032 | 0.08% | 157.967 | 161.686 | 200.928 | 196.37 |
| 1-5 | 0.300 | 0.000 | 0.400 | 3.000 | 0.030 | 0.031 | 0.08% | 158.747 | 162.485 | 201.578 | 197.091 |
| 2-1 | 0.299 | 0.100 | 0.400 | 2.980 | 0.031 | 0.030 | 0.08% | 157.134 | | 200.454 | 197.513 |
| 2-2 | 0.301 | 0.100 | 0.451 | 2.997 | 0.030 | 0.031 | 0.08% | 158.435 | 162.287 | | 198.883 |
| 2-3 | 0.302 | 0.102 | 0.400 | 3.000 | 0.030 | 0.030 | 0.08% | 158.915 | 162.553 | | 199.213 |
| 2-4 | 0.300 | 0.101 | 0.401 | 3.000 | 0.033 | 0.030 | 0.08% | 158.003 | 161.857 | 201.201 | 198.313 |
| 2-5 | 0.299 | 0.100 | 0.401 | 3.000 | 0.030 | 0.031 | 0.08% | 157.832 | 161.695 | 201.297 | 198.805 |
| 3-1 | 0.301 | 0.200 | 0.402 | 3.000 | 0.031 | 0.031 | 0.08% | 158.435 | 162.382 | 201.563 | 198.23 |
| 3-2 | 0.301 | 0.200 | 0.401 | 3.006 | 0.029 | 0.030 | 0.08% | 158.466 | 162.408 | 201.96 | 199.301 |
| 3-3 | 0.300 | 0.199 | 0.400 | 3.004 | 0.031 | 0.030 | 0.08% | 157.84 | 167.795 | 201.026 | 197.588 |
| 3-4 | 0.300 | 0.200 | 0.401 | 3.001 | 0.030 | 0.030 | 0.08% | 158.679 | 162.62 | 201.834 | 197.503 |
| 3-5 | 0.300 | 0.200 | 0.401 | 3.006 | 0.030 | 0.031 | 0.08% | 157.986 | 161.642 | 201.221 | 198.15 |
| 4-1 | 0.299 | 0.299 | 0.399 | 3.000 | 0.030 | 0.031 | 0.08% | 158.134 | 162.187 | 201.407 | 198.269 |
| 4-2 | 0.301 | 0.300 | 0.402 | 2.994 | 0.032 | 0.030 | 0.08% | 157.982 | 162.043 | 201.012 | 198.229 |
| 4-3 | 0.300 | 0.301 | 0.400 | 3.011 | 0.031 | 0.029 | 0.08% | 157.832 | 161.904 | 201.163 | 198.429 |
| 4-4 | 0.301 | 0.299 | 0.401 | 3.002 | 0.030 | 0.032 | 0.08% | 157.137 | 161.198 | 200.382 | 197.657 |
| 4-5 | 0.300 | 0.300 | 0.401 | 3.002 | 0.030 | 0.031 | 0.08% | 158.66 | 162.722 | 201.861 | 199.24 |

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated.

What is claimed is:

1. A biochar-hydrogel composite comprising:
   a hydrogel matrix, a nitrogen source, and a biochar material,
   wherein the hydrogel matrix comprises a porous structure and a surface,
   wherein the biochar material is uniformly dispersed in the hydrogel matrix porous structure and on the hydrogel matrix surface,
   wherein the biochar-hydrogel composite comprises a porous structure with a coarse surface,
   wherein the biochar-hydrogel composite has a water absorption capacity of at least 5%;
   wherein the composite releases at least 20% of nitrogen content after 30 days,
   wherein the hydrogel matrix comprises a first polymeric material and a second polymeric material,
   wherein the first polymeric material consists essentially of polyvinyl alcohol, polyvinyl pyrrolidone, polyalkylene glycols, polyalkylene oxides, hydroxypropyl methacrylate, hydroxyethyl methacrylate, polyacrylamide, copolymers or mixtures thereof;
   wherein the second polymeric material consists essentially of gelatin, chitosan, alginate, gellan gum, cellulose, derivatized celluloses, or any combination thereof; and
   wherein the biochar material is derived from a feedstock consisting of biosolid, switchgrass, water oak leaves, or any combination thereof.

2. The biochar-hydrogel composite of claim 1, wherein the nitrogen source comprises nitrate, ammonia, urea, ammonium nitrate, calcium nitrate, ammonium sulfate, diammonium phosphate, or any combination thereof.

3. The biochar-hydrogel composite of claim 2, wherein the nitrogen source is present in the biochar-hydrogel composite in a concentration of from 0.1% by weight to 10% by weight.

4. The biochar-hydrogel composite of claim 1, wherein the biochar material is present in the biochar-hydrogel composite in a concentration of from 2% by weight to 10% by weight.

5. The biochar-hydrogel composite of claim 1, wherein the first polymeric material is polyacrylamide.

6. The biochar-hydrogel composite of claim 1, wherein the second polymeric material is cellulose.

7. The biochar-hydrogel composite of claim 1, wherein the first polymeric material is present in the biochar-hydrogel composite in a concentration of from 70% by weight to 90% by weight.

8. The biochar-hydrogel composite of claim 1, wherein the second polymeric material is present in the biochar-hydrogel composite in a concentration of from 8% by weight to 20% by weight.

9. The biochar-hydrogel composite of claim 1, wherein the biochar material is a slow pyrolysis-derived biochar or a microwave pyrolysis-derived biochar.

* * * * *